US012501915B2

(12) United States Patent
Resnick et al.

(10) Patent No.: US 12,501,915 B2
(45) Date of Patent: *Dec. 23, 2025

(54) FULLY AUTOMATED FROZEN BEVERAGE AND SOFT SERVE SYSTEM

(71) Applicant: Forte Supply LLC, Loveland, CO (US)

(72) Inventors: Jeffrey D. Resnick, Dallas, TX (US); Tyler Hawker, Timnath, CO (US); David Resnick, Dallas, TX (US)

(73) Assignee: Forte Supply LLC, Loveland, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/245,267

(22) Filed: Jun. 21, 2025

(65) Prior Publication Data
US 2025/0311746 A1     Oct. 9, 2025

Related U.S. Application Data

(63) Continuation-in-part of application No. 19/023,706, filed on Jan. 16, 2025, now Pat. No. 12,349,700, and
(Continued)

(51) Int. Cl.
*F25D 31/00*     (2006.01)
*A23G 9/04*      (2006.01)
(Continued)

(52) U.S. Cl.
CPC ............ *A23G 9/228* (2013.01); *A23G 9/045* (2013.01); *A23G 9/20* (2013.01); *A23G 9/224* (2013.01);
(Continued)

(58) Field of Classification Search
CPC . A23G 9/04; A23G 9/045; A23G 9/20; A23G 9/222; A23G 9/228; A23G 9/30;
(Continued)

(56) References Cited

U.S. PATENT DOCUMENTS 7,820,215 B2 * 10/2010 Bortone ................. B29C 48/92
426/519
12,250,955 B2 * 3/2025 Resnick ................. A23G 9/224
(Continued)

*Primary Examiner* — Jerry-Daryl Fletcher
*Assistant Examiner* — Daniel C Comings
(74) *Attorney, Agent, or Firm* — H. Brock Kolls

(57) ABSTRACT

The present invention relates to a fully automated frozen food dispensing system that combines precision ingredient blending with dynamic viscosity control and clean-in-place functionality. The system comprises a mixing cylinder containing a rotatable auger, a refrigeration system with a compressor in thermal communication with the cylinder, and a blending manifold having multiple ingredient inlets and a blending chamber. A controller includes motor sensor, and pressure sensors to regulate ingredient delivery, monitor auger torque and product temperature, and cycle the refrigeration system to maintain a target viscosity. The system further supports automated portion control, product-specific dispense timing, gas injection, and pasteurization. Cleaning cycles may be initiated without manual disassembly, involving thawing, purging, rinsing, and verification using sensor feedback. Optional connectivity enables cloud-based monitoring, diagnostics, and remote operation. The invention is suitable for commercial, unattended, or kiosk-based frozen food service environments, enabling hygienic, repeatable, and labor-free operation over extended durations.

21 Claims, 24 Drawing Sheets

Related U.S. Application Data a continuation-in-part of application No. 17/846,653, filed on Jun. 22, 2022, now Pat. No. 12,349,699.

(51) Int. Cl.
| | |
|---|---|
| *A23G 9/20* | (2006.01) |
| *A23G 9/22* | (2006.01) |
| *A23G 9/28* | (2006.01) |
| *A23G 9/30* | (2006.01) |
| *B01F 35/11* | (2022.01) |
| *B01F 35/21* | (2022.01) |
| *B01F 35/212* | (2022.01) |
| *B01F 35/10* | (2022.01) |
| *B01F 101/13* | (2022.01) |

(52) U.S. Cl.
CPC ............... *A23G 9/28* (2013.01); *A23G 9/30* (2013.01); *B01F 35/11* (2022.01); *B01F 35/21112* (2022.01); *B01F 35/2113* (2022.01); *B01F 35/2115* (2022.01); *B01F 35/212* (2022.01); *B01F 35/1452* (2022.01); *B01F 2101/13* (2022.01); *F25D 31/002* (2013.01); *F25D 2331/806* (2013.01)

(58) Field of Classification Search
CPC .... F25D 2331/806; B01F 35/10; B01F 35/11; B01F 35/2113; B01F 35/2115; B01F 35/212; B01F 35/145; B01F 35/1452
See application file for complete search history.

(56) References Cited

U.S. PATENT DOCUMENTS

| | | | |
|---|---|---|---|
| 12,349,699 B2 * | 7/2025 | Resnick | A23G 9/28 |
| 2008/0073376 A1 * | 3/2008 | Gist | B67D 1/0043 |
| | | | 222/145.5 |
| 2014/0261873 A1 * | 9/2014 | Mohammed | A23G 9/28 |
| | | | 221/221 |
| 2020/0288747 A1 * | 9/2020 | Greenberg | A23G 9/281 |
| 2022/0030906 A1 * | 2/2022 | Springer | B01F 27/1141 |

* cited by examiner

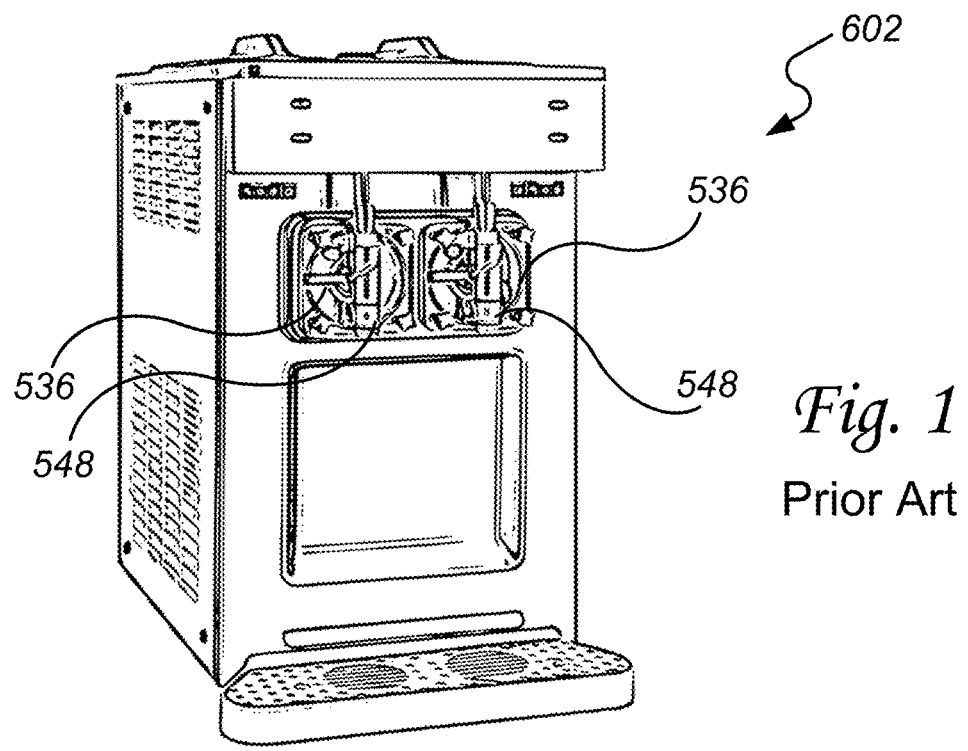
Fig. 1
Prior Art
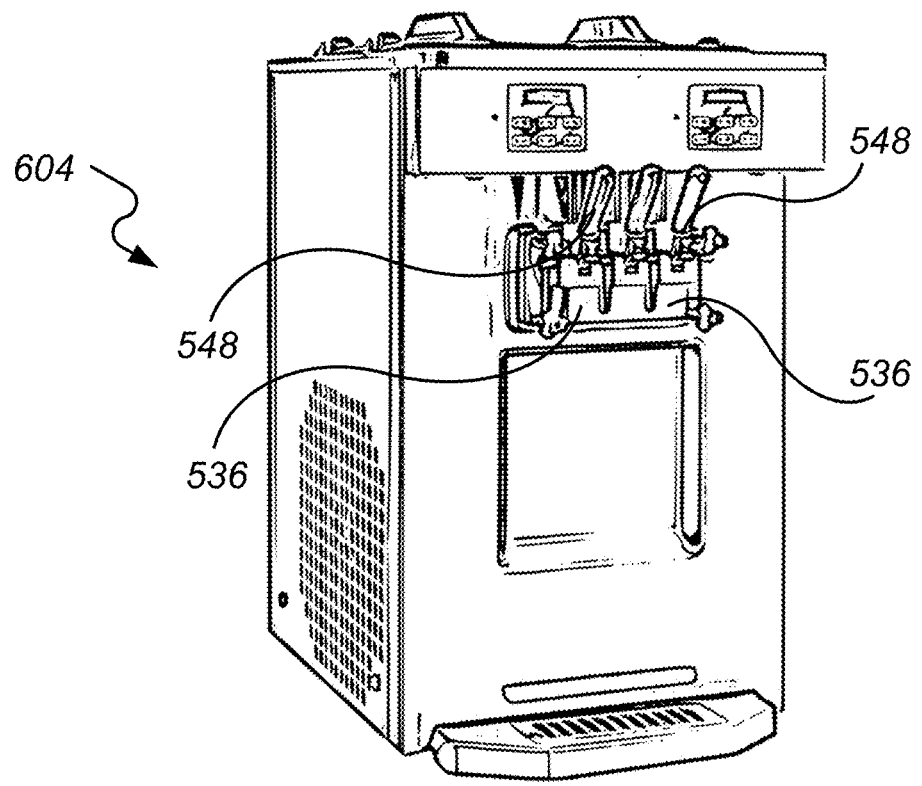

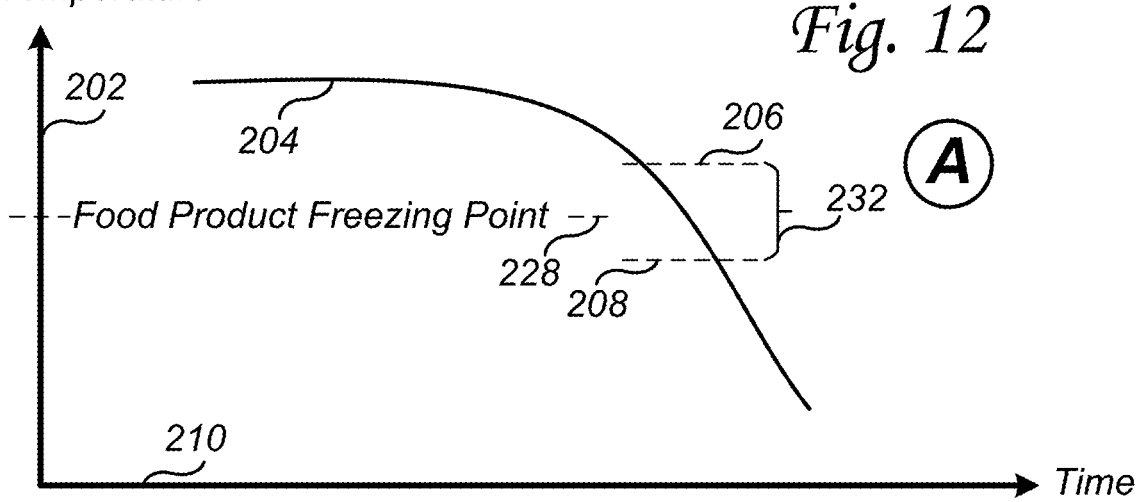
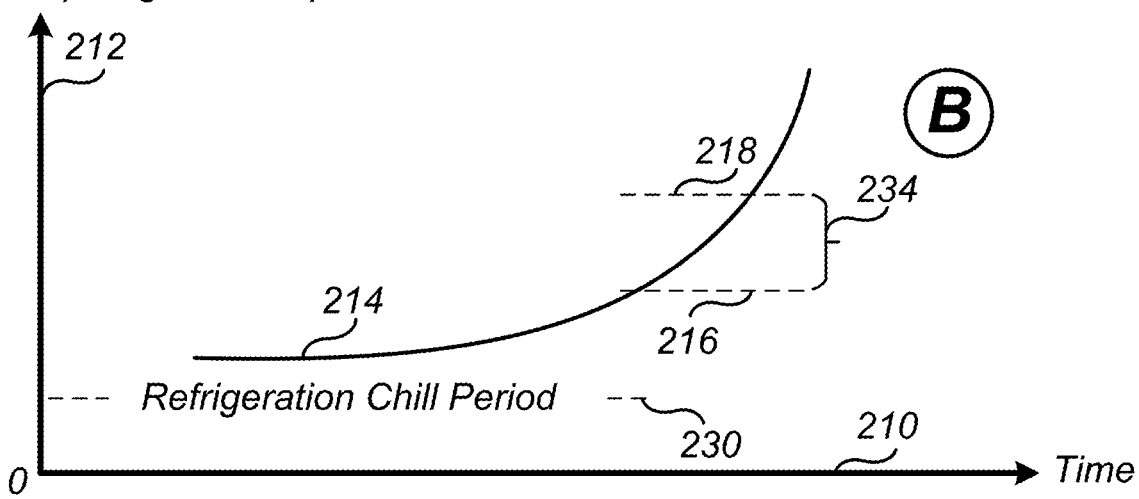
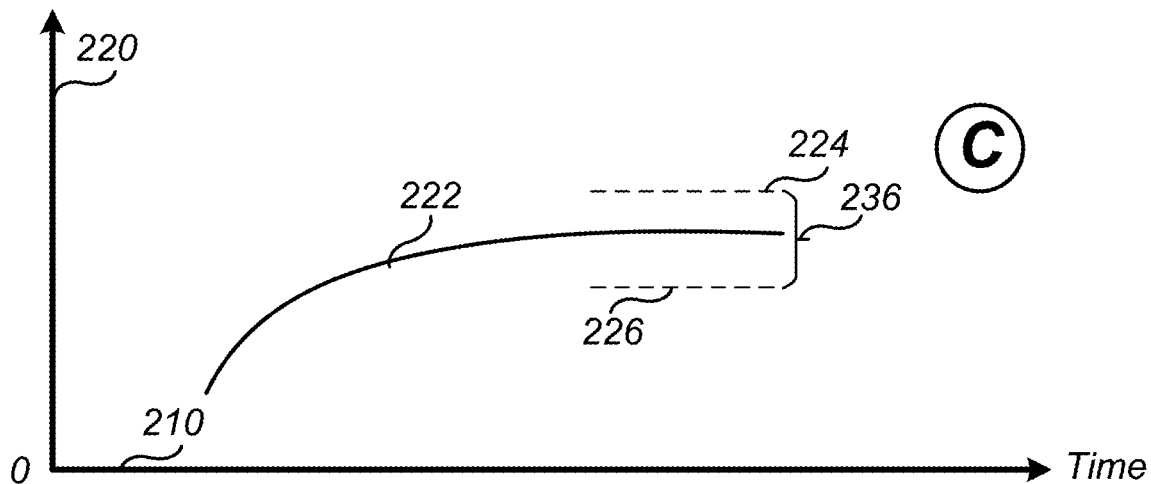
Fig. 12

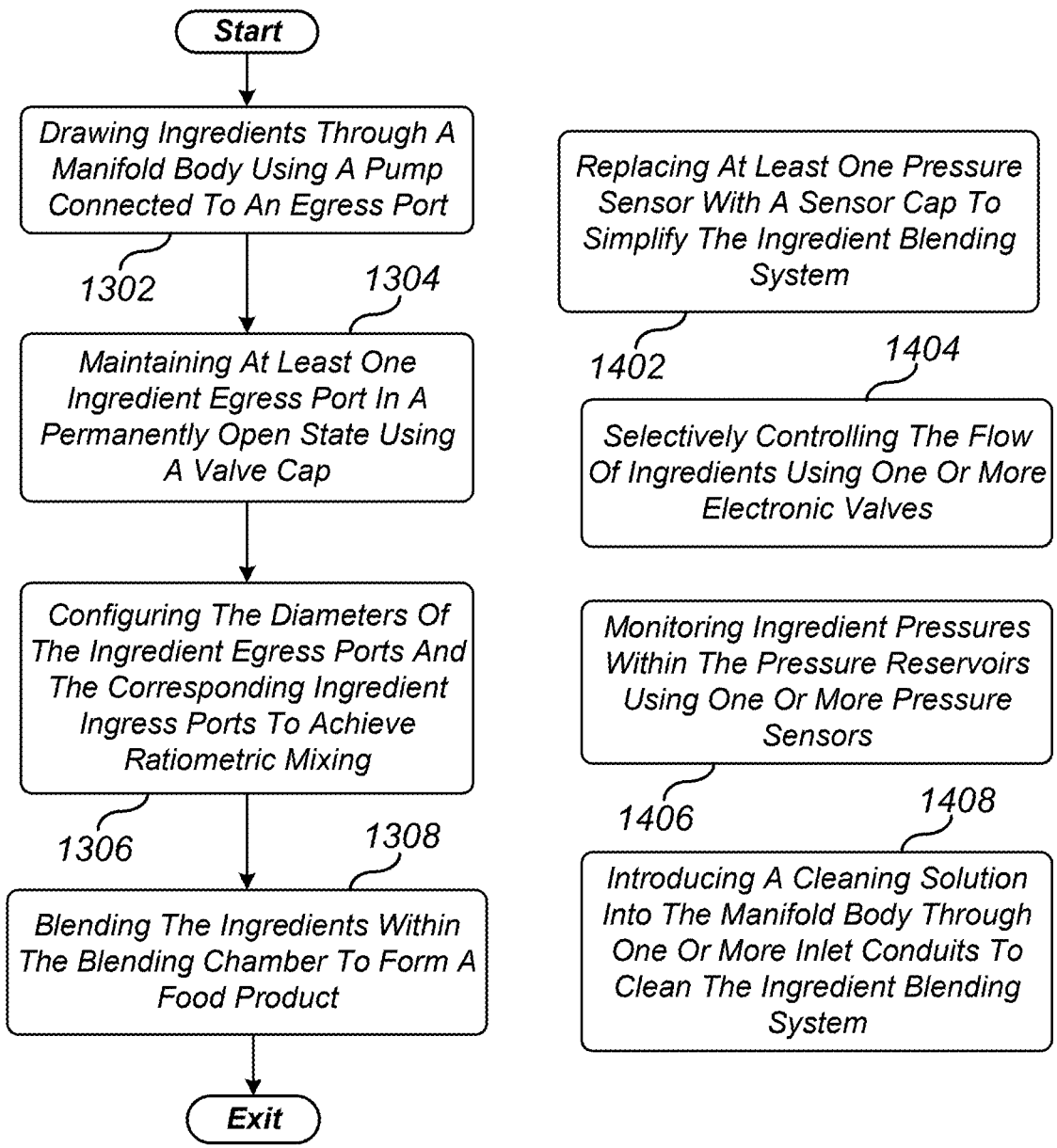

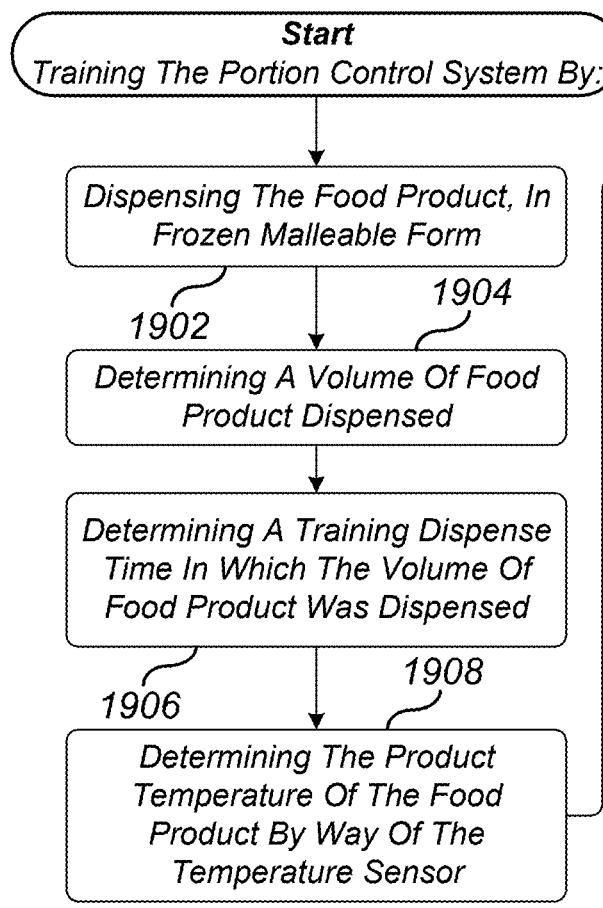
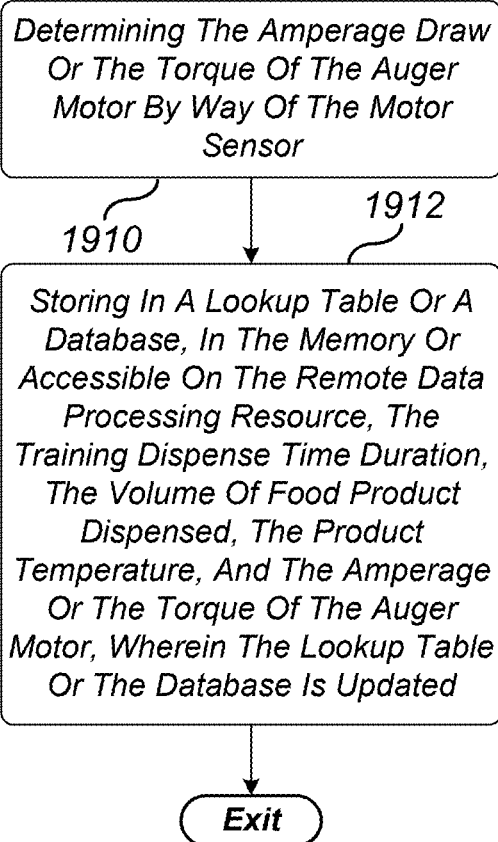
Fig. 29
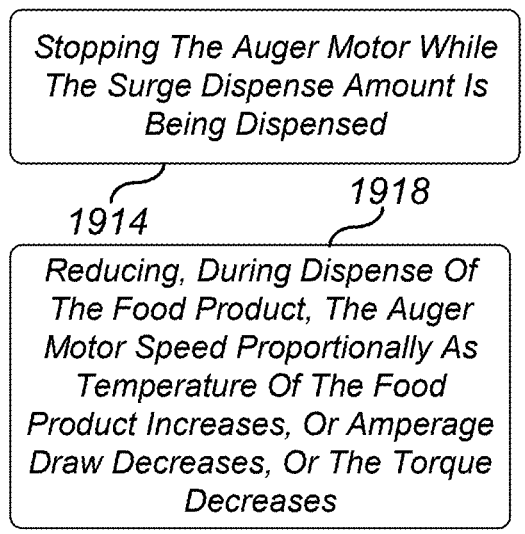
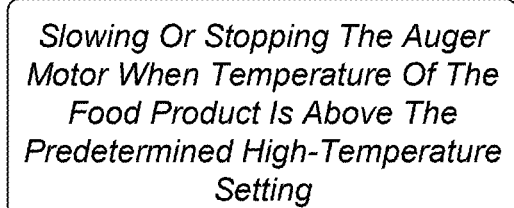
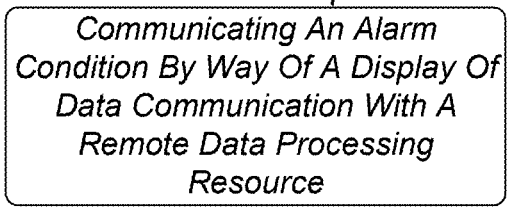
Fig. 30

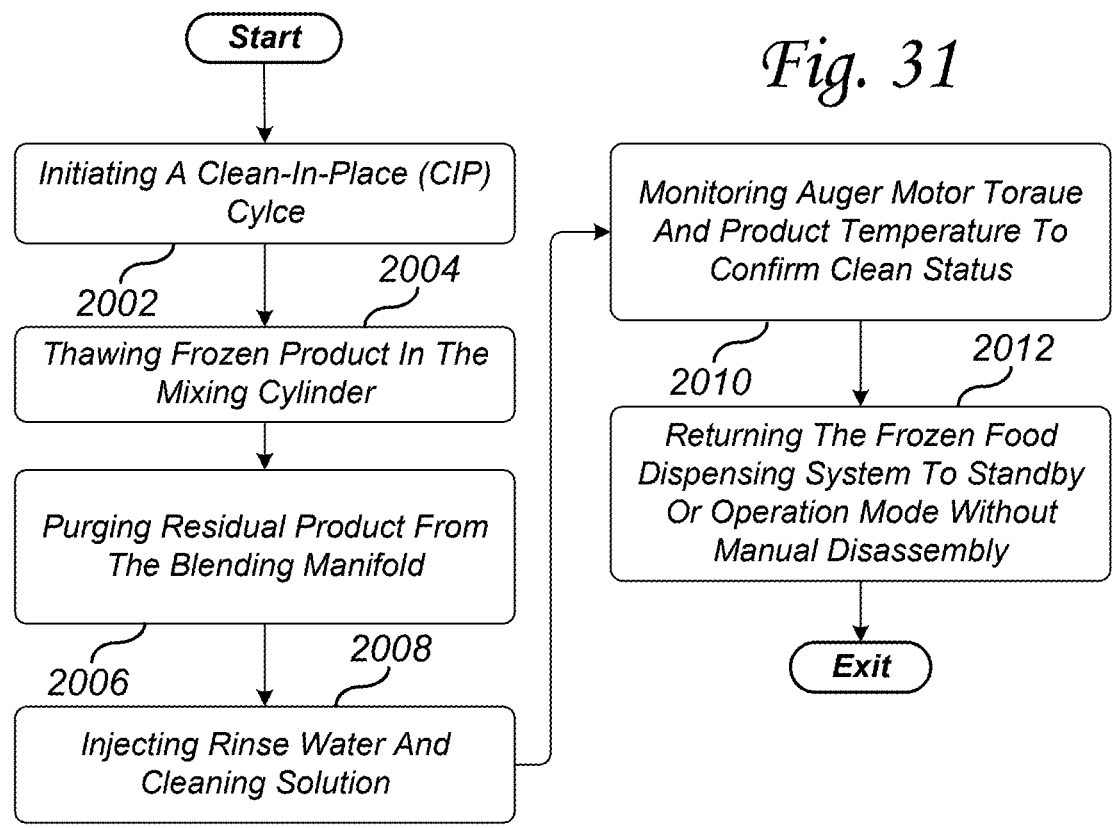

FULLY AUTOMATED FROZEN BEVERAGE AND SOFT SERVE SYSTEM

CROSS-REFERENCE TO RELATED APPLICATIONS

This application contains subject matter that is related to the subject matter of the following co-pending applications. The below-listed applications are hereby incorporated herein by reference in their entirety:

This is a U.S. non-provisional application that is a continuation in part of a U.S. non-provisional application, Ser. No. 17/846,653, inventor Jeffrey D. Resnick et al., entitled "AUTOMATIC VISCOSITY CONTROL SYSTEM FOR FOOD PRODUCTS DISPENSED FROM FROZEN BEVERAGE AND SOFT-SERVE ICE CREAM EQUIPMENT", filed Jun. 22, 2022, and a U.S. non-provisional application, Ser. No. 19/023,706, inventor Jeffrey D. Resnick et al., entitled "INGREDIENT BLENDING SYSTEM AND METHOD", filed Jan. 16, 2025.

TECHNICAL FIELD OF THE INVENTION

This invention relates to automated food preparation and dispensing systems, and particularly to systems for blending, freezing, and dispensing frozen food products using dynamic viscosity control and pressure-managed ingredient delivery. More specifically, the invention pertains to a fully integrated frozen food dispensing system that combines multi-source ingredient blending, compressor-cycled freezing, real-time torque and temperature monitoring, portion-controlled dispensing, and automated clean-in-place functionality—allowing for hygienic, consistent, and labor-free operation in commercial or unattended environments.

BACKGROUND OF THE INVENTION

Before our invention, frozen food dispensing systems were largely limited by mechanical, hygienic, and operational shortcomings that constrained their use in modern commercial and unattended environments. Despite increasing demand for compact, self-service frozen food kiosks, most existing systems were not equipped to function independently over extended periods without operator intervention.

Many prior approaches required frequent manual disassembly for cleaning and maintenance. Food-contact components such as augers, hoppers, and dispensing nozzles had to be removed, hand-washed, and reassembled. This process introduced multiple points of failure, including the risk of inadequate sanitation, improper reinstallation, and cross-contamination between cleaning cycles. For operators in high-throughput environments, this led to extended downtime and labor inefficiencies that often conflicted with health code mandates and internal safety protocols.

Another limitation of prior dispensing systems was the lack of intelligent control over product viscosity. Frozen food products require precise thermal regulation and mechanical agitation to maintain a malleable, spoonable, or extrudable consistency. In earlier systems, compressors typically operated based on simple time cycles or general ambient readings, without dynamic feedback from the food product itself. As a result, food often exited too soft or too solid, leading to overflows, incomplete fills, or mechanical strain on dispensing components. Operators were frequently tasked with adjusting timers, checking product condition manually, or discarding inconsistent batches.

Ingredient blending also posed significant limitations. Many systems relied on upstream blending or premixed bases, which restricted flexibility in portioning, limited flavor variation, and made on-the-fly recipe customization impractical. Those that did support inline mixing generally lacked real-time feedback mechanisms and relied on fixed ratios or operator input, making precise dosing of multiple ingredients difficult to achieve without waste or product deviation.

Cleaning automation, where available, was often incomplete. While some systems included limited rinse functionality, they typically required external hookups—such as additional hoses or third-party cleaning stations—or still required operator action to initiate or validate each step. These implementations fell short of a truly closed-loop clean-in-place (CIP) system, limiting deployment in environments where sanitation without supervision is critical.

Portion control in earlier systems also suffered from mechanical or time-based imprecision. Because product viscosity varied with freezer performance, ingredient composition, and usage patterns, dispensing valves that relied on fixed-open durations often underfilled or overfilled serving containers. There was no practical way for the system to sense the condition of the product and adjust dispense timing or valve operation accordingly. This led to inconsistent servings, nutritional labeling errors, and customer dissatisfaction.

Lastly, most legacy systems offered no meaningful data logging, remote monitoring, or adaptive functionality. As self-service food technology evolved, prior systems could not integrate with broader automation ecosystems or deliver compliance-ready data for cleaning cycles, temperature tracking, or performance diagnostics.

The present invention addresses these and other shortcomings by providing a frozen food dispensing system that overcomes the operational, hygienic, and control limitations inherent in earlier systems. For these reasons and shortcomings, as well as other reasons and shortcomings, there is a long-felt need that gives rise to the present invention.

SUMMARY OF THE INVENTION

The shortcomings of the prior art are overcome and additional advantages are provided through the provision of a frozen food dispensing system comprising a mixing cylinder configured to receive a food portion and a gas portion, an auger rotatable by an auger motor, a refrigeration system with a compressor thermally coupled to the mixing cylinder, and a manifold having a blending chamber, multiple ingredient inlets, and at least one ingredient egress port. A control system, including a microcontroller, memory, and a motor sensor, is configured to monitor auger motor performance—such as amperage draw or torque—and receive temperature input from at least one thermal sensor positioned in or near the mixing cylinder. Based on this data, the control system controls the compressor by comparing real-time motor metrics against predetermined performance thresholds, and also regulates ingredient blending within the manifold using pressure sensor readings and ingredient input ratios. By integrating auger motor resistance and temperature feedback, the system dynamically determines and maintains a target viscosity band, adjusting the compressor duty cycle in real time. This results in a more consistent, malleable frozen food product, while reducing the risk of over- or under-freezing, mechanical strain, and inconsistent dispensing performance.

Additional shortcomings of the prior art are overcome and additional advantages are provided through the provision of a frozen food dispensing system comprising a mixing cylinder containing a rotating auger and a dispense valve, and a control system including a microcontroller, memory, a temperature sensor, and a motor sensor. The control system is configured to receive a portion-controlled dispense request, determine the temperature and viscosity of the food product based on real-time sensor data, and query from memory a corresponding dispense time that accounts for the portion size, product temperature, and auger resistance. The system then operates the dispense valve for the determined duration, ensuring that a consistent portion of frozen malleable food product is delivered. This approach overcomes the imprecision of fixed-timing dispense methods by dynamically adjusting dispense parameters based on actual product condition, thereby improving portion accuracy, minimizing waste, and enhancing customer satisfaction.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1 illustrates examples of frozen beverage equipment and soft-serve ice cream equipment;

FIG. 12 illustrates one example of temperature, pressure, and amperage or torque charts;

FIG. 18 illustrates one example of a method of blending ingredients for use in frozen beverage equipment or soft-serve ice cream equipment;

FIG. 19 illustrates exemplary embodiments that can interchangeably be used with the methods of the present invention;

FIGS. 25-29 illustrate examples of a portion control method for food products dispensed from frozen beverage equipment and soft-serve ice cream equipment;

FIG. 30 illustrate exemplary embodiments utilized with the methods of the present invention; and FIG. 31 illustrates one example of a method of maintaining a frozen food dispensing system.

Figure 2:
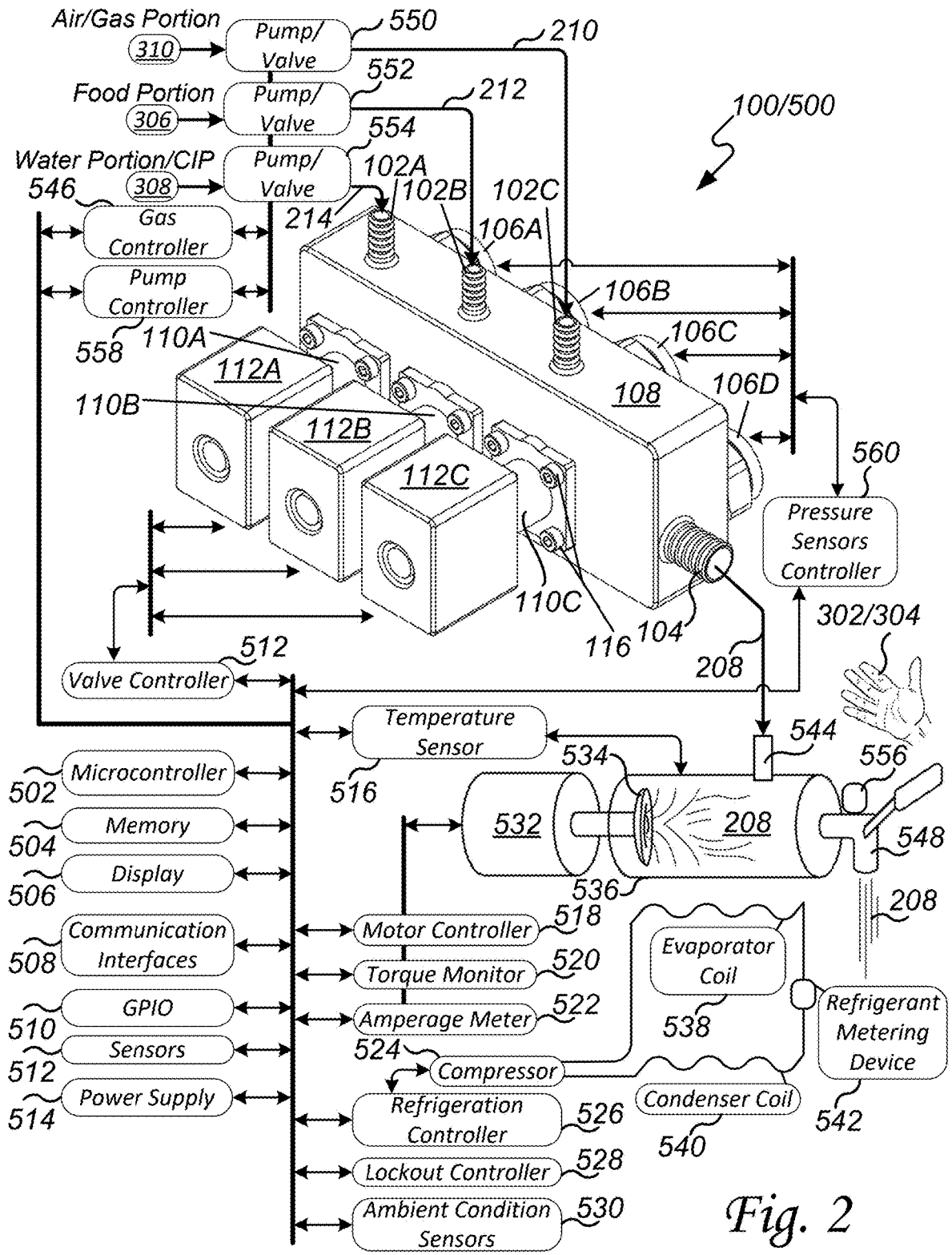
FIG. 2 illustrates one example of an ingredient blending system.

The detailed description explains the preferred embodiments of the invention, together with advantages and features, by way of example with reference to the drawings.

DETAILED DESCRIPTION OF THE INVENTION

The present invention uses nomenclature to indicate multiple mutually exclusive operating channels in the ingredient blending manifold 100. In a plurality of exemplary embodiments, there can be any number of electronic valves 110/112 and bending channels used with the ingredient blending manifold 100. As one exemplary embodiment, the Figures illustrate as an example and not a limitation three electronic valves 110A-C/112A-C. Each electronic valve 110A/112A, 110B/112B, and 110C/112C is mutually exclusive and independently operable. The electronic valve 110/112 nomenclature indicates that there is a valve base 110 which physically controls the flow of an ingredient through the valve base and a valve actuator 112 that 'OPENS' and 'CLOSES' the valve. The combination 110/112 forms the electronic valve that can be operated by way of a valve controller 570 under the control of microcontroller 502.

The present invention uses nomenclature to indicate multiple ingredients 306/308/310 and 210/212/214. Ingredient 310 on the supply side of the pump/metering device and ingredient 210 on the pumped/metered supply line side of the pump are the same. Ingredient 306 on the supply side of the pump/metering device and ingredient 212 on the pumped/metered supply line side of the pump are the same. Ingredient 308 on the supply side of the pump/metering device and ingredient 214 on the pumped/metered supply line side of the pump are the same.

The present invention uses nomenclature to indicate other multiple mutually exclusive operating components and channels associated with the ingredient blending manifold 100. In a plurality of exemplary embodiments, there can be any number of pressure sensors 106, pressure reservoirs 126, ingredient egress port 120, ingredient ingress port 122, mounting hole 114, and other components and features of the ingredient blending manifold 100, as may be required and/or desired in a particular embodiment.

For disclosure purposes, ingredients that can be mixed to form the food product 208 can include a combination of gas portion 310, food portion 306, or water portion 308. There can be more than one gas portion 310, or more than one food portion 306, as may be required and/or desired in a particular embodiment.

In the present invention, the term "mixing cylinder" is intended to mean a refrigerated chamber or tube in which a food product and gas are combined, agitated, and frozen to a malleable consistency suitable for dispensing.

In the present invention, the term "auger" is intended to mean a rotating helical or spiral component configured to mix and convey a semi-solid or frozen food product within the mixing cylinder.

In the present invention, the term "auger motor" is intended to mean an electric motor operably coupled to the auger to impart rotation for mixing and dispensing operations, wherein performance characteristics such as torque or amperage may be monitored for system control.

In the present invention, the term "manifold" is intended to mean a fluidic structure including one or more ingredient inlets, a blending chamber, and one or more ingredient egress ports, configured to combine liquid, syrup, gas, or cleaning inputs prior to transfer into the mixing cylinder.

In the present invention, the term "ingredient inlet" is intended to mean a connection point or conduit through which a liquid, gas, or concentrated ingredient is introduced into the manifold for blending.

In the present invention, the term "ingredient egress port" is intended to mean an outlet within the manifold through which blended ingredients exit toward the mixing cylinder or another destination.

In the present invention, the term "control system" is intended to mean an arrangement of hardware and/or software components, including a microcontroller, sensors, and memory, configured to monitor, control, and automate functions of the frozen food dispensing system.

In the present invention, the term "target viscosity range" is intended to mean a predefined range of food product resistance to flow, derived from parameters such as auger motor load and temperature, which corresponds to a desired serving consistency.

In the present invention, the term "clean-in-place (CIP)" is intended to mean a maintenance cycle in which internal food-contact components are automatically cleaned using injected rinsing and sanitizing fluids, without requiring disassembly or manual access.

In the present invention, the term "recipe pulse sequence" is intended to mean a control routine that cycles an ingredient valve open and closed based on pressure sensor input, to meter ingredient flow into the blending chamber with timed pulses.

In the present invention, the term "portion-controlled dispense" is intended to mean a dispensing action that delivers a predetermined quantity of food product, where the volume is based on a combination of time, auger resistance, mixing chamber pressure, and product temperature.

In the present invention, the term "passive ratiometric blending" is intended to mean a blending approach in which fixed flow ratios are achieved through component design (such as permanently open valve caps), without active valve modulation or feedback control.

In the present invention, the term "product pump" is intended to mean a pump fluidly connected to an ingredient supply and controlled by the system to deliver product into the manifold under metered conditions. In the present invention, the term "recipe pulse sequence" is intended to mean a programmatic actuation pattern applied to one or more valves to meter ingredients in timed intervals, based on pressure feedback and blend ratio targets. In the present invention, the term "blending chamber" is intended to mean an internal region of the manifold where two or more ingredients—such as liquids, syrups, gases, or cleaning solutions—are mixed under controlled conditions prior to delivery to the mixing cylinder.

In the present invention, the term "gas metering device" is intended to mean a controllable component configured to regulate the flow rate and volume of gas delivered to the blending manifold or mixing cylinder.

In the present invention, the term "cloud-based interface" is intended to mean a remote computing or data service that enables monitoring, logging, diagnostics, and control of the frozen food dispensing system via the internet or other network.

In the present invention, the term "standby mode" is intended to mean an operational state in which the system reduces freezing activity to allow the food product to gradually defrost while remaining within food-safe refrigerated temperature ranges. During standby mode, no active blending or dispensing occurs, but the product is kept in a condition suitable for later freezing and serving without compromising safety or quality.

In the present invention, the term "training mode" is intended to mean a mode of system operation in which dispense profiles are recorded and stored in memory for later use in optimizing future dispensing cycles based on actual performance and sensed conditions.

In the present invention, the term "surge pressure" is intended to mean a transient rise in internal system pressure caused by a sudden change in flow rate or valve state, which may impact dispense accuracy if not taken into consideration.

Turning now to the drawings in greater detail, it will be seen that in FIG. 1 there are illustrated examples of frozen beverage equipment and soft-serve ice cream equipment. Frozen beverage equipment 602 and soft-serve ice cream equipment 604 are commonly found in restaurants, quick-serve restaurants, convenience stores, and numerous other locations.

In an exemplary embodiment, each frozen beverage equipment 602 and soft-serve ice cream equipment 604 can comprise one or more separate mixing cylinders 536 that contain a food product 208. An ingredient blending manifold 100 receives a food portion 212 from a food portion supply 306 and a gas portion 210 that is either an air supply or a gas portion supply 310 that are combined to form the food product 208 which can be injected through a product inlet 544 into the mixing cylinder 536, chilled and dispensed by way of a dispense valve 548 by a user 302 or customer 304 for consumption. Selectively, in some exemplary embodiment, a water portion 214 from a water portion supply 308 can also be supplied. For disclosure purposes, the air supply and the gas portion supply, such as nitrogen, carbon dioxide, and other gases can both be referred to as the gas portion supply 310.

In an exemplary embodiment, when the frozen beverage equipment 602 or soft-serve ice cream equipment 604 is not in use to serve frozen beverages or soft-serve ice cream, a clean-in-place (CIP) function can be performed by providing a cleaning solution with or without additional water that is pumped through the ingredient blending manifold 100 and associated interconnected tubing or piping, as may be required and/or desired in a particular embodiment.

Each of the food portion 212, gas portion 210, and selectively water portion 214 are ratiometrically blended in the ingredient blending manifold 100 and then injected into the mixing cylinder 536 so that the percentage proportion of each ingredient portion to the other is maintained. The food product 208 is chilled in the mixing cylinder 536 and dispensed through a dispense valve 548. Such food product 208 dispensing can be automated and portion-controlled or effectuated by a user 302 or customer 304 manually.

The term "ratiometrically" or "ratiometric", in the present invention, is intended to mean two or more ingredients, portions, or other contents being mixed in a continuous predefined ratio regardless of the total volume being mixed forming a ratiometric mixture, such as food product 208. Such portions can be the food portion 212, the gas portion 210, water 214, or other portions. Each ingredient, portion, or other content is mixed in a predefined ratio with respect to each of the other ingredients, portions, or other contents, as may be required and/or desired in a particular embodiment. In this regard, any volume of the final food product 208 mixture comprising the ingredients, portions, or other contents can be produced. Such gas portions can be air, carbon dioxide, nitrogen, or other gas portion.

The frozen beverage equipment 602 and soft-serve ice cream equipment 604 can be configured with any number of mixing cylinders 536 comprising the same or different kinds of food portions 212, gas portions 214, and thus food products 208. Illustrated in FIG. 1, as an example and not a limitation, frozen beverage equipment 602 is shown with two separate mixing cylinders 536 and dispense valves 548. Soft-serve ice cream equipment 604 is shown with two separate mixing cylinders 536 and dispense valves 548, and one additional dispense valve 562 that combines food products from both mixing cylinders 536 into a single dispense stream 564. This configuration is common where one mixing cylinder comprises, as an example, chocolate ice cream, the other mixing cylinder comprises, as an example, vanilla ice cream, and the additional dispense valve 562 dispenses 564 a mixture of chocolate and vanilla ice cream.

In operation, the food product 208 is blended in the ingredient blending manifold 100 as a food portion 212, a gas portion 210, and selectively a water portion 214 and then injected through a product inlet 544 into the mixing cylinder 536 and chilled to a predetermined frozen malleable consistency. A user 302 or customer 304 can then dispense the food product 208 by way of a dispense valve 548. The gas portion 210 can be air, carbon dioxide, nitrogen, or other types and kinds of gases, as may be required and/or desired in a particular embodiment. In an exemplary embodiment, gases such as carbon dioxide, and other gasses can be injected into the ingredient blending manifold 100 and thus the mixing cylinder 536 at a sufficient pressure to cause the gas to dissolve into the food portion 212 resulting in the food product 208 becoming carbonate in the case of dissolved carbon dioxide gas, or otherwise imbibed, or infused with the gas.

Referring to FIG. 2, there is illustrated one example of an ingredient blending system 100/500. The ingredient blending system comprises an ingredient blending manifold 100, and a control system 500 is interconnected with other components, including at least one mixing cylinder 536 with food product 208 dispensing capabilities.

In an exemplary embodiment, the ingredient blending manifold 100 comprises a manifold body 108, more than one of an inlet conduit 102A-C through which ingredients such as an air/gas portion 210 from an air/gas supply 310, a food portion 212 from a food portion supply 306, and a water portion 308 from a water portion supply 308 enter the manifold body 108 through inlet conduits 102A-C. The ingredient blending manifold 100 further comprises more than one pressure sensor 106A-D. The pressure sensors 106A-D are configured to measure the pressure of each ingredient 210/212/214 that enters through the inlet conduits 102A-C, and the blended food product 208 that exits the manifold body 108 blending chamber 128 through the food product egress conduit 104.

The ingredient blending manifold 100 further comprises more than one electronic valve 110A-C/112A-C. The electronic valves 110A-C/112A-C are secured to the front side of the manifold body 108 such that when one or more of an electronic valve 110A-C/112A-C is in the 'OPEN' position the respective ingredient 210/212/214 passes into the blending chamber 128, which is internal to the manifold body 108, where it is blended with other ingredients 210/212/214 to form the food product 208. In the alternative, when an electronic valve 110A-C/112A-C is in the 'CLOSED' position the respective ingredient 210/212/214 is prevented from entering the blending chamber 128. The blending chamber 128 is better illustrated in at least FIG. 4.

In an exemplary embodiment, the electronic valve 110A-C/112A-C can comprise a valve body 110A-C that is fastened to the manifold body 108 by fasteners 116 and an actuator 112A-C which when energized transitions a valve within the valve body 110 between an 'OPEN' and a 'CLOSED' position. The 'OPEN' position allows ingredients 306/308/310 to enter the blending chamber 128 and the 'CLOSED' position abates the flow of ingredients 306/308/310 from entering the blending chamber 128. In operation, one electronic valve 110A/112A, 110B/112B, or 110C/112C controls the flow of one ingredient 310, 306, or 308, thus multiple electronic valves are required to be able to control multiple ingredient supply lines.

In an exemplary embodiment, control system 500 can be integrated into and control frozen beverage equipment 602 and soft-serve ice cream equipment 604. In addition, control system 500 can be a web-enabled control system.

The term "web-enabled" or "web-enabled control system" or "web-enabled control system 500" in the present invention is intended to mean an Internet-of-Things (IoT) device. In this regard, a device that is capable of connecting a physical device such as the frozen beverage equipment 602 and soft-serve ice cream equipment 604 to the digital world. Stated differently, web-enabling is equipping a device with the necessary electronics and software to be monitored, controlled, and data communicate locally and remotely with other data communicating devices. Such other data communicating devices can be smartphones, tablets, laptops, mobile communication devices, other web-enabled devices, servers, and similar devices.

In addition, such data communicating devices 706 can data communicate with remote data processing resources 704 and utilize data storage resources 702. Laptops, smartphones, smartwatches, tablets, desktop computers, servers, mobile communication devices, and other types and kinds of data communication devices can all be referred to as data communicating devices 706.

In operation, a user 302, or a customer 304 can use data communicating devices 706 to interact with the frozen beverage equipment 602 and soft-serve ice cream equipment 604. In this regard, a user 302 can be a person who operates, maintains, cleans, configures, repairs, and performs other functions on or with the frozen beverage equipment 602 or soft-serve ice cream equipment 604. A customer 304 can be a person who self-serve dispenses food product 208. The digital experience and interaction with the frozen beverage equipment 602 and soft-serve ice cream equipment 604 by the user 302, and customer 304 can be different and suited for their various roles and requirements, as may be required and/or desired in a particular embodiment.

Such data processing resources 704 can be a server or other types and kinds of data processing resources. Furthermore, data communicating devices 706, remote data processing resources 704, data storage resources 702, and other types and kinds of data communicating devices can data communicate over a global network 700. The Internet is a global network 700.

In an exemplary embodiment, the frozen beverage equipment 602 and soft-serve ice cream equipment 604 can be equipped with a web-enabled control system 500. Such a web-enabled control system can comprise a microcontroller 502 which is operationally related to a valve controller 570, a plurality of communication interfaces 508, a power supply 514, a gas controller 546, a pump controller 558, a display 506, general-purpose inputs and outputs (GPIO) 510, sensors 512, motor controller 518, a memory 504, a torque monitor 520, an amperage meter 522, a refrigeration controller 526, a temperature sensor 516, ambient sensors 530, and a lockout controller 578.

The microcontroller 502 can be INTEL, ZILOG, MICROCHIP, AMD, ARM, and/or other types or kinds of microcontrollers.

The memory 504 can be a combination of RAM, ROM, flash, hard drives, solid-state drives, USB flash drives, and/or other types and kinds of memory.

The display 506 can be an LCD, OLED, LED, as well as have touch input capabilities and/or other types and kinds of displays and user inputs as may be required and/or desired in a particular embodiment.

The communication interface 508 can be LAN, WAN, USB, Ethernet, RS232, RS485, serial, WiFi, 802.11abgn and similar, 2G 3G 4G 5G compatible, Bluetooth, TCP, UDP, Mesh Network, Zigbee, Pico Network, LORAN, and/or other types and kinds of communication interfaces and protocols.

In an exemplary embodiment, the communication interface 508 is operationally related to the microcontroller 502. The control system by way of the communication interface 508 data communicates with the remote data processing resource 704, data communication devices 706, remote service provider 306 networks, quick-server restaurant networks, other frozen beverage equipment 602 and soft-serve ice cream equipment 604, in a local area network environment or a wide area network environment across a global network 700 in a wired or wireless manner as may be required and or desired in a particular embodiment. The Internet is a global network 700.

The power supply 514 can be AC, DC, battery, solar, and/or other types and kinds of power supplies.

The pump controller 558 can be a relay, MOSFET, or other types and kinds of controlling devices. In operation, the pump controller 558 interconnects with and is operationally related to one or more pumps 552/554 that transfer the food portion supply 306/212 and the water or clean-in-place (CIP) solution supply 308/214 to the ingredient blending manifold 100. In an exemplary embodiment, the food portion 306 pump/valve 552 and the water portion 308 water pump/valve 554 can include pressure regulating valves limiting the inlet pressure to a desired and fixed pressure and flow rate from their respective food portion 306 and water portion 308 sources. As such, the pump/valve 552/554 can pump to create flow and/or regulate the pressure to induce the desired and predictable flow rate. The pump/valve 552/554 can be 'OPENED' turned 'ON' and/or 'CLOSED' turned 'OFF' to control the food portion 306 and water portion 308 flows. In addition, pump/valve 552/554 can also comprise one-way valves to limit water and/or food portion flow to a single direction and prevent backfilling.

The gas controller 546 can be a relay, MOSFET, metering device, or other types and kinds of controlling devices. In operation, the gas controller 546 interconnects with and is operationally related to one or more gas metering devices or pumps 550 that transfer air or gas 310 to the ingredient blending manifold 100. Such gas portions can be air, carbon dioxide, nitrogen, or other gas portions.

The valve controller 570 can be a relay, MOSFET, or other types and kinds of controlling devices. In operation, the valve controller 570 interconnects with and is operationally related to one or more electronic actuators 112A-C that 'OPEN' and 'CLOSE' the valve bodies 110A-C, allowing ingredients to be transferred into the blending chamber 128. Such electronic actuators can be solenoids or other types and kinds of actuators, as may be required and/or desired in a particular embodiment.

The motor controller 518 can be a relay, MOSFET, variable frequency drive controller (VFD), or other types and kinds of motor control devices.

The torque monitor 520 can be a communication interface that communicates with a motor controller such as a VFD motor controller or other motor controllers that provides information about the motor performance that can include a torque metric determination or other motor performance data such that the control system 500 can calculate the torque of the auger motor 532 resultant from the torque on the auger 534 turning through the food product 208. In an exemplary embodiment, analog-type sensor determinations can be converted to digital values so that the microcontroller 502 can process the data. Alternatively, the microcontroller 502 can perform analog-to-digital conversions if equipped to perform such functions.

In another exemplary embodiment, torque can be measured mechanically by having a force of the food product 208 mixed in the mixing cylinder 536 applied to a lever that increasingly displaces as the food product 208 transitions to a predetermined frozen malleable consistency. The amount of displacement of the lever can be measured by the torque monitor 520 automatically electronically to determine a relative torque reading that can then be used in the methods of the present invention.

The amperage meter 522 can be a current transformer such as a torrid coil winding having one of the auger motor electrical wires running through the center of the torrid coil, or other types and kinds of electrical current sensing techniques and/or devices. In an exemplary embodiment, analog-type sensor determinations can be converted to digital values so that the microcontroller 502 can process the data. Alternatively, the microcontroller 502 can perform analog-to-digital conversions if equipped to perform such functions.

A refrigeration system comprises the refrigeration controller 526. The refrigeration controller 526 can be a relay, MOSFET, or other types and kinds of refrigeration controlling devices. The refrigeration system further comprises a compressor 524 that is interconnected with and operationally related to the refrigeration controller 526. The compressor 524 circulates the refrigerant through a condenser coil 526, a refrigerant metering device 542 such as an expansion valve, and an evaporate coil 538. In operation, the refrigeration system chills the food product 208 in the mixing cylinder 536 to a predetermined frozen malleable consistency. The refrigeration system can use a variety of refrigerant types including for example thermoelectric such as Peltier and others, vapor-compression, non-vapor-compression, and other types and kinds of refrigeration system, as may be required and/or desired in a particular embodiment.

The temperature sensor 516 can be positioned and configured to measure the temperature of the food product 208 within the mixing cylinder 536. Such a temperature sensor 516 can be a resistive temperature (RTD), thermistor, infrared, integrated silicon-based, or other types and kinds of temperature sensors as may be required and/or desired in a particular embodiment. In an exemplary embodiment, analog-type sensor determinations can be converted to digital values so that the microcontroller 502 can process the data. Alternatively, the microcontroller 502 can perform analog-to-digital conversions if equipped to perform such functions.

In an exemplary embodiment, a user interface comprises at least one of the following a display 506, a display 506 with touchscreen, a communication interface 508 configured to data communicate with a digital computing device 706, a plurality of button input capabilities by way of the GPIO 510, or other user interfaces. The user interface is operationally related to the microcontroller 502 such that a user 302 or customer 304 can enter the portion-controlled dispense amount volume by way of the user interface.

The pressure sensor control is interconnected with and operationally related to a plurality of pressure sensors 106A-D. In an exemplary embodiment, a pressure sensor 106A-D can be diagram displacement-based, strain gauge, variable capacitance, resistive, piezoelectric, micro-electrical mechanical system (MEMS), and/or other types and kinds of pressure sensors, as may be required and/or desired in a particular embodiment. In an exemplary embodiment, analog-type sensor determinations can be converted to digital values so that the microcontroller 502 can process the data. Alternatively, the microcontroller 502 can perform the analog-to-digital conversions if equipped to perform such functions.

The GPIO 510 can be TTL, CMOS, transistors, buffers, relays, pushbutton, switch, and/or other types and kinds of GPIO circuits.

The sensors 512 can be PIR motion sensors, infrared, thermal, Doppler radar, ultrasonic, capacitance, touch-type, optical, Hall effect, switch, fingerprint, and other types of biometric sensors, and/or other types and kinds of sensors. In an exemplary embodiment, analog-type sensor determinations can be converted to digital values so that the microcontroller 502 can process the data. Alternatively, the microcontroller 502 can perform analog-to-digital conversions if equipped to perform such functions.

The ambient condition sensors 530 can be temperature, moisture, humidity, sunlight, time, date, and/or other types and kinds of sensors. In an exemplary embodiment, analog-type sensor determinations can be converted to digital values so that the microcontroller 502 can process the data. Alternatively, the microcontroller 502 can perform analog-to-digital conversions if equipped to perform such functions.

A lockout controller 578 can be a relay, MOSFET, solenoid, or other types and kinds of lockout controlling devices. In operations, a dispense lock 556 is operationally related to a lockout controller 578. The dispense lock 556 can be a solenoid or other types or kinds of dispense locks, as may be required and/or desired in a particular embodiment. The dispense lock 556 can operate in at least two distinct configurations. First, the dispense lock 556 can unlock the dispense valve 548 for normal operation, allowing a user 302 or a customer 304 to dispense the food product 208 when the temperature and/or the viscosity of the food product 208 is optimum, and as required other parameters indicate the food product 208 is ready to be served. In the alternative, the lockout controller 578 can lock the dispense valve 548 preventing food product 208 dispense when the food product 208 is not ready to be served. The second manner of operation can be enabling an automated dispense valve 548. In this configuration, the dispense lock 556 can be coupled to a dispense valve 548 where activation causes the dispense valve 548 to 'OPEN' allowing the food product 208 to egress the mixing chamber 536. In the alternative when the dispense lock 556 is deactivated the dispense valve 548 is 'CLOSED' such that the food product 208 is prevented from egressing the dispense valve 548. Such automated food product 208 dispense control is useful in quick-serve restaurant applications, portion control applications, and other applications.

Figure 3:
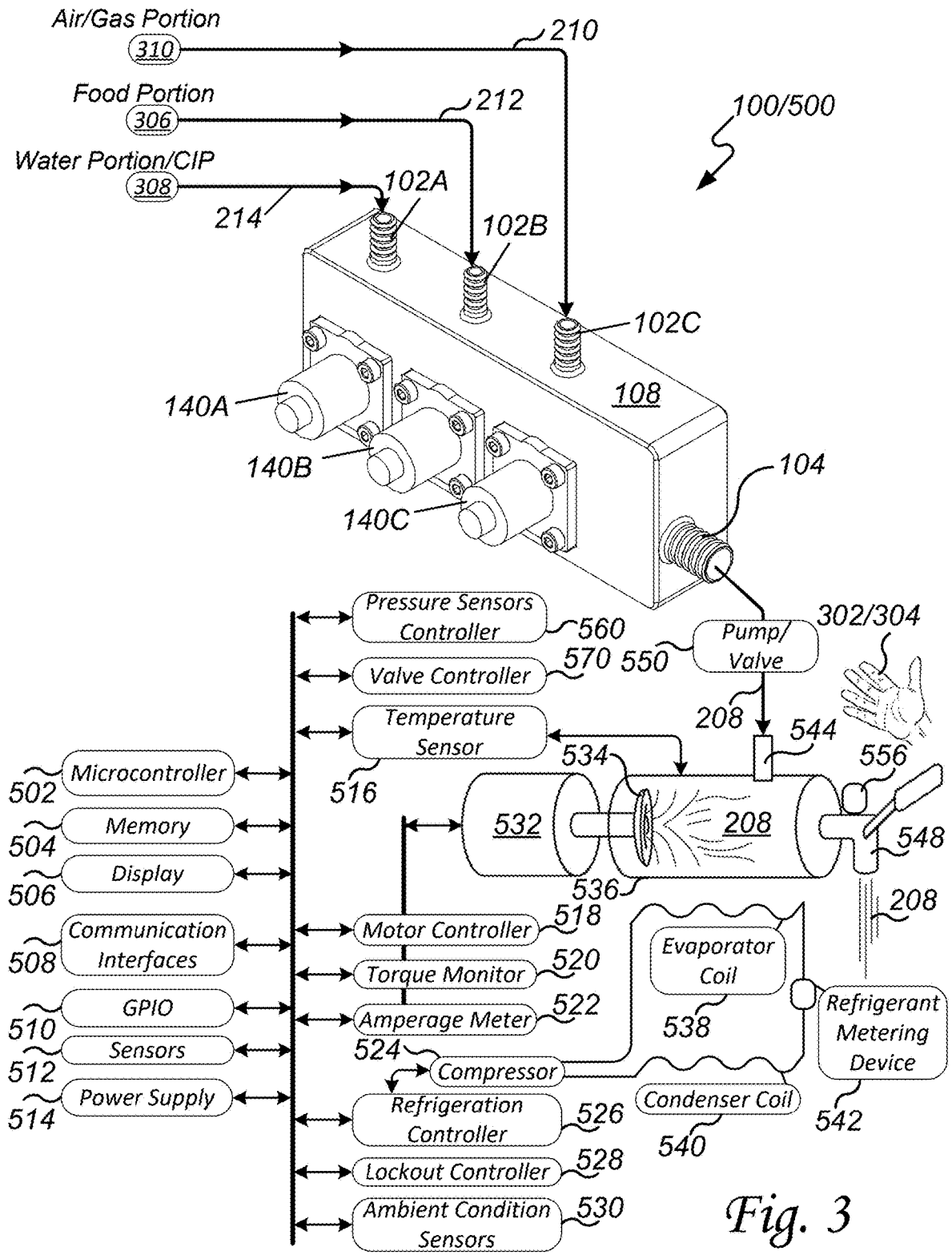
FIG. 3 illustrates one example of an ingredient blending system configured for egress port pump applications.

Referring to FIG. 3, there is illustrated one example of an ingredient blending system configured for egress port pump applications. In this exemplary embodiment, the system incorporates a manifold body 108 that facilitates blending multiple ingredients 306/308/310 through suction created by a pump 550 connected to an egress port 104. This configuration eliminates the need for positive pressure pumps at the ingredient inlet conduits 102A-C, simplifying the overall system architecture and enhancing reliability.

The manifold body 108 includes a blending chamber 128 where ingredients are mixed to form a food product 208. A plurality of ingredient inlet ports 130/132/134 can be positioned to receive ingredients such as food portions 306, gas portions 310, and water portions 308 through corresponding inlet conduits 102A-C. The ingredient inlet ports are connected to pressure reservoirs 126A-C, which temporarily store the ingredients before they are directed into the blending chamber 128. The blending chamber 128 is also in fluid communication with a plurality of ingredient egress ports 120A-C and corresponding ingredient ingress ports 122A-C.

In this embodiment, at least one ingredient egress port 120A-C is fitted with a valve cap 140. The valve cap 140 is a non-electronic component that maintains the corresponding egress port in a permanently open position, allowing continuous fluid communication between the corresponding ingredient egress port 120 and ingredient ingress port 122. By configuring the diameters of the ingredient egress ports 120A-C and ingress ports 122A-C, the system achieves ratiometric mixing of ingredients, ensuring precise proportions are maintained within the blending chamber 128. For instance, the diameter of an ingredient egress port 120C associated with a food portion 306 may be smaller than that of a water portion 308 to regulate the mixing ratio effectively.

The pump 550, connected to the egress port 104, creates negative pressure within the manifold body 108, effectively drawing ingredients 306/308/310 from the inlet conduits 102A-C through the pressure reservoirs 126A-C and into the blending chamber 128. This suction-based operation reduces system complexity by eliminating the need for individual pumps or positive pressure mechanisms at each ingredient supply line. Additionally, the system supports dynamic ingredient flow control by selectively combining valve caps 140 and electronic valves 110A-C/112A-C. For example, certain egress ports 120A-C may be equipped with electronic valves 110A-C/112A-C to enable on-demand flow control, while others utilize valve caps 140 for continuous operation.

In an exemplary embodiment, the pressure sensors 106A-D integrated into the pressure reservoirs 126A-C to monitor ingredient pressures can be used with the valve caps 140A-C or all or some of the pressure sensors 106A-D can be replaced with sensor caps 142A-D to further simplify the system and reduce electronic component reliance. When pressure sensors 106A-D are used, they provide critical data for controlling ingredient flow and ensuring consistent blending. In the absence of electronic monitoring, sensor caps 142A-D maintain the integrity of the pressure reservoirs 126A-C, allowing fluids to accumulate and flow as required.

In one embodiment, the blending chamber 128 is designed to mix ingredients 306/308/310 in predefined ratiometric proportions. The diameters of the ingredient egress ports 120A-C and ingress ports 122A-C can be configured to control these ratios, allowing precise control over the composition of the blended food product 208. The manifold body 108 can support multiple configurations, enabling customization for various ingredient types and applications. For example, a gas portion 310 can be introduced alongside liquid ingredients 306/308 to achieve specific texture or carbonation effects in the food product 208.

In another embodiment, the system allows selective use of electronic valves 110A-C/112A-C and valve caps 140. For applications requiring frequent changes in ingredient flow, electronic valves 110A-C/112A-C may be employed to provide precise control. Conversely, valve caps 140 can be used for ingredients with a constant flow requirement, reducing system complexity and maintenance needs.

The system also supports a variety of ingredient supply configurations. A single ingredient 306/308/310 may be routed through multiple inlet conduits 102A-C to achieve higher flow rates or blended using different proportions in separate chambers. This flexibility makes the system adaptable to diverse food and beverage production environments.

For enhanced usability, the system can include a control interface 500 that integrates with the pressure sensors 106A-D and electronic valves 110A-C/112A-C. This interface allows operators to monitor and adjust ingredient flows in real-time, ensuring consistent product quality. In embodiments using sensor caps 142A-D, the control interface 500 can still provide basic operational monitoring and error detection.

The pump-driven suction mechanism offers significant advantages for maintenance and cleaning. A cleaning solution can be introduced through the inlet conduits 102A-C, circulating through the manifold body 108 and blending chamber 128 to ensure thorough sanitation. The absence of active pumping components at the inlet conduits minimizes the risk of blockages and simplifies the cleaning process.

In yet another embodiment, the system is designed for scalability. Additional inlet conduits 102A-C, egress ports 120A-C, or blending chambers 128 can be integrated into the manifold body 108 to accommodate a broader range of ingredients 306/308/310 or higher production volumes. Each additional component can be equipped with a valve cap 140 or an electronic valve 110A-C/112A-C, sensor cap 142, or pressure sensors 106, depending on the specific application requirements.

The manifold body 108, valve caps 140A-C, sensor caps 142A-D can be constructed from durable, food-safe materials such as stainless steel or high-grade polymers. This ensures compliance with food safety standards and enhances the system's durability in high-demand environments. The components, including valve caps 140A-C and sensor caps 142A-D, can be designed for easy replacement, reducing downtime during maintenance.

This embodiment of the ingredient blending system offers a robust, versatile solution for applications in frozen beverage equipment and soft-serve ice cream equipment. By combining valve caps 140, sensor caps 142, suction-based operation via pump 550, and flexible configurations, the system addresses key challenges in ingredient mixing, such as maintaining precise ratios, reducing component complexity, and supporting diverse ingredient types. The use of valve caps 140 and sensor caps 142A-D ensures operational efficiency while minimizing electronic dependencies, making the system suitable for high-demand commercial environments.

Figure 4:
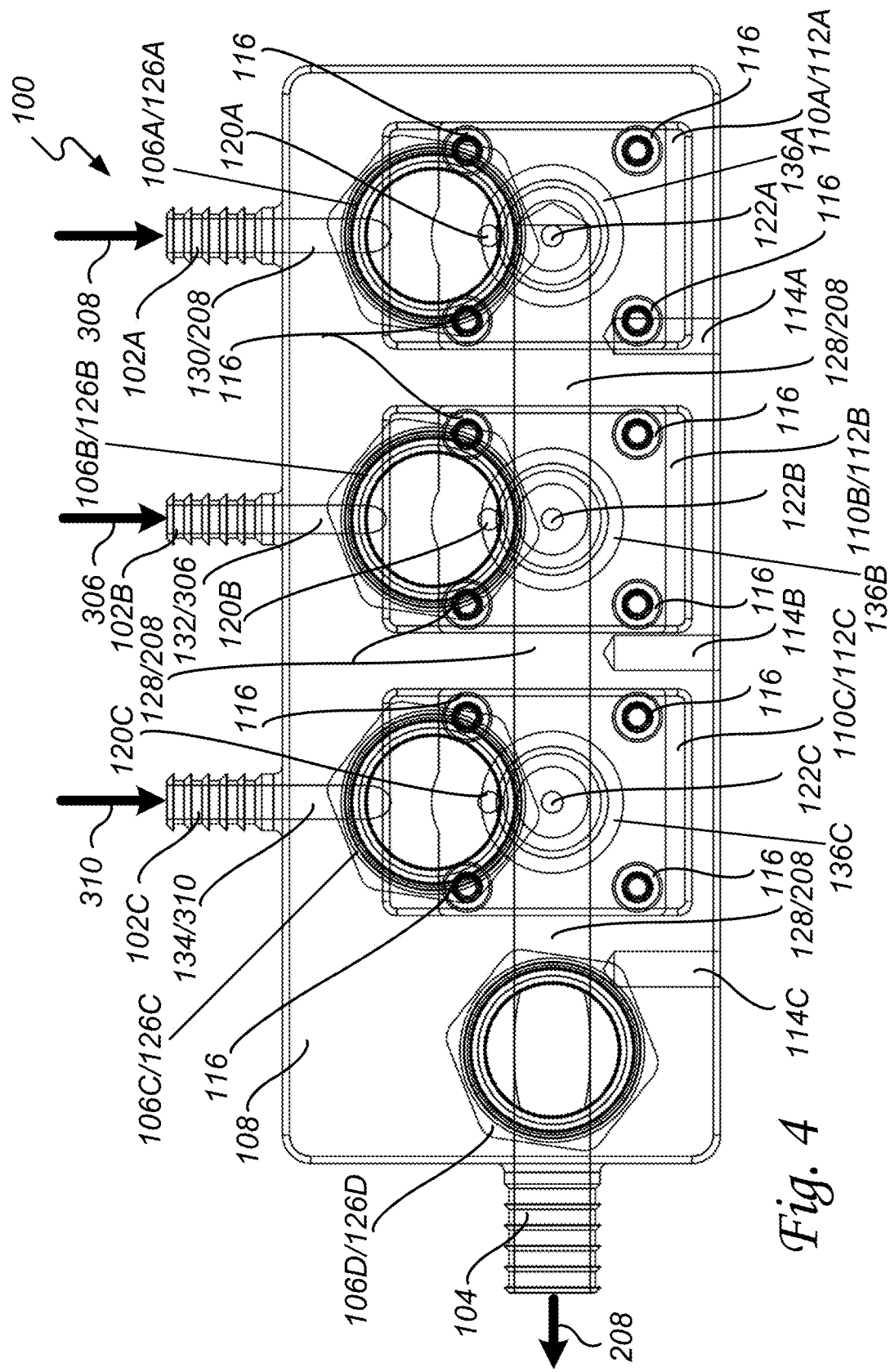
FIG. 4 illustrates one example of an inside view of an ingredient blending manifold that shows the internal ingredient flow and blending chamber pathways.

Referring to FIG. 4, there is illustrated one example of an inside view of an ingredient blending manifold 100 that shows the internal ingredient flow and blending chamber 128 pathways. In an exemplary embodiment, an ingredient blending system 100/500 can be used in frozen beverage equipment 602 and soft-serve ice cream equipment 604. The ingredient blending system 100/500 comprises a manifold body 108 having at least one blending chamber 128, a front side, a backside, and a top side. The top side has more than one ingredient inlet port 102A-C. The backside has more than one pressure reservoir 126A-D. The front side has more than one ingredient egress port 120A-C that intersects the pressure reservoir 126A-C and more than one ingredient ingress port 122A-C that intersects the blending chamber 128.

More than one of an inlet conduit 102A-C is fastened to each of the ingredient inlet port 130/132/134 wherein an ingredient supply line 210/212/214 can be interconnected with the inlet conduit 102A-C and supplies one or more of an ingredient 306/308/310 by injecting the ingredient 306/308/310 into the manifold body 108 through the ingredient inlet port 102A-C.

More than one pressure sensor 106A-D is secured within each of the pressure reservoirs 126A-D. The ingredient inlet ports 130/132/134 intersect the pressure reservoir 126A-C allowing the ingredients 306/308/310 to enter the pressure reservoir 126A-C. The blending chamber 128 intersects more than one of the pressure sensor reservoirs 126A-C.

More than one electronic valve 110A-C/112A-C is secured to the front side of the manifold body 108 such that when the electronic valve 110A-C/112A-C is in the 'OPEN' position the ingredient 306/308/310 passes from the pressure reservoir 126A-C out of the ingredient egress port 120A-C, along the front side of the manifold body 108 under the electronic valve 110A-C/112A-C through the ingredient ingress port 122A-C and into the blending chamber 128 forming a food product 208. And, when the electronic valve 110A-C/112A-C is in the 'CLOSED' position the ingredient 306/308/310 is prevented from egressing the pressure reservoir 126A-C through the ingredient egress port 120A-C. At least one food product egress conduit 104 is fastened to the blending chamber 128 through which the food product 208 egresses the manifold body.

In an exemplary embodiment, the ingredients 310/306/06 traverse along the surface of the front side of the manifold body 108 between the ingredient egress port 120A-C and the ingredient ingress port 122A-C contained within an ingredient transfer void 136A-C that is temporarily created when the electronic valve 110A-C/112A-C is opened or otherwise energized.

In an exemplary embodiment, the manifold body 108 has a bottom side. The bottom side has at least one mounting hole 114A-C for receiving a fastener and securing the manifold body 108 in place within the frozen beverage equipment 602 or soft-serve ice cream equipment 604. The fastener can be a screw fastener such as fastener 116 or other types and kinds of fasteners, as may be required and/or desired in a particular embodiment.

In an exemplary embodiment, a food portion 306 is one of the ingredients and is interconnected by way of the ingredient supply line 212 with at least one of the inlet conduits 102B. A gas portion 310 is one of the ingredients and is interconnected by way of the ingredient supply line 210 with at least one of the inlet conduits 102C. The food product 208 comprises the gas portion 310 and the food portion 306.

In an exemplary embodiment, a water portion 308 is one of the ingredients and is interconnected by way of the ingredient supply line 214 with at least one of the inlet conduit 102A. The food product can comprise the water portion 308.

In an exemplary embodiment, a clean-in-place solution is interconnected with at least one of the inlet conduit 102A, wherein the ingredient blending system can be cleaned by injecting the clean-in-place solution. The clean-in-place solution can be a caustic solution, a mixture of a caustic solution and water, an aqueous ozonated water solution, or other types or kinds of solutions as may be required and/or desired in a particular embodiment.

Figure 5:
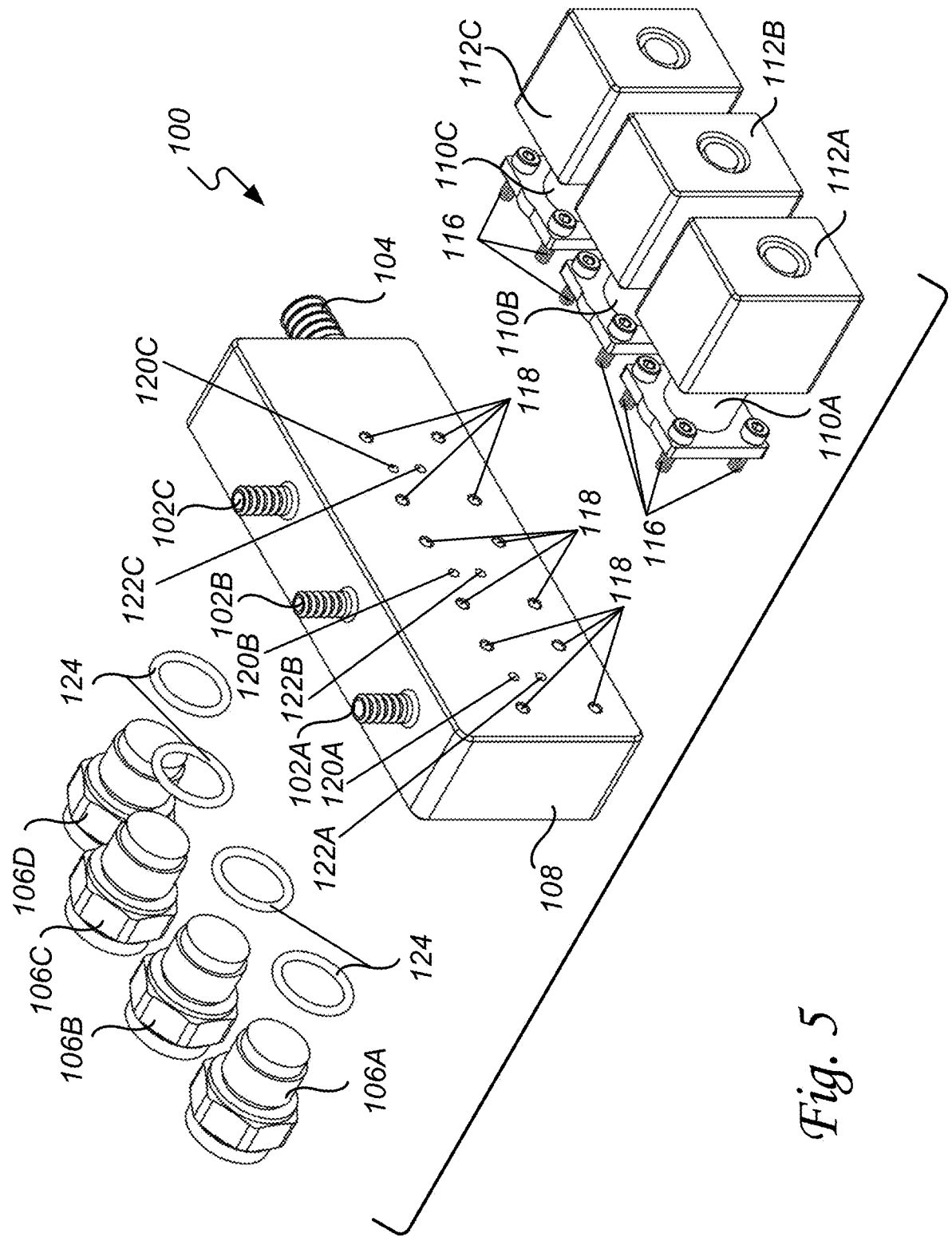
FIG. 5 illustrates one example of a disassembled ingredient blending manifold.

Referring to FIG. 5, there is illustrated one example of a disassembled ingredient blending manifold. With reference to FIG. 5, in an exemplary embodiment, mounting holes 118 can be threaded and positioned to engage fasteners 116 such as a screw or bolt in a manner that secures the electronic valve 110A-C/112A-C to the front side surface of the manifold body 108. Additionally, an o-ring 124 can be placed around each of the pressure sensors 106A-D when the pressure sensors 106A-D are secured to the manifold body 108. In this regard, the o-rings 124 prevent the ingredient 210/212/214 from leaking from the pressure reservoirs 126A-C under the pressure sensors 106A-C and from leaking from the blending chamber 128 that passes under the pressure sensor 106D.

The manifold body 108 has more than one ingredient egress port 120A-C that connects the front surface to the pressure reservoir 126A-C and more than one ingredient ingress port 122A-C that connects the front surface to the blending chamber 128. When secured to the manifold body, each of the electronic valves 110A-C/112A-C covers an ingredient egress port 120A-C and an ingredient ingress port 122A-C.

In this regard and with reference to FIG. 4, an ingredient 210/212/214 can be injected into an inlet conduit 102A-C and travels along the ingredient inlet port 130/132/134 pathway into the pressure reservoir 126 A-C. In the 'CLOSED' position the electronic valve 110A-C/112A-C blocks the ingredient egress port 120A-C preventing the ingredient 210/212/214 from exiting the pressure reservoir 126A-C. In the 'OPEN" position such as when energized, the electronic valve 110A-C/112A-C retracts creating a temporary ingredient transfer void 138A-C under the electronic valve 110A-C/112A-C that allows the ingredient 210/212/214 to exit the ingredient egress port 120A-C and traverse along the surface of the front side under the electronic switch 110A-C/112A-C contained within the ingredient transfer void 138A-C as not to leak, exiting the ingredient egress port 120A-C and entering the ingredient ingress port 122A-C.

In operation and with reference to at least FIG. 4, when the electronic valve 110A-C/112A-C is in the 'OPEN' position the ingredient 210/212/214 passes from the pressure reservoir 126A-C out of the ingredient egress port 120A-C, along the front side of the manifold body 108 under the electronic valve 110A-C/112A-C, through the ingredient ingress port 122A-C, and into the blending chamber 108 forming the food product 208. And when the electronic valve 110A-C/112A-C is in the 'CLOSED' position the ingredient 210/212/214 is prevented from egressing, from the pressure reservoir 126A-C, through the ingredient egress port 120A-C.

Figure 6:
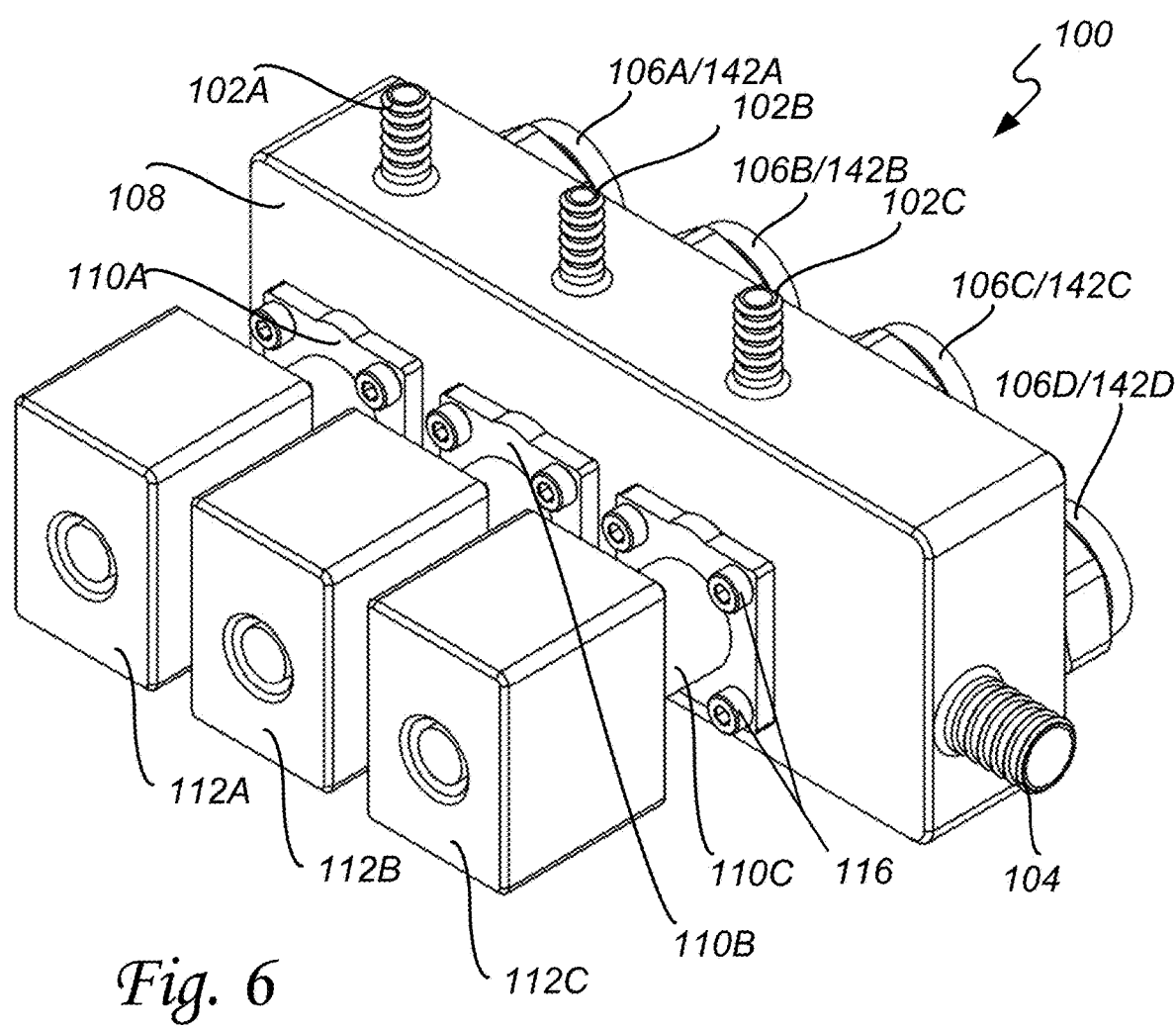
FIGS. 6-7 illustrate examples of an ingredient blending manifold.

Referring to FIG. 6, there is illustrated one example of a top front perspective view of an ingredient blending manifold 100. In an exemplary embodiment, the electronic valves 110A-C/112A-C are fastened by way of fasteners 116 to the front side of the manifold body 108.

Figure 7:
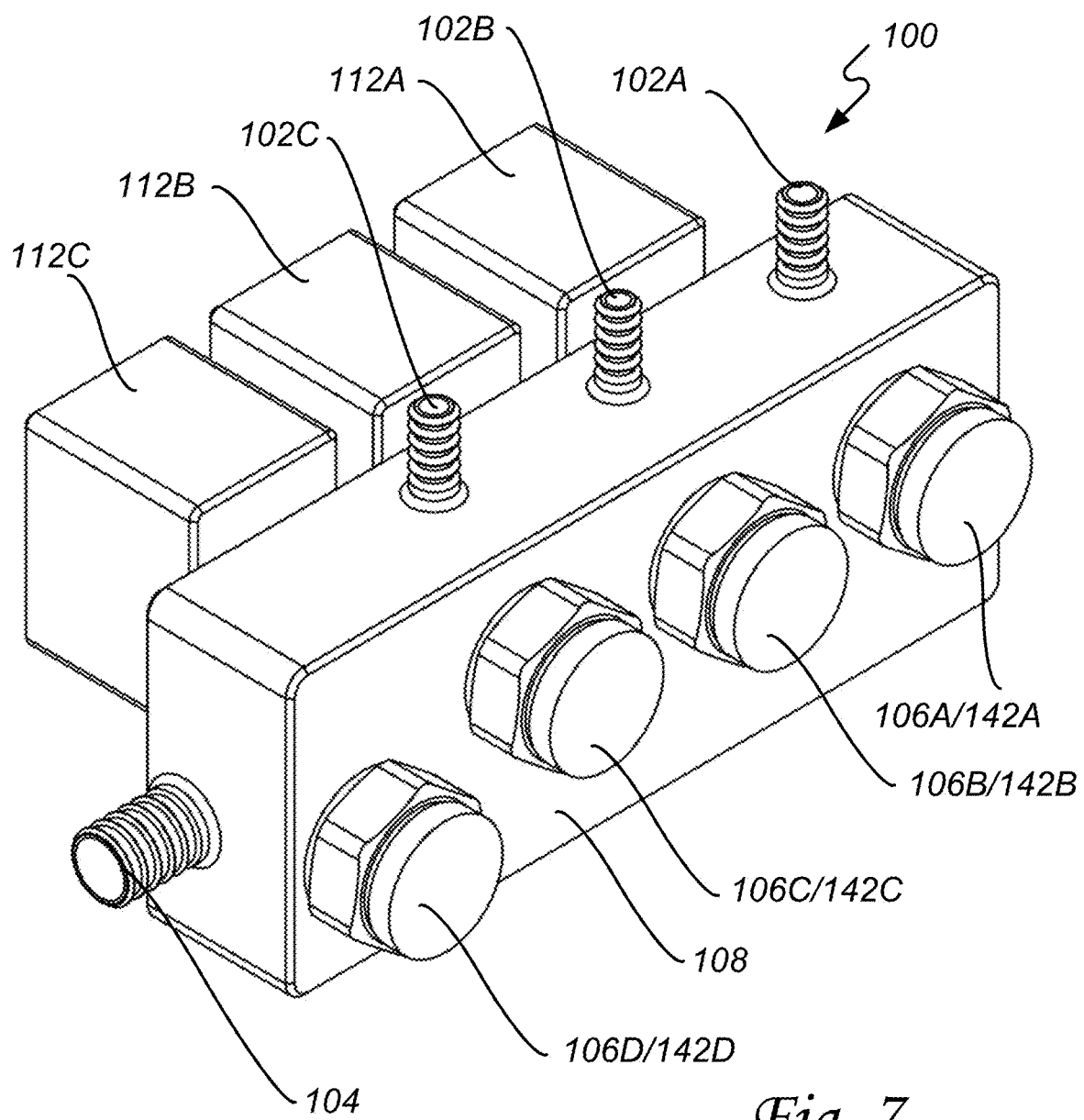

Referring to FIG. 7, there is illustrated one example of a top backside perspective view of an ingredient blending manifold 100. In an exemplary embodiment, pressure sensors 106A-D are secured within each of the pressure reservoirs 126A-D.

Figure 8:
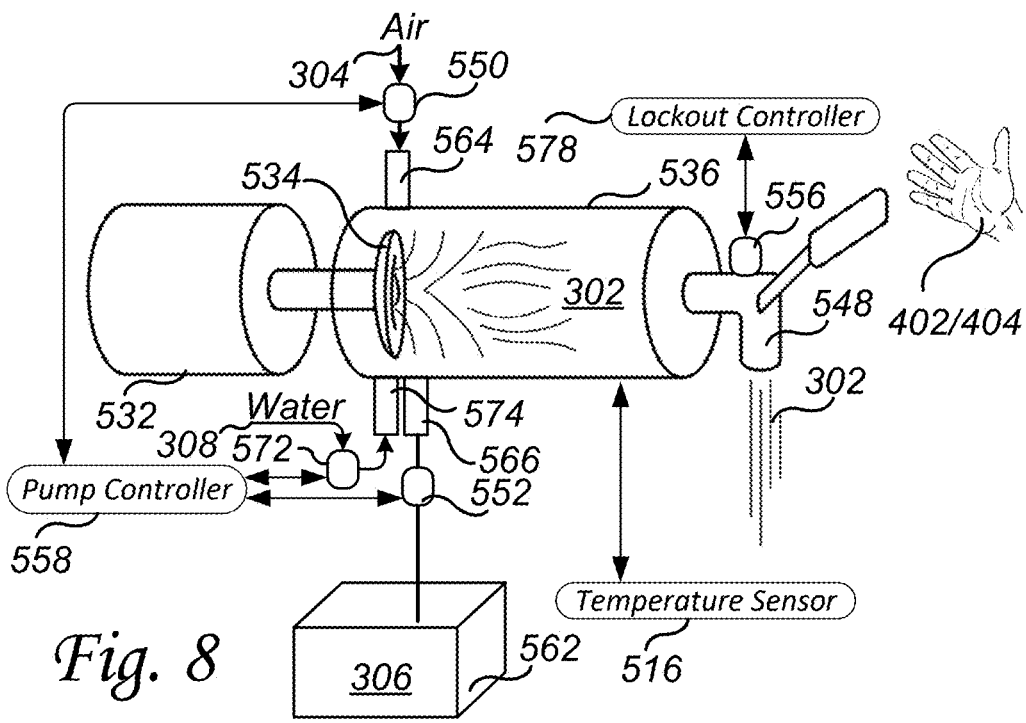
FIG. 8 illustrates one example of a system block diagram for frozen beverage equipment or soft-serve ice cream equipment using air as the gas portion.

Referring to FIG. 8, there is illustrated one example of a system block diagram for frozen beverage equipment 102 or a soft-serve ice cream equipment 104 using air 304 as the gas portion. In an exemplary embodiment, a mixing cylinder 536 comprises at least one auger 534, at least one product inlet 566 through which a food portion 306 is injected into the mixing cylinder 536, and at least one gas inlet 564 through which a gas portion 304 such as air, in this exemplary embodiment, is injected into the mixing cylinder 52. A food product 302 comprises the food portion 306, and the gas portion 304.

The gas inlet 564 can be interconnected with a pump/air tube 550. The pump/air tube 550 supplies air to the mixing cylinder 536 at a predetermined airflow rate so that the ratio of food portion 306, gas portion 304, the air in this exemplary embodiment, and optionally water portion 308 (in embodiments when needed) can be preset, ratiometrically mixed, and maintained each time the mixing cylinder 536 needs to replenish the food product, such as in an initial fill, and after a dispense.

Such air injection, by way of pump/air tube 550, can be under pump conditions wherein the air 304 is mechanically or otherwise forced into the mixing cylinder 536 up to the desired pressure, or the air 304 can be drawn into the mixing cylinder 536 absent a pump through an air tube as the food product 302 is dispensed. The diameter of the air tube can be selected, larger or smaller diameter, to effectuate the ratio of air to food portion 306, and optionally water portion 308, as may be required and/or desired in a particular embodiment.

In operation, it is the ratio of the air 304 to the food portion 306 and optionally to the water portion 308 that is important to preset and maintain as the ratio impacts the food product 302 quality. In other embodiments, the radiometric mixture of the air 304, food portion 306, and optionally the water portion 308 can be preset such that the ratio is maintained each time the mixing cylinder 536 is refilled thus maintaining product quality.

The product inlet 566 can be interconnected with a pump 552 and the pump 552 can be interconnected with a food portion 306 such that the pump 552 can pump the food portion 306 into the mixing cylinder 536. When energized, the pump 552 supplies the food portion 306 to the mixing cylinder 536 at a predetermined flow rate so that the ratio of food portion 306, gas portion 304, and water portion 308 (in embodiments when needed) can be preset, ratiometrically mixed, and maintained each time the mixing cylinder 536 needs to replenish the food product, such as in an initial fill, and after a dispense.

In an exemplary embodiment, a water inlet 574 can be interconnected with a pump 572 and the pump 572 can be interconnected with a water supply 308 such that the pump 572 can pump water 308 into the mixing cylinder 536. When energized, the pump 552 supplies the water 308 to the mixing cylinder 536 at a predetermined flow rate so that the ratio of water 308, food portion 306, and gas portion 304 can be preset, ratiometrically mixed, and maintained each time the mixing cylinder 536 needs to replenish the food product, such as in an initial fill, and after a dispense. In an exemplary embodiment, when water is needed, such as in diluting food portion 306 syrup, other for other needs, it can be supplied and mixed in a ratio with the food portion 306 and the gas portion 304.

In an exemplary embodiment, the pumps 550, 552, and 572 can each be interconnected with and operationally related to the pump controller 558. The pump controller 558 can independently control each of the pumps 550, 552, and 554. Such pumps 550, 552, and 554 types and kinds can be selected such that accurate metering of the respective gas portion 304, food portion 306, and, when needed, water portion 572 for recipe mixing purposes can be effectuated.

An auger motor 532 is interconnected with the auger 534. The auger 534 is positioned inside the mixing cylinder 536. The auger 534 can be a fan-style configuration, blade-style configuration, paddle-style configuration, spiral-spatula configuration, or other types and kinds of styles and configurations as may be required and/or desired in a particular embodiment.

A dispensing valve 548 can be operated automatically by way of the control 500 or manually by way of a user 402. When the dispense valve 548 is opened the food product 302 is dispensed from the mixing cylinder 536. The dispensed food product 302 is replaced by an equivalent portion of the food portion 306, the gas portion 304, and selectively the water portion 308.

A dispense lock 556 is operationally related to a lockout controller 578. The lockout controller 578 is operationally related to the microcontroller 502.

The control system 500 comprises the microcontroller 502, the pump controller 558, the temperature sensor 516, and the lockout controller 578.

In an automated viscosity control exemplary embodiment, a dispense lock 556 is operationally related to the microcontroller 502. The memory 504 is encoded with instructions that when executed by the microcontroller 502 transition between the steps of unlocking the dispense lock 556, allowing a user 402 or a customer 404 to dispense the food product 302 when the temperature of the food product 302 is between the predetermined low-temperature setting 208 and the predetermined high-temperature setting 206, and the amperage draw or the torque 214 of the auger motor 532 is between a predetermined low motor performance setting 216 and the predetermined high motor performance setting 218. And, locking the dispense lock 556, preventing the user 402 or the customer 404 from dispensing the food product 302, when the temperature of the food product 302 is below the predetermined low-temperature setting 208 or above the predetermined high-temperature setting 206, or the amperage draw or the torque 214 of the auger motor 532 is below the predetermined low motor performance setting 216 or above the predetermined high motor performance setting 218. The dispense lock 556 can comprise a solenoid, or other mechanisms as may be required and/or desired in a particular embodiment.

In a portion-controlled exemplary embodiment, a dispense lock 556 is operationally related to the microcontroller 502. The memory 504 is encoded with instructions that when executed by the microcontroller 502 transition between the steps of unlocking the dispense lock 556, allowing the food product 302 to be dispensed, when the temperature 204 of the food product 302 is between a predetermined low-temperature setting 208 and a predetermined high-temperature setting 206, and the amperage draw or the torque 214 of the auger motor 532 is between a predetermined low motor performance setting 216 and a predetermined high motor performance setting 218. And, locking the dispense lock 556 and queuing the portion-controlled dispense amount volume, preventing the food product 302 from being dispensed, when the temperature of the food product 302 is below the predetermined low-temperature setting 208 or above the predetermined high-temperature setting 206, or the amperage draw or the torque 214 of the auger motor 532 is below the predetermined low motor performance setting 216 or above the predetermined high motor performance setting 218. The dispense lock 556 can comprise a solenoid, or other mechanisms as may be required and/or desired in a particular embodiment.

In the present invention "ideal consistency" is related to food product 302 viscosity and intended to mean the predetermined frozen malleable consistency of the food product 302 which can be easily dispensed from the dispense valve 548 yet frozen enough to be non-runny and user 402 and/or customer 404 desirable for consumption. In this regard, the predetermined frozen malleable consistency can be selected by the user configuring the frozen beverage equipment 102 and soft-serve ice cream equipment 104.

In operation, the memory 504 can be encoded with instructions that when executed by the microcontroller perform the steps of allowing the user doing equipment configuration to change the ratio of the food portion 306 with respect to the gas or air 304 portions. Then at least one of the predetermined low-temperature setting, the predetermined high-temperature setting, the predetermined low motor performance setting, or the predetermined high motor performance setting can be adjusted to maintain the predetermined frozen malleable consistency. In this manner, the ideal consistency of the food product 302 also called the predetermined frozen malleable consistency can be maintained even when the ratio of the food portion 306 with respect to the gas portion or air 304 changes. Noting that desirable mouth feel and other desirable customer consumption benefits of the frozen beverage or soft-serve ice cream can be obtained by changing the ratio of the food portion 306 with respect to the gas or air portion 304.

As an example, and not a limitation, a food product 302 with a food portion 306 and a gas or air portion 304 ratios of 60/40, 50/50, 40/60, or other ratios will all have different mouth feels and different customer consumption benefits at the predetermined frozen malleable consistency which can also be called the ideal consistency. To maintain the predetermined frozen malleable consistency across various food portion 304 and a gas portion 306 ratio changes at least one of the predetermined low-temperature setting, the predetermined high-temperature setting, the predetermined low motor performance setting, or the predetermined high motor performance setting can be adjusted. The present invention will then automatically maintain the desired predetermined frozen malleable consistency for the ratio of food portion 306 to gas or air portion 304.

An advantage, in the present invention, is that food product 302 ideal consistency can be achieved by maintaining the food product 302 between a temperature range defined by a predetermined low-temperature setting 208 and a predetermined high-temperature setting 206, and between a motor performance range defined by a predetermined low motor performance setting 216 and a predetermined high motor performance setting 218. Such food product 302 ideal consistency is automatically maintained by holding the food product 302 within the predetermined ranges of temperature 206/208 and motor performance 216/218 and such ranges can be adjusted manually or automatically in response to variances such as environmental conditions, equipment variances, food product 302 type or kind changes or variance, and other variances, as may be required and/or desired in a particular embodiment.

In an exemplary embodiment, in the present invention, by automatically maintaining the ideal consistency of the food product 302 even with variances in operating conditions the ability to determine a dispense time to dispense a desired portion-controlled dispense amount volume is effectuated. To increase the accuracy of the desired portion-controlled dispense amount volume a surge dispense amount must be taken into consideration. Since the ideal consistency can be relied on, the present invention uses food product pressure 222 to determine and control the surge dispense amount.

In this regard, the surge dispense amount the food product 302 occurs during the initial dispense when the dispense valve 548 is first opened. With the temperature range 206/208 and motor performance 216/218 established creating the desired food product 30 ideal consistency, the food product pressure 222 can be adjusted by establishing a food product 302 pressure range defined by a predetermined low-pressure setting 226 and a predetermined high-pressure setting 224. Once established the food product pressure 222 is maintained within the range resulting in a predictable and known surge dispense amount that can be used to adjust the dispense time so that the desired portion-controlled dispense amount volume is more accurately achieved.

In operation, while the food product 302 ideal consistency is maintained between the predetermined ranges of temperature 206/208 and motor performance 216/218 the surge dispense amount can be adjustably changed by changing the food product pressure range 224/226 and then repeatably maintained when the food product pressure 222, within the mixing chamber 536, is maintained between the predetermined low-pressure setting 226 and the predetermined high-pressure setting 224. Such food product pressure 222 is controlled by the amount of the food portion 306 and gas portion 304 that is injected into the mixing chamber 536. Changing the food product pressure 222 predictably changes the surge dispense amount.

In combination, the temperature range 206/208 and motor performance range 216/218 automatically control the viscosity of the food product 302 creating the ideal consistency while the pressure range 224/226 controls the amount of the surge dispense amount that is dispensed when the dispense valve 548 is first opened. Together, maintaining ranges in temperature 206/208, motor performance 216/218, and food product pressure range 224/226 effectuate the ability to dispense the food product 302 in a repeatably accurate portion-controlled manner.

Figure 9:
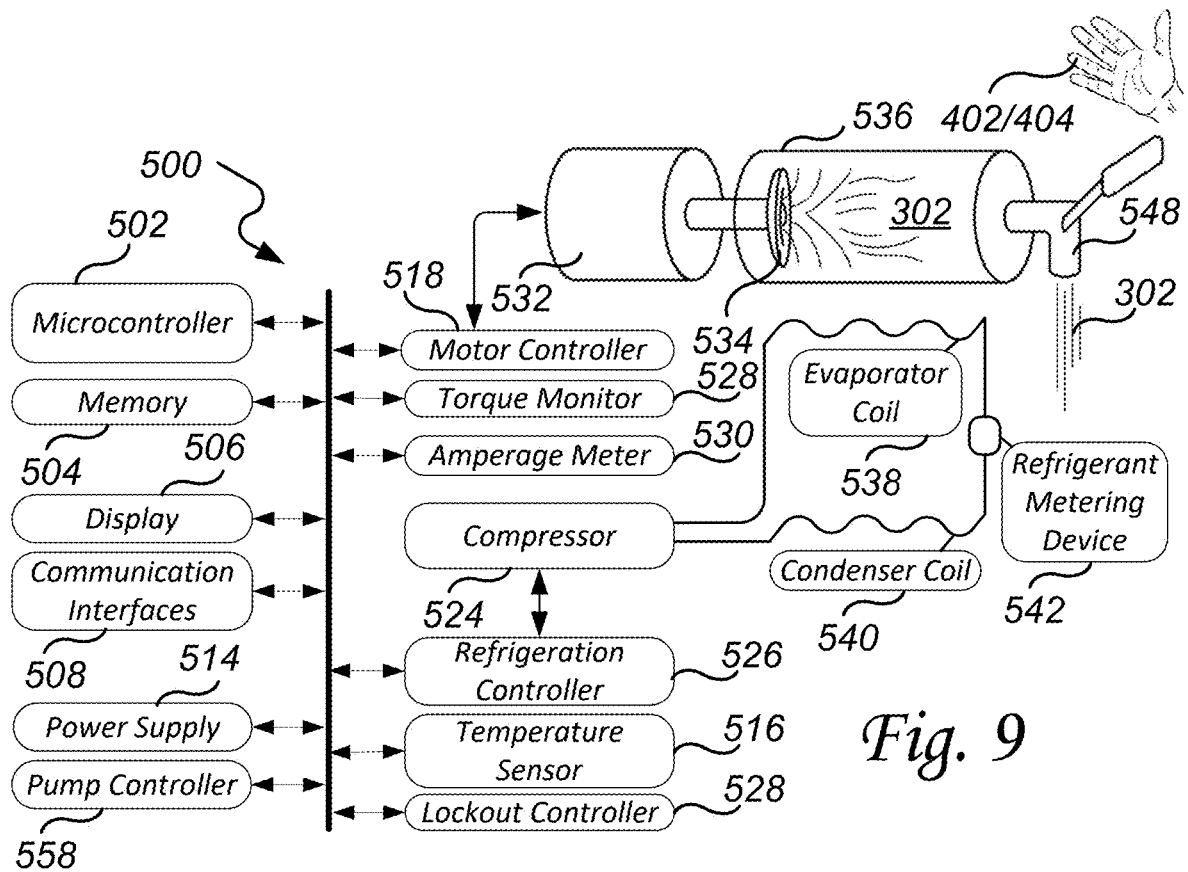
FIG. 9 illustrates one example of a control system.

Referring to FIG. 9, there is illustrated one example of a control system 500. In an exemplary embodiment, control system 500 can be integrated into, and control frozen beverage equipment 102 and soft-serve ice cream equipment 104. In addition, control system 500 can be a web-enabled control system.

In addition, such data communicating devices 606 can data communicate with remote data processing resources 604 and utilize data storage resources 602. Laptops, smartphones, smartwatches, tablets, desktop computers, servers, mobile communication devices, and other types and kinds of data communication devices can all be data communicating devices 606.

In operation, a user 402, or a customer 404 can use data communicating devices 606 to interact with the frozen beverage equipment 102 and soft-serve ice cream equipment 104. In this regard, a user 402 can be a person who operates, maintains, cleans, configures, repairs, and performs other functions on or with the frozen beverage equipment 102 or soft-serve ice cream equipment 104. A customer 404 can be a person who self-serve dispenses food product 302. The digital experience and interaction with the frozen beverage equipment 102 and soft-serve ice cream equipment 104 by the user 402, and customer 404 can be different and suited for their various roles and requirements, as may be required and/or desired in a particular embodiment.

Such data processing resources can be a server or other types and kinds of data processing resources. Furthermore, data communicating devices 606, remote data processing resources 604, data storage resources 602, and other types and kinds of data communicating devices can data communicate over a global network 700. The Internet is a global network 700.

In an exemplary embodiment, the frozen beverage equipment 102 and soft-serve ice cream equipment 104 can be equipped with a web-enabled control system 500. Such a web-enabled control system can comprise a microcontroller 502 which is operationally related to a plurality of communication interfaces 508, a power supply 514, a pump controller 558, a display 506, motor controller 518, a memory 504, a torque monitor 528, an amperage meter 522, a refrigeration controller 526, a temperature sensor 516, and a lockout controller 578.

Figure 10:
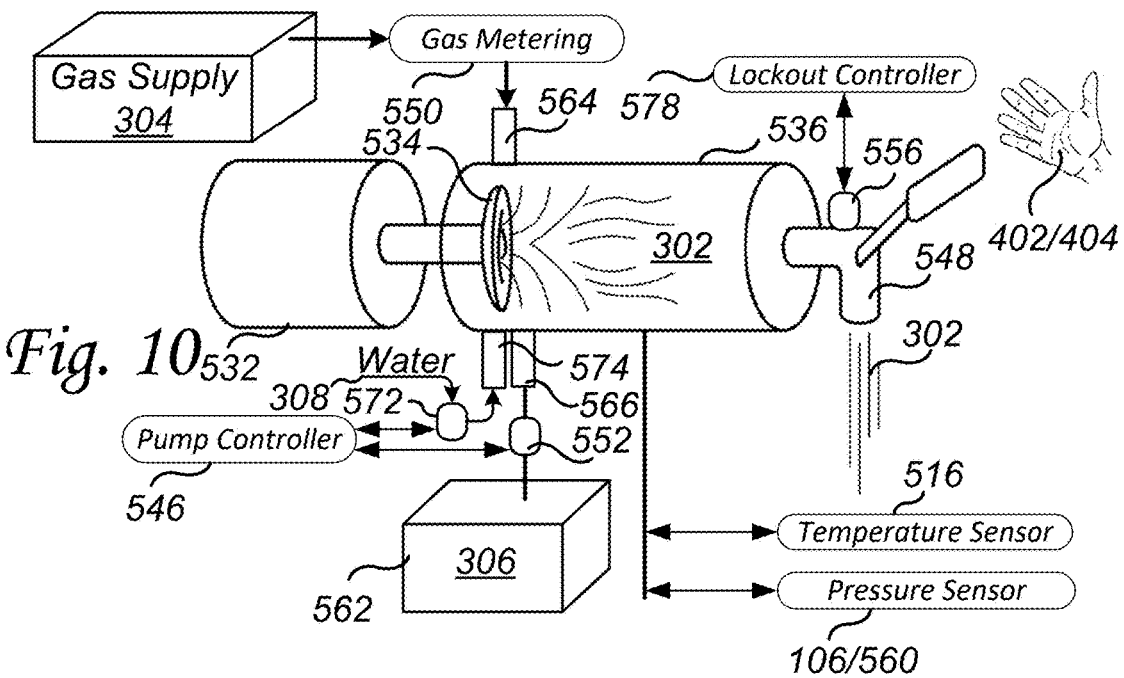
FIG. 10 illustrates one example of a system block diagram for frozen beverage equipment or soft-serve ice cream equipment configured to use a variety of gases as the gas portion.

Referring to FIG. 10, there is illustrated one example of a system block diagram for frozen beverage equipment 102 or a soft-serve ice cream equipment 104 configured to use a variety of gases as the gas portion 304. In an exemplary embodiment, the system block diagram in FIG. 9 can be adapted to provide for varying types or kinds of the gas portion 304 in addition to air. In this regard, a gas metering device 548 can be interconnected between a gas portion 304 supply of a gas and the gas inlet 564. In operation, the gas portion can be air, carbon dioxide, nitrogen, or other types and kinds of gases, as may be required and/or desired in a particular embodiment. In an exemplary embodiment, gases such as carbon dioxide, and other gasses can be injected into the mixing cylinder 536 at a sufficient pressure to cause the gas to dissolve into the food portion resulting in the food product 324 becoming carbonate in the case of dissolved carbon dioxide, or otherwise imbibed, or infused with the gas.

Figure 11:
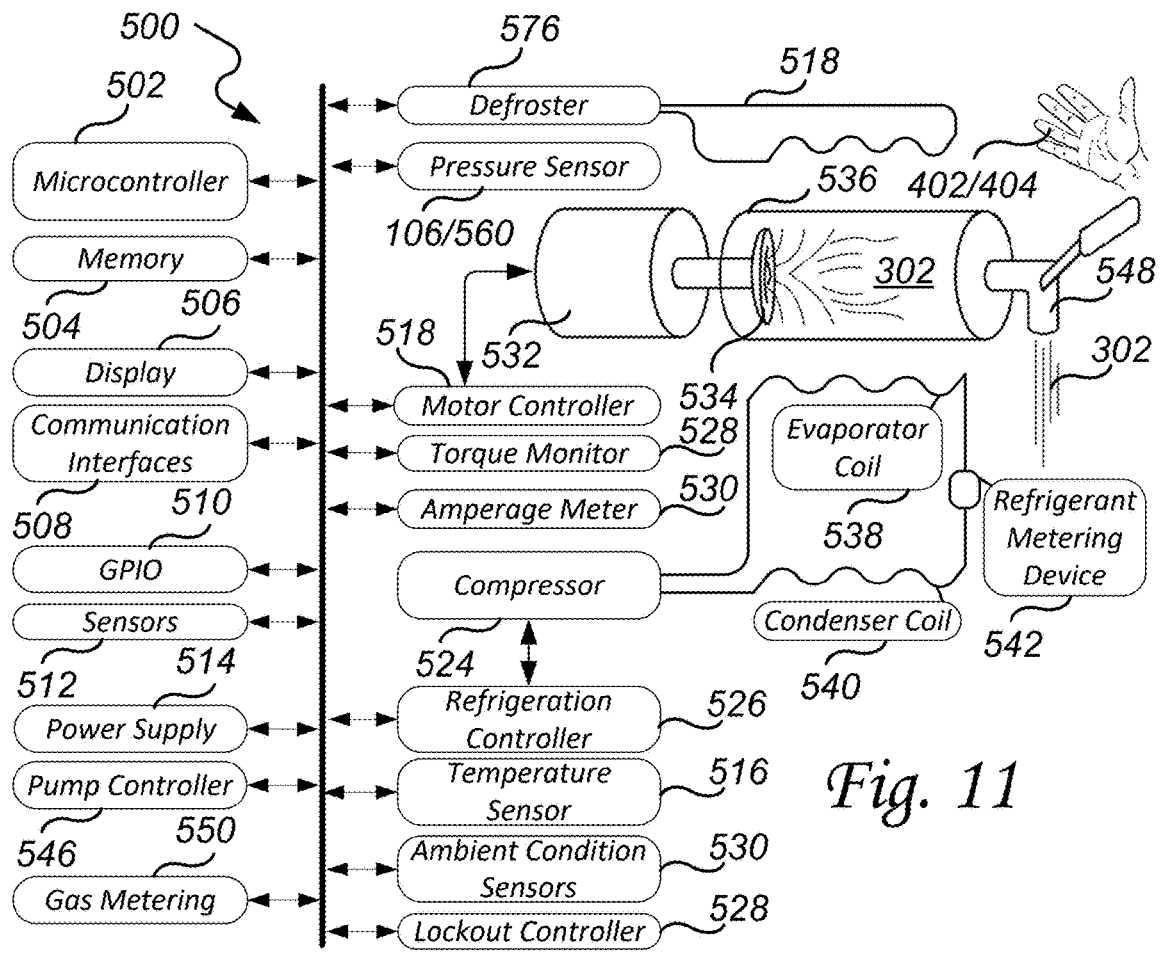
FIG. 11 illustrates one example of a control system.

With reference to FIG. 11, in an exemplary embodiment, the system block diagram in FIG. 9 can be adapted to provide for a pressure sensor 560. The pressure sensor 560 is operationally related to the microcontroller 502. The pressure sensor 560 is configured to measure the food product pressure 222 of the food product 302 inside the mixing cylinder 536.

In an exemplary embodiment, an automatic viscosity control system for food products dispensed from frozen beverage equipment and soft-serve ice cream equipment can comprise a mixing cylinder 536 which comprises at least one of an auger 534, at least one of a product inlet 566 through which a food portion 306 is injected into the mixing cylinder 536, and at least one of a gas inlet 564 through which a gas portion 304 is injected into the mixing cylinder 536.

A food product 302 comprises the food portion 306 and the gas portion 304. An auger motor 532 is interconnected with the auger 534. The auger 534 is positioned inside the mixing cylinder 536.

A control system 500 comprises a microcontroller 502, and a memory 504. A motor sensor 520/522 is operationally related to the microcontroller 502 and interconnected with the auger motor 532. The motor sensor 528/530 measures an amperage draw or a torque of the auger motor 532 resultant from the resistance of rotating the auger 534 through the food product 302. A gas metering device 548 is operationally related to the microcontroller 502 and interconnected with a gas inlet 564. The mixing cylinder 536 further comprises the gas inlet 564, and the product inlet 566. A pressure sensor 560 is operationally related to the microcontroller 502. The pressure sensor 560 is configured to measure the pressure of the food product 302 inside the mixing cylinder 536.

A refrigeration system 568 comprises a compressor 524. The compressor 524 is operationally related to the microcontroller 502 and configured to chill, into the predetermined frozen malleable consistency, the food product 302 inside the mixing cylinder 536.

The memory 504 is encoded with instructions that when executed by the microcontroller 502 perform the steps of filling the mixing cylinder 536, by way of the gas metering device 548 and the product pump 552, with a predetermined ratio of the gas portion 304 to the food portion 306 until the food product pressure 222 is between a predetermined low-pressure setting 226 and a predetermined high-pressure setting 224.

The method continues by starting or speeding up the compressor 524 when the temperature of the food product 302 is above a predetermined high-temperature setting 208 or when the amperage draw or the torque of the auger motor 532 is below a predetermined high motor performance setting 218. And, slowing or stopping the compressor 524 when the temperature of the food product 302 is between a predetermined low-temperature setting 206 and the predetermined high-temperature setting 208, and the amperage draw or the torque of the auger motor 532 is between a predetermined low motor performance setting 216 and the predetermined high motor performance setting 218.

In an exemplary embodiment, the defrost system 576 can be resistive heat 518, thermoelectric, and/or other types and kinds of defrosting systems. In operation, the defrost system 576, as needed, can warm the mixing cylinder 536 to prevent the food product 324 from freezing into a solid mass.

The pressure sensor 560 can be diagram displacement-based, strain gauge, variable capacitance, resistive, piezo-electric, micro-electrical mechanical system (MEMS), and/or other types and kinds of pressure sensors. In an exemplary embodiment, analog-type sensor determinations can be converted to digital values so that the microcontroller 502 can process the data. Alternatively, the microcontroller 502 can perform the analog-to-digital conversions if equipped to perform such functions.

The GPIO 510 can be TTL, CMOS, transistors, buffers, relays, pushbutton, switch, and/or other types and kinds of GPIO circuits.

The sensors 512 can be PIR motion sensors, infrared, thermal, Doppler radar, ultrasonic, capacitance, touch-type, optical, Hall effect, switch, fingerprint, and other types of biometric sensors, and/or other types and kinds of sensors. In an exemplary embodiment, analog-type sensor determinations can be converted to digital values so that the microcontroller 502 can process the data. Alternatively, the microcontroller 502 can perform the analog-to-digital conversions if equipped to perform such functions.

The ambient condition sensors 530 can be temperature, moisture, humidity, sunlight, time, date, and/or other types and kinds of sensors. In an exemplary embodiment, analog-type sensor determinations can be converted to digital values so that the microcontroller 502 can process the data. Alternatively, the microcontroller 502 can perform the analog-to-digital conversions if equipped to perform such functions.

Integrated System Architecture and Functional Synergy

In an exemplary embodiment, the present system represents a comprehensive integration of two foundational technologies described in earlier disclosures: the adaptive ingredient manifold and the automated viscosity-controlled freezing system. The manifold system enables multi-source ingredient blending—including food bases, flavorings, gases, and cleaning solutions—via a modular blending chamber with pressure-responsive valves and delivery controls. Separately, the automated viscosity system enables intelligent compressor cycling and auger modulation by monitoring motor resistance and temperature to maintain a frozen malleable food product within a narrow, repeatable viscosity range.

In this combined implementation, the manifold's upstream dosing precision is harmonized with the viscosity module's downstream consistency control. The blending chamber is actively managed via pressure sensors and valve logic to deliver precise ingredient ratios, while the freezing chamber dynamically adjusts cooling based on sensed torque and thermal profiles. This dual-feedback architecture ensures each dispense cycle meets rigorous texture, temperature, and portioning standards while allowing for seamless transition into clean-in-place (CIP) routines. The integration of these previously discrete subsystems enables full automation—from raw input to clean output—without manual disassembly or operator intervention.

In an exemplary embodiment, the frozen food dispensing system integrates mechanical, thermal, and electronic control components to automate the blending, freezing, dispensing, and cleaning of malleable frozen food products. At the core of the system is a mixing cylinder 536, configured to receive both a food portion 302 and a gas portion, where the two are blended and frozen by an auger 534 driven by an auger motor 538. The refrigeration system 568 includes a compressor 572 in thermal communication with the mixing cylinder and operates to chill the contents to a semi-solid malleable consistency appropriate for dispensing.

A blending manifold 100 upstream of the mixing cylinder includes multiple ingredient inlets 102A, 102B, a blending chamber 128, and one or more ingredient egress ports 104. The manifold may include one or more valve caps 114 that are configured to maintain a permanently open egress port for passive ratiometric blending, as used in dual-source or gravity-fed modes.

The control system 500 includes a microcontroller 502, memory 504, motor sensor 508, and a pressure sensor 106A, operably connected to electronic valves 112A and the auger motor. It monitors amperage draw or torque to infer food viscosity and controls the compressor and ingredient valves accordingly. The control system can also toggle between pressurized and suction-based blending modes depending on the operating environment and component configuration.

A product pump and gas metering device may be connected to the manifold and controlled by the control system to accurately introduce specific volumes of gas or food concentrate to the blending chamber. The manifold and mixing cylinder are also configured to support pasteurization by controlled heating using internal heating elements 574 or thermal jackets.

During normal operation, the control system can calculate an accurate dispense time by querying a lookup table stored in memory. Inputs to the lookup include auger resistance, internal temperature, and requested portion size. The system actuates a dispense valve 540 for the appropriate time, enabling consistent portion delivery.

Optionally, the system supports advanced features including surge pressure detection and auger speed modulation to compensate for transient pressure fluctuations and viscosity changes during dispensing. It may include a training mode that allows dispense profiles to be recorded, stored, and optimized based on actual output volume and performance data. All operational data may be logged and accessed via a cloud-based interface to allow remote cleaning initiation, diagnostics, and telemetry analysis.

The clean-in-place (CIP) cycle is initiated autonomously or by user command. With referene to at least FIG. 31:

In step 2002, the system enters cleaning mode.
In step 2004, the refrigeration system is deactivated and residual product in the mixing cylinder is thawed using ambient heat or heating elements 574.
In step 2006, the softened product is purged from the system using drain valves or a product pump.
In step 2008, the control system injects rinse water and cleaning solution through the ingredient inlets 102A, 102B.
In step 2010, the system monitors auger motor torque and cylinder temperature to verify clean status.
In step 2012, the system transitions to standby or returns to operational readiness without requiring manual disassembly.

During blending cycles, the control system dynamically adjusts the timing of recipe pulses using pressure readings. When pressure in the blending chamber 128 drops below a threshold, the electronic valve 112A is opened to initiate a dose. The valve is closed when the chamber reaches a target pressure. Pulse intervals can be adapted based on ingredient viscosity or blend targets, with resting periods to allow pressure reservoirs to recharge.

The blending manifold may also serve dual functions, supporting both frozen food blending and distribution of cleaning solutions during CIP cycles. The internal volume and geometry of the blending chamber enable pressure stabilization before material is ejected into the mixing cylinder, enhancing portioning precision and consistency.

Referring to FIG. 12, there is illustrated one example of temperature reference 'A', amperage or torque charts reference 'B', and a pressure chart reference 'C'. An advantage, of the present invention, is that in an exemplary embodiment, automatic viscosity control of the food product 302 is achieved by enabling and disabling the refrigeration system 568 from chilling the food product 306 in the mixing cylinder 536 based on the electrical amperage current draw or the torque 214 of the auger motor 532, or both the temperature 204 of the food product 302 and the electrical amperage current draw or the torque 214 of the auger motor 532. In this regard, resultant from the refrigeration system 568, as the temperature 204 of the food product 302 decreases, the food product 302 begins to chill into a predetermined frozen malleable consistency. This transition to a predetermined frozen malleable consistency increases the viscosity of the food product 302. The increased viscosity of the food product 306 in turn, makes it more difficult for the motor 502 to rotate the auger 534 through the frozen malleable food product 302, increasing the amperage draw and the torque 214 of the auger motor 532. In an exemplary embodiment, by controlling the refrigeration system 568, 'ON' and 'OFF', based on at least the amperage draw or torque 214 of the auger motor 532 the viscosity of the food product 306 in the mixing cylinder 536 can be automatically maintained. For disclosure purposes, with reference to FIG. 12 reference 'B', the chart can represent either amperage draw 214 or the torque 214 and can be referred to as amperage draw or the torque 214

In an exemplary embodiment, in operation, an automatic viscosity control system for food products 302 dispensed from frozen beverage equipment 102 and soft-serve ice cream equipment 104 can comprise a mixing cylinder 536 comprising at least one of an auger 534, at least one of a product inlet 566 through which a food portion 306 is injected into the mixing cylinder 536, and at least one gas inlet 564 through which a gas portion 304 is injected into the mixing cylinder 536. A food product 302 comprises the food portion 306, and the gas portion 304. An auger motor 532 is interconnected with the auger 534. The auger is positioned inside the mixing cylinder 536 and turns stirring the food product 302.

A control system 500 comprises a microcontroller 502, a memory 504, and a motor sensor 522 (amperage draw) or 520 (torque). The motor sensor 520/522 is operationally related to the auger motor 532. The motor sensor 520/532 measures an amperage draw 522 or a torque 520 of the auger motor 534 resultant from the resistance of rotating the auger 534 through the food product 302. For disclosure purposes, the motor sensor can be one or both of the amperage meter 522 or torque monitor 520 referred to as motor sensor 520/522.

A refrigeration system 568 comprises a compressor 524. The refrigeration system 568 is configured to chill, to a predetermined frozen malleable consistency, the food product 302 inside the mixing cylinder 536.

The memory 504 can be encoded with instructions that when executed by the microcontroller 502 transition between the steps of starting or speeding up the compressor 524 when the amperage draw or the torque 214 of the auger motor 532 is below a predetermined high motor performance setting 218. And, slowing or stopping the compressor 524 when the amperage draw or the torque of the auger motor 532 is between 234 a predetermined low motor performance setting 216, and the predetermined high motor performance setting 218. In this regard, FIG. 12, reference 'B', illustrates an amperage draw or the torque curve 214 electrical current amperages or torque in inch-pounds (or other units) versus time 210.

In another exemplary embodiment, the control system 500 can comprise a temperature sensor 516. The temperature sensor 516 is operationally related to the microcontroller 502 and the mixing cylinder 536. The temperature sensor 516 measures the temperature of the food product 302 inside the mixing cylinder 536. The memory 504 can be encoded with instructions that when executed by the microcontroller 502 perform the steps of starting or speeding up the compressor 524 when the temperature 204 of the food product 302 is above a predetermined high-temperature setting 206. And, slowing or stopping the compressor 524 when temperature 204 of the food product 302 is between a predetermined low-temperature setting 208 and the predetermined high-temperature setting 206 range 232, and the amperage draw or the torque of the auger motor 532 is between a predetermined low motor performance setting 216 and the predetermined high motor performance setting 218 range 234.

In this regard, FIG. 12, reference 'A', illustrates a food product 302 chilling temperature curve 204 plotted as temperature 202 versus time 210. A predetermined food product 302 temperature range 232 is selected between 232 a predetermined low-temperature setting 208 and the predetermined high-temperature setting 206. Such food product 302 predetermined low-temperature setting 208 and the predetermined high-temperature setting 206 can be selected in the range 228 of where the food product 302 freezes plus or minus a few degrees.

Food product 302 viscosity plays an important role in the quality of the frozen beverage or soft-serve ice cream. If the food product 302 viscosity is too low it can make the food product 302 inconsistent, soft, and/or runny, and if the food product 302 viscosity is too high can make the food product 302 thick, or even frozen to the point that it can't easily be dispensed from the dispense valve 548.

In operation, several factors can influence food product 302 freezing and as such optimal food product 302 viscosity in a predetermined frozen malleable form. Such factors can include the amount of chill time at or near the food product 302 freezing point, the rotational speed of the auger 534, ambient conditions such as humidity, external temperature, and other ambient conditions, and the composition of the food product 302 such as the type, kind, and/or amount of sugar content, and other factors can influence the progression of freezing and the viscosity of the food product 302 as it freezes.

An advantage, in the present invention, is that in addition to closely monitoring and controlling the temperature of the food product 302, the viscosity of the food product is also closely monitored and controlled. In this regard, FIG. 12, reference 'B', illustrates an auger motor 532 amperage draw or torque curve 214 plotted as electrical amperage or torque 212 versus time 210.

In operation, as the food product 302 chills and begins to freeze the viscosity of the food product 302 increases as it thickens, transitioning the food product 302 into a predetermined frozen malleable form. As the food product 302 thickens as it is chilled the viscosity increases applying more force to the auger 534 which in turn causes the auger motor 532 to draw more electrical current amperage and the torque 214 on the auger motor 532 increases too. For motor control systems that can determine torque, torque determination or measurements can be used along with or instead of using electrical amperage draw determination or measurements. One example of a motor control system that determines torque can be a variable frequency drive (VFD) that can be used as the auger motor 532. Other types and kinds of auger motors can also be used, as may be required and/or desired in a particular embodiment.

In another exemplary embodiment, torque can be measured mechanically by having a force of the food product 302 mixed in the mixing cylinder 536 applied to a lever that increasingly displaces as the food product 302 transitions to a predetermined frozen malleable consistency. The amount of displacement of the lever can be measured by the torque monitor 528 automatically electronically to determine a relative torque reading that can then be used in the methods of the present invention.

To achieve optimal food product 302 viscosity, a predetermined low motor performance setting 216 and a predetermined high motor performance setting 218 range 234 can be predetermined and set. The control system 500 can then disable the refrigeration system 568 when the amperage draw or torque 214 reaches the predetermined high motor performance setting 218 allowing the food product 302 to warm reducing the food product 302 viscosity. Similarly, if the amperage draw or torque 214 reaches the predetermined low motor performance setting 216 and the refrigeration system 568 is in the disabled state then the control system 500 can enable the refrigeration system 568 to chill the food product 302 which in turn increases the viscosity of the food product 302.

An advantage, in the present invention, is that operating together to automate viscosity control of the food product 302 can be controlled by controlling the temperature around the food product 302 freezing point 228 between a predetermined low-temperature setting 208 and a predetermined high-temperature setting 206 range 232, and the viscosity of the food product 302 between a predetermined low motor performance setting 216 and a predetermined high motor performance setting 218. The result is that the present invention delivers the food product 302 in an optimum frozen malleable form at a consistent viscosity automatically without a technician having to manually change equipment configurations.

In an exemplary embodiment, an alarm condition can be communicated by way of a display 506 or data communicated with a remote data processing resource 604 when a predetermined refrigeration chill period 230 elapses and the food product 302 has not sufficiently increased in viscosity to cause an increase in the amperage or torque 214 to reach the desired range 234. The control system 500 comprises the display 506 and the display 506 is operationally related to the microcontroller 502. In operation, the predetermined refrigeration chill period 230 is the amount of time allotted for the food product 302 to reach a predetermined frozen malleable consistency. Failure to achieve the desired predetermined frozen malleable consistency of the food product 302 in the allotted predetermined refrigeration chill period 230 can indicate equipment failures such as a refrigeration system 568 failure or other equipment failures.

In another exemplary embodiment, referring to FIG. 1, reference 'C' chart, pressure 222 within the mixing cylinder 536 can be determined over time 210. The pressure 222 is resultant from a gas portion 304 and a food portion 306 being initially injected in a predetermined ratio into the mixing cylinder 536. Food product 302 comprises the gas portion 304 and the food portion 306. The pressure 222 can also increase as the food product 302 transitions to a predetermined frozen malleable form.

In this regard, a product pump 552 is operationally related to the microcontroller 502 and interconnected between the product inlet 566 and the supply of the food portion 306 stored in package 562 such as a bag-in-the-box type or kind of packaging, or other types and kinds of packaging as may be required and/or desired in a particular embodiment. A gas metering device 548 is operationally related to the microcontroller 502 and interconnected with a gas inlet 564. The mixing cylinder 536 further comprises the gas inlet 564, and the product inlet 566. A pressure sensor 560 is operationally related to the microcontroller 502. The pressure sensor 560 is configured to measure a food product 302 pressure inside the mixing cylinder 536.

In operation, the memory 504 is encoded with instructions that when executed by the microcontroller 502 perform the step of filling the mixing cylinder, by way of the gas metering device and the product pump, with predetermined ratio of the gas portion to the food portion until the food product pressure is between a predetermined low-pressure setting and a predetermined high-pressure setting.

In another exemplary embodiment, a portion control system for food products 302 dispensed from frozen beverage equipment 102 and soft-serve ice cream equipment 104 can comprise a mixing cylinder 536 that comprises at least one auger 534, at least one product inlet 574, and at least one dispense valve 548. An auger motor can be interconnected with the auger 534. The auger 534 is positioned inside the mixing cylinder 536 and turns through and stirs the food product 302.

A control system comprises a microcontroller 502, a memory 504, a temperature sensor 516, and a motor sensor 520/522. The temperature sensor is operationally related to the mixing cylinder 536. The temperature sensor measures the temperature 204 of the food product 302 inside the mixing cylinder 536. The motor sensor 520/522 is operationally related to the auger motor 532. The motor sensor 528/530 measures an amperage draw or a torque 214 of the auger motor 532 resultant from the resistance of rotating the auger 534 through the food product 302.

The memory 504 is encoded with instructions that when executed by the microcontroller 502 perform the steps of injecting a food product 302 into the mixing cylinder 536 and chilling the food product 302 into a predetermined frozen malleable consistency. Receiving a portion-controlled dispense amount volume indicating the volume of the food product 302 to dispense. Determining a product temperature 204 of the food product by way of the temperature sensor 516. Determining the amperage draw or the torque 214 of the auger motor 532 by way of the motor sensor 520/522. Determining by querying a dispense time from the memory 504 or a remote data processing resource 604 based on the portion-controlled dispense amount volume. The product temperature 204, and the amperage draw or the torque 214. And, opening the dispense valve 548 for the dispense time, allowing the food product 302, in a predetermined frozen malleable consistency to be dispensed in a portion-control manner.

In an exemplary embodiment, the step of receiving referenced above the portion-controlled dispense amount volume can be effectuated by a data communication from a point-of-sale device, a quick-serve restaurant data processing device, a customer 404 or the user 402 initiated data communication from a digital communication device, a remote data communication from the remote data processing resource, manual data entry by the user at the portion control system, or by other methods or techniques as may be required and/or desired in a particular embodiment.

In an exemplary embodiment, the step of determining by querying reference above the dispense time is effectuated by a lookup table or a database encoded in the memory 504, the lookup table and the database correlates a plurality of the dispense time based on a plurality of the portion-controlled dispense amount volume, a plurality of the product temperature, a plurality of the amperage draw or the torque, and other factors, as may be required and/or desired in a particular embodiment.

In an exemplary embodiment, a product pump 552 is operationally related to the microcontroller 502 and interconnected between the product inlet 566 and the supply of the food portion 306. A gas metering device 548 is operationally related to the microcontroller 502 and interconnected with a gas inlet 564. The mixing cylinder 536 further comprises the gas inlet 564, and the product inlet 566. A pressure sensor 560 is operationally related to the microcontroller 502. The pressure sensor 560 is configured to measure a food product pressure inside the mixing cylinder 536. The memory 504 can be encoded with instructions that when executed by the microcontroller 502 perform the step of filling the mixing cylinder, by way of the gas metering device and the product pump, with a predetermined ratio of the gas portion to the food portion until the food product pressure is between a predetermined low-pressure setting and a predetermined high-pressure setting.

When the dispense valve 548 is first opened the food product pressure forces a surge of food product 302 also called overrun to dispense out of the dispense valve 548. When the food product pressure drops it is then the auger 534 that pushes the food product 302 out of the dispense valve 548.

In another exemplary embodiment, a pressure sensor 560 is operationally related to the microcontroller 502. The memory 504 is encoded with instructions that when executed by the microcontroller 502 perform the steps of determining, by way of the pressure sensor 560, a food product pressure 222 inside the mixing chamber 536. Determining, based on the food product pressure 222, a surge dispense amount of food product 302 also called overrun will initially be dispensed resultant from the food product pressure 222 when the dispense valve 548 is opened. And, adjusting the portion-controlled dispense amount volume desired, for purposes of determining the dispense time, by subtracting from the portion-controlled dispense amount volume the surge dispense amount.

In an exemplary embodiment, the food product pressure 222 is sufficient to force a surge dispense amount of food product 302 out the dispense valve 548 when opened. Once the food product pressure 222 drops resultant from the surge dispense amount egress through the dispense valve 548 it is the auger 534 that pushes the remaining desired food portion through the dispense valve 548. In a portion-controlled application, the surge dispense amount should be subtracted from the portion-controlled dispense amount volume before the dispense time is determined to better ensure food product 302 dispense accuracy.

As an example and not a limitation, at a predetermined temperature 204, amperage draw or torque 214, and food product pressure 222, the surge dispense amount is one ounce of food product 302, and the food product dispense flow rate is two ounces per second. Therefore, if the desired portion-controlled dispense amount volume is nine ounces then the adjusted portion-controlled dispense amount volume is nine ounces minus the surge dispense amount or nine ounces minus one ounce, which equals eight ounces. The dispense time then becomes the adjusted portion-controlled dispense amount volume divided by the food product dispense flow rate or eight ounces divided by two ounces per second which equals four seconds. The dispense time is then four seconds. In a plurality of embodiments, as temperature 204, amperage draw or torque 214, and food product pressure 222 change so will the surge dispense amount, and the food product dispense flow rate. In operation, an accessible lookup table or database in memory 504 or on a remote data processing resource 604 can correlate variables that change such as temperature 204, amperage draw of torque 214, food product pressure 222, the surge dispense amount, and the food product dispense flow rate, and other variables with the desired portion-controlled dispense amount to determine a dispense time to achieve an accurate portion-controlled food product 302 dispense.

In an exemplary embodiment, the auger motor 532 can be stopped and thus the auger 534 stopped during the surge period, this allows the surge amount to be predictably dispensed without the aid of the auger 534. Once the surge amount has been dispensed the auger 534 by way of the auger motor 532 can be restarted and it is then the action of the auger 534 that causes the food product 302 to be dispensed.

In an exemplary embodiment, during dispense of the food product 302, the auger motor 532 speed can be reduced proportionally as the temperature of the food product increases, the amperage draw decreases, or the torque decreases. In this regard, as the viscosity of the food product 302 decreases (thins) the auger motor speed 502 can be decreased to maintain a constant flow rate of the food product 302 during dispense. In an exemplary embodiment, the auger motor 532 can a variable frequency drive (VFD) motor, or other type or kind of motor as may be required and/or desired in a particular embodiment.

Figure 13:
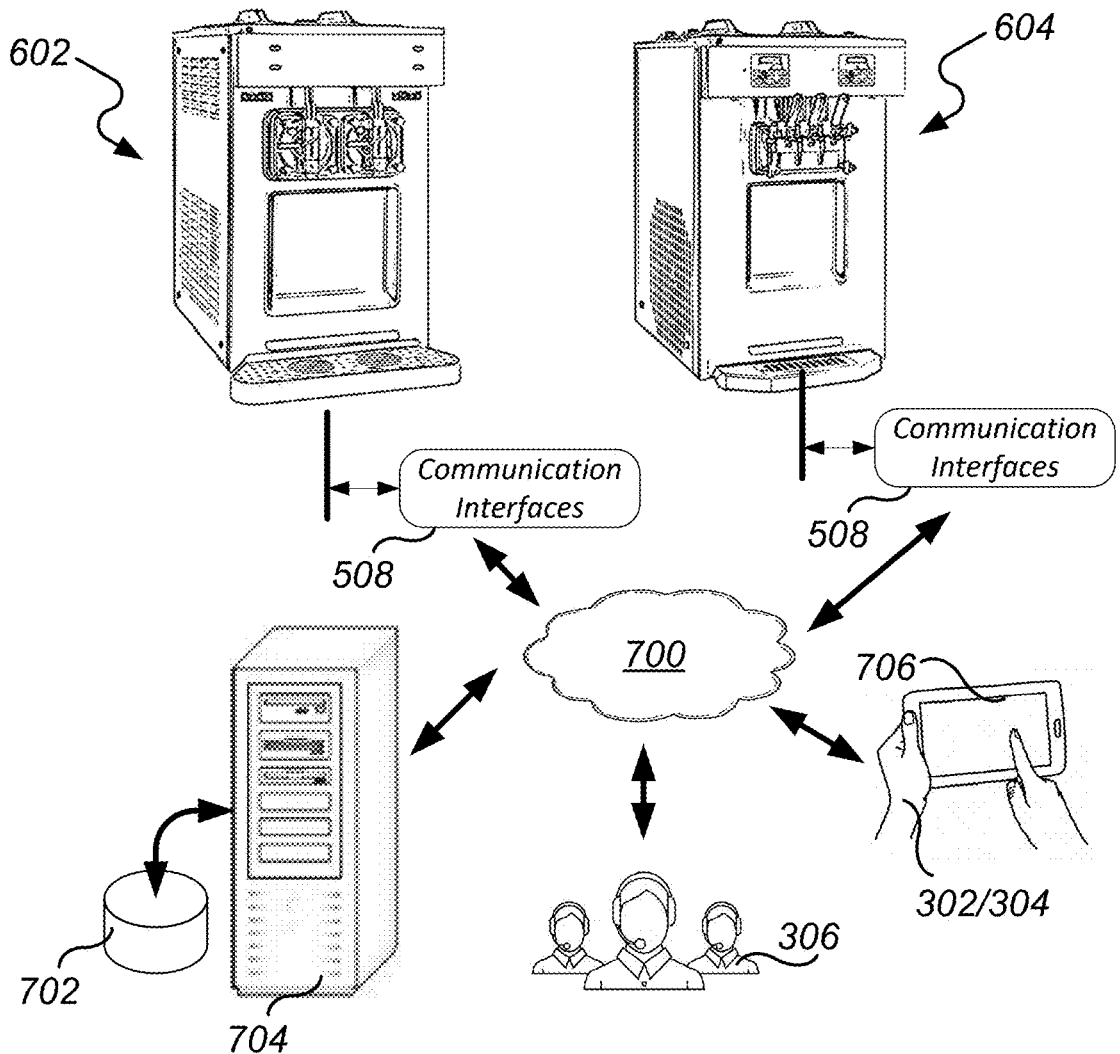
FIG. 13 illustrates one example of a global network-based system block diagram.

Referring to FIG. 13, there is illustrated one example of a global network-based system block diagram. In an exemplary embodiment, by way of control system 500 communication interface 508, frozen beverage equipment 602 and soft-serve ice cream equipment 604 can data communicate over a global network 700 with one or more remote data processing resources 704, databases 702 that are operationally related to a remote data processing resource 704, one or more data communication device 706 operated by user 302 or customer 304, and one or more remote service provider 306. The Internet is one example of a global network 700. Database 702 is operationally related to the remote data processing resource 604. In addition, there can be any number of remote data processing resources 704, and/or database 702, as well as other global network-based computing devices, as may be required and/or desired in a particular embodiment.

Such data communication devices 706 can include smartphones, tablets, laptops, other web-enabled devices, mobile communication devices, and other data communication devices, as may be required and/or desired in a particular embodiment.

Such remote data processing resource 704 can be a server, network appliance, or other types and kinds of remote data processing resources, as may be required and or desired in a particular embodiment.

Such remote service provider 306 can be a technical service network, a call center, a customer service organization, an alarm/equipment service monitoring company, or other types and kinds of remote service providers.

Figure 14A:
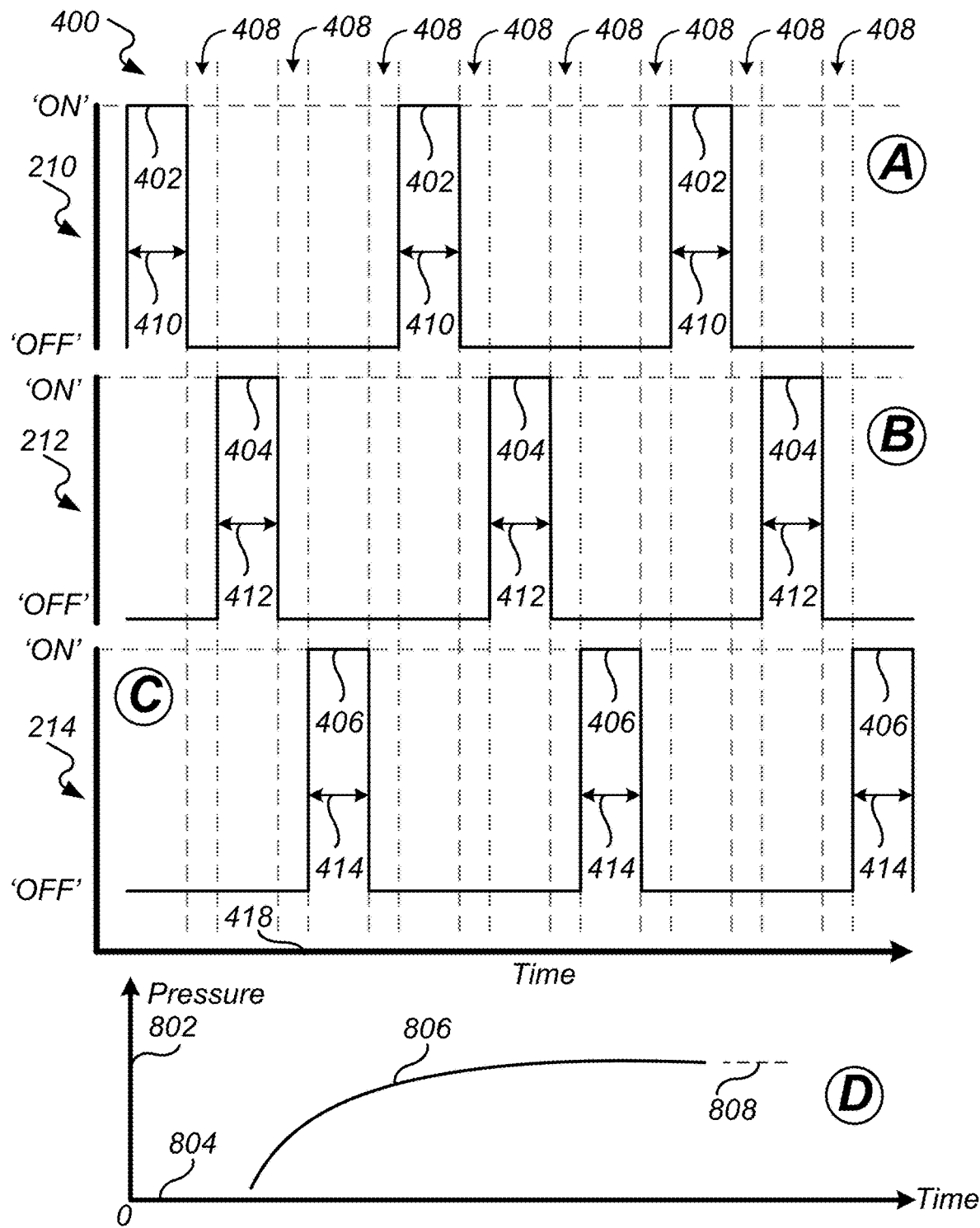
FIGS. 14A-B illustrate examples of a recipe pulse sequence.

Referring to FIG. 14A, there is illustrated one example of a recipe pulse sequence 400. In an exemplary embodiment, the recipe pulse sequence 400 is one or more of the electronic valves 110A-C/112A-C being energized and/or otherwise 'OPENED' for a predetermined amount of time to allow ingredients 210/212/214 to enter the blending chamber 128. A longer 'OPEN' predetermined amount of time allows more of the specific ingredient 210/212/214 to enter the blending chamber 128. By predetermining an amount of time for each ingredient 210/212/214 in a recipe, the ingredient amounts can be blended to form the food product 208. As an example, with pumps 552 and 554 providing comparable performance, a ratio of one part food portion 306, to two parts water portion 308 can be achieved by 'OPENING' electronic valve 110A/112A that controls the water portion 308 flow into the blending chamber 128 for twice the amount of time as the electronic valve 110B/112B that controls the flow of the food portion 310 into the blending chamber 128.

In a plurality of exemplary embodiments, the recipe pulse sequence 400 can be varied between at least some of the ingredients 210/212/214 based on the recipe concentrations, the pump performance characteristics, and other factors. Such ingredients can be liquids or gases and can be pumped, valve controlled, or metered 550/552/554, as may be required or desired for a particular recipe embodiment. For disclosure purposes, not all ingredients made be needed for every recipe. As an example. the water portion 308 may not be needed when the food portion 306 does not require to be diluted. Other ingredients may or may not be needed in other recipes, as may be desired and/or required in a particular embodiment.

In an exemplary embodiment, in reference 'A' initially electronic valve 110C/112C is energized allowing ingredient 210 to enter the blending chamber 128 for a predetermined time period 410. The recipe pulse sequence 400 then continues in reference 'B' by energizing electronic valve 110B/112B allowing ingredient 212 to enter the blending chamber 128 for a predetermined time period 412. The recipe pulse sequence 400 then continues in reference 'C' by energizing electronic valve 110A/112A allowing ingredient 214 to enter the blending chamber 128 for a predetermined time period 414.

As the blending chamber 128 is filled the blended ingredients are conveyed through at least one tube to the product inlet 544 where the food product 208 enters the mixing cylinder 536 and is chilled and circulated by auger 534 into a frozen malleably consistency and dispensed by way of the dispense valve 548 by a user 302 or customer 304. The auger 534 is rotated by way of auger motor 532.

The recipe pulse sequence 400 repeats as needed. Each recipe pulse sequence 400 ratiometrically blends one or more of the various ingredients 210/212/214 by injecting them in predetermined quantities into the blending chamber 128 until the food product pressure 106 in the mixing cylinder 536 reaches a desired predetermined food product pressure 808. In an exemplary embodiment, such food product pressure 806 can be monitored by pressure sensor 106D. The predetermined food product pressure can be selected as part of configuring the frozen beverage equipment 602 or the soft-serve ice cream equipment 604.

In this regard, in an exemplary embodiment, a mixing cylinder 536 can be interconnected to the food product egress conduit 104 and receives the food product 208. The mixing cylinder 536 comprises an auger 534 that is interconnected with an auger motor for circulating the food product 208 within the mixing cylinder 536 and a dispense valve 548 for dispensing the food product 208 from the mixing cylinder 536.

A control system 500 comprises a microcontroller 502, a memory 504, a valve controller 570 that is operationally related to the electronic valve 110A-C/112A-C, and a pressure sensor controller 560 that is operationally related to the pressure sensors 106A-D. The memory 504, the valve controller 570, and the pressure sensor controller 560 are operationally related to the microcontroller 502. The memory 504 can be encoded with instructions that, when executed by the microcontroller 502 perform the steps of determining a blending chamber 128 pressure by way of the pressure sensor 106D. The method continues by initiating a recipe pulse sequence 400 when the blending chamber pressure 806 is below a predetermined food product pressure 808. The recipe pulse sequence 400 operates one or more of the electronic valves 110A-C/112A-C in an 'ON' and 'OFF' manner in a predetermined sequence, allowing predetermined portions of the ingredients 210/212/214 to enter the blending chamber 128. The method continues by terminating the recipe pulse sequence 400 when the blending chamber pressure 806 is at least the predetermined food product pressure 808. In operation, the mixing chamber 536 is continually refilled with blended food product 208 after each dispense of the food product 208 by way of the dispense valve 548.

In an exemplary embodiment, different ingredients 210/212/214 can be injected into the blending chamber 128 sequentially so as to not create variable pressure changes in the blending chamber 128 during ingredient injection. Such blending chamber 128 variable pressure changes by pumping more than one ingredient at a time into the blending chamber 128 can create ratio inaccuracies in the blended food product 208. As an example, trying to inject gas and liquid at the same time can create pressure variances within the blending chamber 128 that can lead to the blended food product 208 ingredient ratios being inaccurate.

An advantage, in the present invention, is that a food product pressure stabilization time period 408 can be added between each transition to a different electronic valve 110A-C/112A-C. The food product pressure stabilization time period 408 provides a brief predetermined time period between ingredient 210, 212/, or 214 injections into the blending chamber 128 to allow the pressure within the blending chamber 128 to stabilize before introducing the next ingredient 210/212/214 in the recipe pulse sequence 400. In operation, in this regard, the memory 504 can be encoded with instructions that when executed by the microcontroller 502 perform the step of adding a food product pressure stabilization time period 408 when the recipe pulse sequence 400 transitions between the electronic valves 110A-C/112A-C, wherein the blending chamber 128 pressure is allowed to stabilize before the next ingredient 210, 212, or 214 is added to the blending chamber 128.

In a plurality of recipe pulse sequences 400, not every ingredient 210/212/214 may be dispensed and/or the predetermined time period for each ingredient 210/212/214 dispensed may vary. Additionally, the food product pressure stabilization time period 408 can be the same between transitions to different ingredients or different, as may be required and/or desired in a particular embodiment.

In an exemplary embodiment, in reference 'D' there is illustrated a pressure 804 versus time 804 chart. In operation, as ingredients 210, 212, or 214 are blended by way of the recipe pulse sequence in the blending chamber 128, conveyed, and injected into the mixing cylinder 536 pressure sensor 106D will begin to record an increase in food product pressure 806. When the food product pressure 806 reaches the desired predetermined food product pressure 808 then the blending process is stopped until the food product pressure 806 falls below the desired predetermined food product pressure 808 at which point the recipe pulse sequence is restarted to refill the mixing cylinder 536 with food product 208 raising the food product pressure 806 until the desired food product pressure 808 is reached again. In this regard, the mixing cylinder 536 is maintained full of food product 208 at the desired predetermined food product pressure 808, which maintains product quality and better ensures that when dispensed by user 302 or customer 304 for consumption purposes, the food product 208 frozen malleable consistency is at an ideal viscosity.

In the present invention "ideal consistency" or "ideal viscosity" is related to food product 208 viscosity and intended to mean the predetermined frozen malleable consistency of the food product 208 which can be easily dispensed from the dispense valve 548 yet frozen enough to be non-runny and user 302 and/or customer 304 desirable for consumption. In this regard, the predetermined frozen malleable consistency can be selected by user 302 by configuring the frozen beverage equipment 602 and soft-serve ice cream equipment 604 and maintaining food product pressure 806 within the mixing cylinder 536 at the desired predetermined food product pressure 808.

Figure 14B:
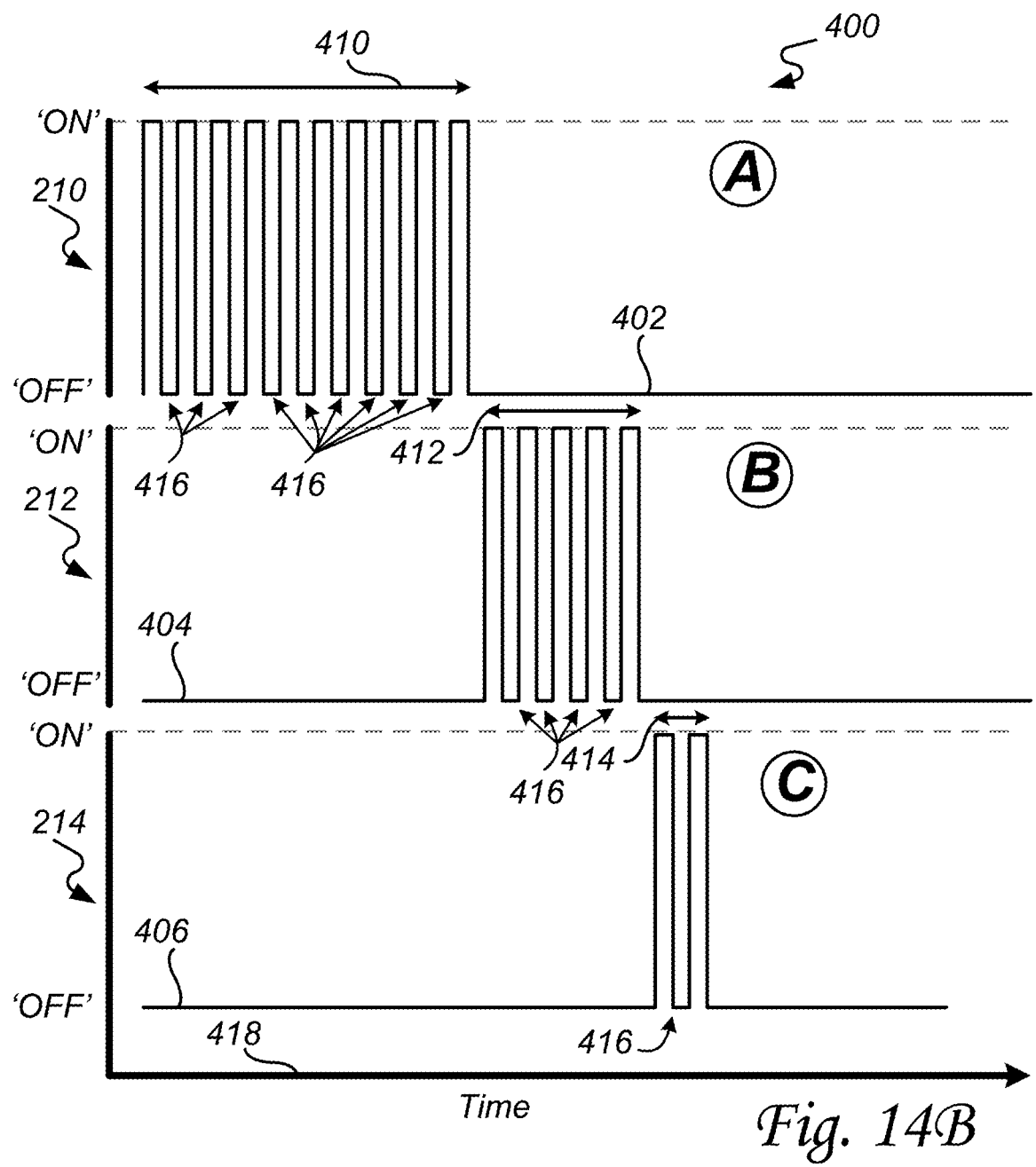

Referring to FIG. 14B, there is illustrated a recipe pulse sequence 400. The recipe pulse sequence 400 can be represented as a square wave 402/404/406 that indicates a time period 418 that an electronic valve 110A-C/112A-C is energized 'ON' or 'OPEN' 410/412/414 to allow ingredient flow or in standby 'OFF' or "CLOSED" abating ingredient 210/212/214 flow.

In an exemplary embodiment, a resting pulse period 416 can be integrated into the electronic valve 110A-C/112A-C energized 'ON' or 'OPEN' time periods 410/412/414. In this regard, the electronic valve 110A-C/112A-C energized 'ON' or 'OPEN' the ingredient 210/212/214 supply-side pressure can drop, and as a result inaccuracies in pumping or otherwise metering product amounts into the blending chamber 128 can occur. To allow ingredient 210/212/214 supply-side pressure to recover and the pressure reservoirs 126A-C to be refilled during an ingredient 210/212/214 injection into the blending chamber 128 thus maintaining a more stable ingredient 210/212/214 pressure during metering into the blending chamber 128 a resting pressure period 416 can be integrated into the electronic valve 110A-C/112A-C energized 'ON' or 'OPEN' time periods 410/412/414. In operation, the electronic valve 110A-C/112A-C energized 'ON' or 'OPEN' and 'OFF' or 'CLOSED' several times within the time periods 410/412/414. The 'OFF' or 'CLOSED' resting pulse period 416 allows the ingredient 210/212/214 pumps/metering devices 550/552/554 to recover and repressurize the ingredient 210/212/214 supply lines and refill the pressure reservoirs 126A-C.

In an exemplary embodiment, such resting pulse period 416 can be predetermined and set to occur each time an ingredient 210/212/214 is need to be injected into the blending chamber 128. In other exemplary embodiments, the pressure of each ingredient can be measured by way of pressure sensor 106A-D and the resting pulse period 416 inserted into the electronic valve 110A-C/112A-C energized 'ON' or 'OPEN' time periods 410 in reference 'A', 412 in reference 'B', and 414 in reference 'C' when the ingredient pressure 210, 212, or 214 respectively falls below a predetermined ingredient pressure level as measure by the pressure sensors 106A-C. The frequency and time period of the resting pulse period can also be dynamically determined based on pressure sensor 106A-C readings during ingredient 210/212/214 injection into the blending chamber 128.

In an exemplary embodiment, the recipe pulse pattern 400 square waves 402/404/406 resting pulse periods 416 for each of the electronic valve 110A-C/112A-C energized 'ON' or 'OPEN' time periods 410/412/414 can be dynamically machine-learned over time by correlating the pressure sensor 106A-C reading during ingredient 210/21/214 injection into the blending chamber over many mixing chamber 536 refills and for different recipe pulse patterns 400 and different ingredients 210/212/214, as may be required and/or desired in a particular embodiment.

In an exemplary embodiment, in operation, the memory 504 can be encoded with instructions that when executed by the microcontroller 502 perform the steps of inserting one or more of a resting pulse period 416 into the recipe pulse sequence 400 turning 'OFF' or 'CLOSING' the electronic valve 110A-C/112A-C. And, allowing during the resting pulse period 416 the pressure reservoir 126A-C to repressurize before turning the electronic valve 110A-C/112A-C back 'ON' or 'OPENING'.

Figure 14C:
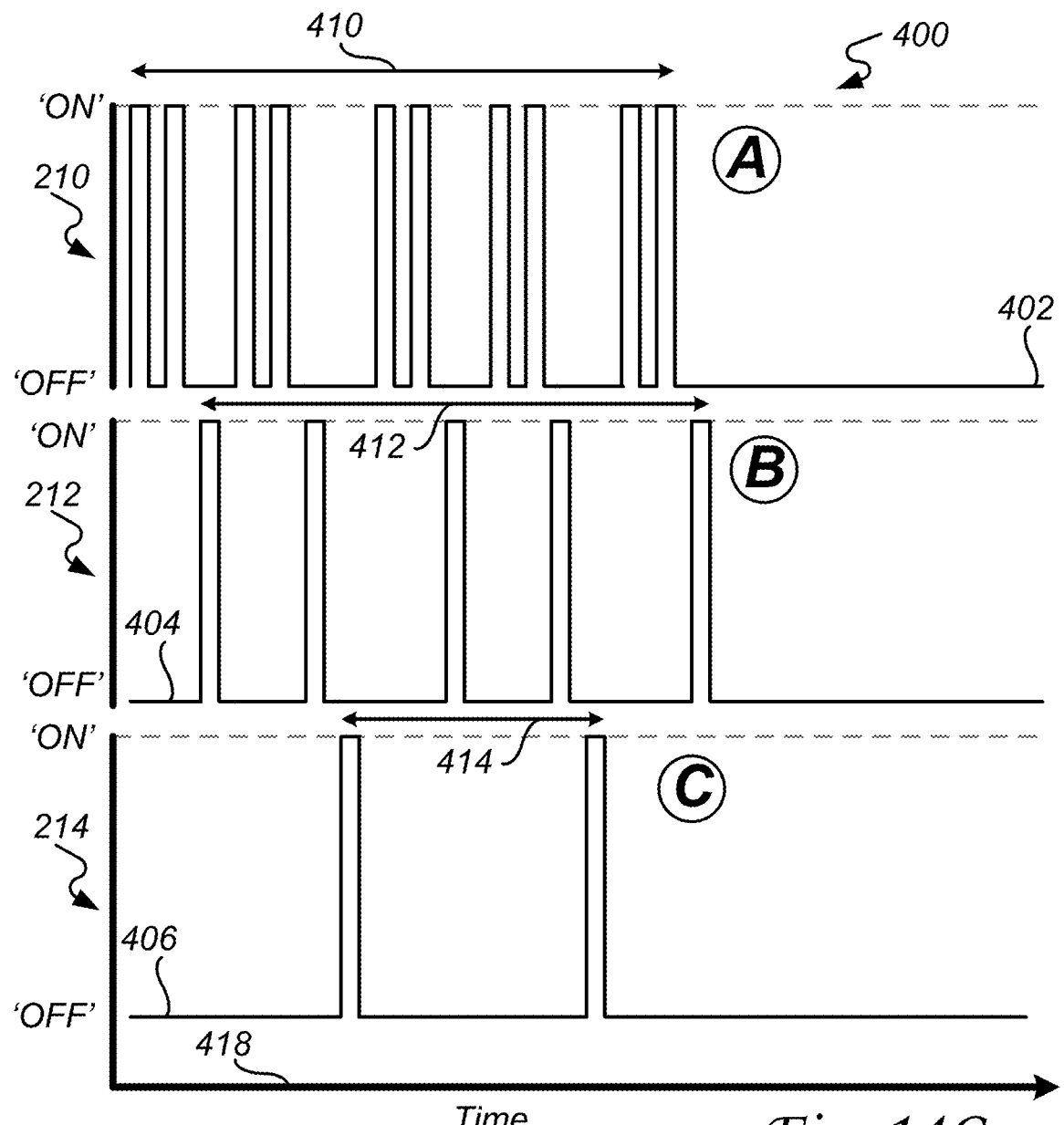
FIG. 14C illustrates one example of a subdivided recipe pulse sequence.

Referring to FIG. 14C, there is illustrated a recipe pulse sequence 400. The recipe pulse sequence 400 can be represented as a square wave 402/404/406 that indicates a time period 418 that an electronic valve 110A-C/112A-C is energized 'ON' or 'OPEN' 410/412/414 to allow ingredient 210/212/214 flow or in standby 'OFF' or "CLOSED" abating ingredient 210/212/214 flow.

In the present invention, the term "micro-blending" is intended to mean interspersing small portions of the ingredient 210/212/214 together in the blending chamber 128, increasing the surface area that each ingredient 210/212/214 is contacting each other ingredient 210/212/214.

In an exemplary embodiment, the mixing cylinder 536 can be filled with the food product 208 by dividing the recipe pulse sequence 400 into a subdivided recipe pulse sequence. The subdivided recipe pulse sequence can then be used to activate the electronic valve 110A-C/112A-C. The food product pressure 806 can be monitored by way of a pressure sensor 106D until the predetermined food product pressure 808 is reached. In this regard, the ingredients 306/308/310 are micro-blended in the blending chamber 128 to form the food product 208.

As an example, and not a limitation, with reference to FIG. 14C, in reference 'A' the recipe pulse sequence 400 is energizing 'ON' or 'OPEN' 410 electronic valve 110A/112A for ingredient 10 ten times, and in reference 'B' energizing 'ON' or 'OPEN' 412 electronic valve 110B/112B for ingredient 212 five times, and in reference 'C' energizing 'ON' or 'OPEN' 414 electronic valve 110C/112C for ingredient 214 two times.

Instead of operating the recipe pulse sequence 400, as illustrated in FIG. 14A, in a serial manner where 410 is initiated and completed, then 214 is initiated and completed, and then 414 is initiated and completed, the recipe pulse sequence 400 is subdivided and operated in a parallel manner. In this regard, in reference 'A' a portion of sequence 410 is completed and then in reference 'B' a portion of sequence 412 is completed, and then in reference 'A' a portion of sequence 414 is completed, repeating until the complete recipe pulse sequence 400 is completed. In this manner, a recipe pulse sequence 400 with:

10 pulses of 210/410 followed by;
8 pulses of 212/412 followed by;
2 pulses of 214/414;
can be transformed into a subdivided recipe pulse sequence 400 of:
2 pulses of 210/410 followed by;
1 pulse of 212/412 followed by;
2 pulses of 210/410 followed by;
1 pulse of 212/412 followed by;
1 pulse of 214/414 followed by;
2 pulses of 210/410 followed by;
1 pulse of 212/412 followed by;
2 pulses of 210/410 followed by;
1 pulse of 212/412 followed by;
1 pulse of 214/414 followed by;
2 pulses of 210/410 followed by;
1 pulse of 212/412.

An advantage in the present invention is that by converting a recipe pulse sequence 400 into a subdivided recipe pulse sequence 400 the ingredients are micro-blended by interspersing smaller portions of the ingredient 210/212/214 together in blending chamber 128. Such a subdivided recipe pulse sequence 400 micro-blending technique can create more surface area for the ingredients to contact each other which can promote things like better diffusion of gasses into the food product 208. Such better diffusion can aid in carbonation, and other aspects of gas mixing including dissolving, imbibing, entraining, and other gas-liquid interactions. Such other micro-blending advantages can include flavor dispersion, more rapid chilling and stirring once in the mixing cylinder 536, and other micro-blending advantages.

Figures 15, 16:
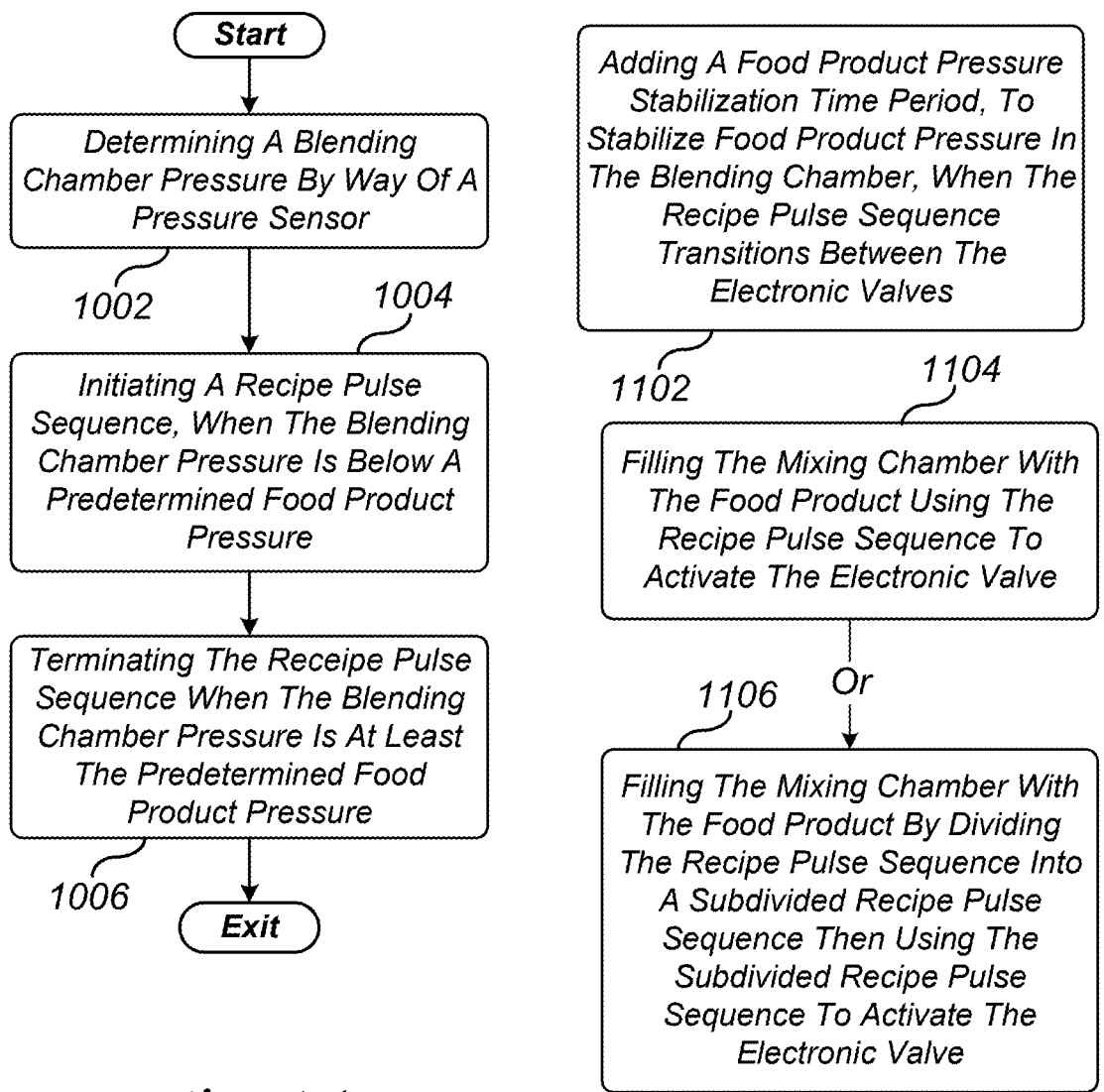
FIG. 15 illustrates one example of an ingredient blending method.
FIGS. 16-17 illustrates exemplary embodiments that can interchangeably be used with the methods of the present invention.

Referring to FIG. 15, there is illustrated one example of an ingredient blending method. In an exemplary embodiment, an ingredient blending method for use in frozen beverage equipment 602 and soft-serve ice cream equipment 604 begins in step 1002.

In step 1002, a food product pressure 806 is determined by way of a pressure sensor 106A-C. A manifold body 108 has at least one blending chamber 128, a front side, a backside, and a top side. The top side has more than one ingredient inlet port 130/132/134. The backside has more than one pressure reservoir 126A-D. The front side has more than one ingredient egress port 120A-C that intersects the pressure reservoirs 126A-C and more than one ingredient ingress port 122A-C that intersects the blending chamber 128.

More than one inlet conduit 120A-C can be fastened to each of the ingredient inlet ports 130/132/134. An ingredient supply line 210/212/214 can be interconnected with the inlet conduit 120A-C and supplies one or more of an ingredient 306/308/310 by injecting the ingredient 306/308/310 into the manifold body 108 through the ingredient inlet port 130/132/134.

More than one of the pressure sensors 106A-D can be secured within each of the pressure reservoirs 126A-D. The ingredient inlet port 130/132/134 intersects the pressure reservoirs 126A-C allowing the ingredients 210/212/214 to enter the pressure reservoirs 126A-C. The blending chamber 128 can intersect at least one of the pressure sensor reservoirs.

More than one electronic valve 110A-C/120A-C can be secured to the front side of the manifold body 108 such that when the electronic valve 110A-C/112A-C is in the 'ON or 'OPEN' position the ingredient 210/212/214 passes from the pressure reservoir 126A-C out of the ingredient egress port 120A-C, along the front side of the manifold body 108 under the electronic valve 110A-C/112A-C, through the ingredient ingress port 122A-C, and into the blending chamber 128 forming a food product 208. And, when the electronic valve 110A-C/112A-C is in the 'OFF' or 'CLOSED' position the ingredient 210/212/214 is prevented from egressing from the pressure reservoir 126A-C through the ingredient egress port 120A-C. At least one food product egress conduit 104 is fastened to the blending chamber 128 through which the food product 208 egresses the manifold body 108. The method then moves to step 1004.

In step 1004, a recipe pulse sequence 400 is initiated when the food product pressure 806 is below a predetermined food product pressure 808. The recipe pulse sequence 400 operates the electronic valves 110A-C/112A-C in an 'ON' or 'OPEN' and 'OFF' or 'CLOSED' manner in a predetermined sequence allowing predetermined portions of the ingredients 210/212/308 to enter the blending chamber 128. The method then moves to step 1006.

In step 1006, the recipe pulse sequence 400 is terminated when the food product pressure 806 is at least the predetermined food product pressure 808. The method is then exited.

In an exemplary embodiment, in operation, a mixing cylinder 536 is interconnected to the food product egress conduit 104 and receives the food product 208. The mixing cylinder 536 comprises an auger 534 for circulating the food product 208 within the mixing cylinder 536 and a dispense valve 548 for dispensing the food product 208 from the mixing cylinder 536.

A control system 500 comprises a microcontroller 502, a memory 504, a valve controller 570 that is operationally related to the electronic valve 110A-C/112A-C, and a pressure sensor controller 560 that is operationally related to the pressure sensor 106A-D. The memory 504, the valve controller 570, and the pressure sensor controller 560 are operationally related to the microcontroller 502.

The memory 504 is encoded with instructions that when executed by the microcontroller 502 perform the steps of determining a food product pressure 806 by way of the pressure sensor 106D. Initiating a recipe pulse sequence 402/402/406, when the food product pressure 806 is below a predetermined food product pressure 808. The recipe pulse sequence 402/404/406 operating the electronic valves 110A-C/112A-C in an 'ON' and 'OFF' manner in a predetermined sequence allowing a predetermined portion of the ingredients 210/212/214 to enter the blending chamber 128. And terminating the recipe pulse sequence 402/404/406 when the food product pressure 806 is at least the predetermined food product pressure 808.

Referring to FIG. 16, there are illustrated exemplary embodiments that can interchangeably be used with the methods of the present invention.

In step 1102, a food product pressure stabilization time period 408 is added to the to the recipe pulse sequence 400, to stabilize food product pressure 806 in the blending chamber 128, when the recipe pulse sequence 400 transitions between one or more of the electronic valve 110A-C/112A-C. In this regard, the food product pressure 806 is allowed to stabilize before the next one or more of the ingredients 210/212/214 are added to the blending chamber 128.

The ingredient blending method can transition between steps 1104 and 1106. In step 1104, the mixing cylinder 536 is filled with food product 208 using the recipe pulse sequence 400 to activate the electronic valves 110A-C/112A-C and monitor the food product pressure 806 until the predetermined food product pressure 808 is reached. Or, in step 1106 the mixing cylinder 536 is filled with the food product 208 by dividing the recipe pulse sequence 400 into a subdivided recipe pulse sequence as better illustrated in at least FIG. 14C. The subdivided recipe pulse sequence is then used to activate the electronic valve 110A-C/112A-C and monitor the food product pressure 806 until the predetermined food product pressure 808 is reached. In this regard, micro-blending of the ingredients 210/212/214 is improved.

Figure 17:
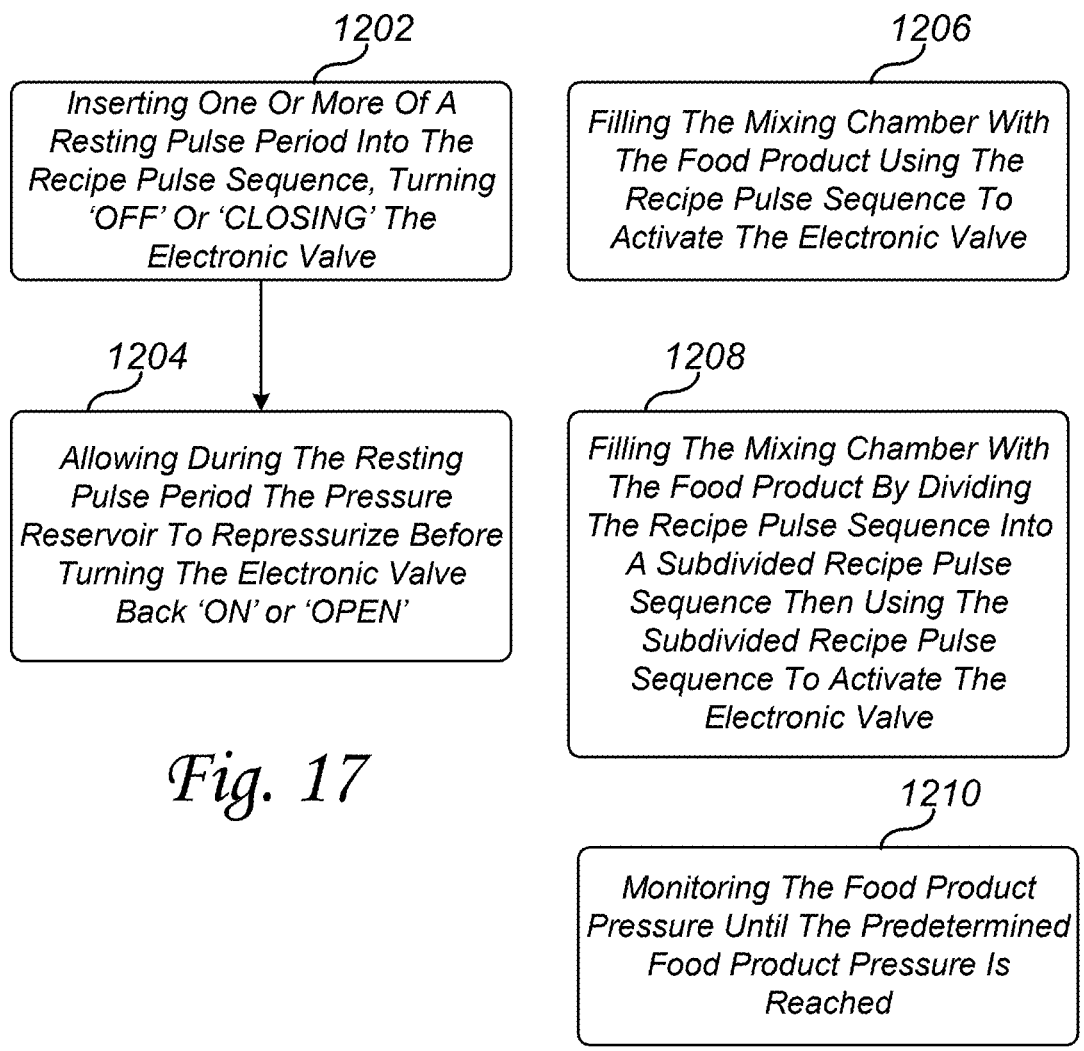

Referring to FIG. 17, there is illustrated an exemplary embodiment that can interchangeably be used with the methods of the present invention. The ingredient blending method performs steps 1202 and 1204. In step 1202, one or more of a resting pulse period 416 can be inserted into the recipe pulse sequence 400 turning 'OFF' or 'CLOSING' the electronic valve 110A-C/112A-C. And in step 1204, during the resting pulse period 416 the pressure reservoir 126A-C is allowed to repressurize before turning the electronic valve 110A-C/112A-C back 'ON' or 'OPENING. Such resting pulse period 416 can range from millisecond to seconds depending on how quickly after electronic valve 110A-C/112A-C "OFF" or 'CLOSING' the pressure reservoir 126A-C repressurizes.

In step 1206, the mixing cylinder 536 is filled with food product 208 using the recipe pulse sequence 400 to activate the electronic valves 110A-C/112A-C and monitor the food product pressure 806 until the predetermined food product pressure 808 is reached.

In step 1208, the mixing cylinder 536 is filled with the food product 208 by dividing the recipe pulse sequence 400 into a subdivided recipe pulse sequence as better illustrated in at least FIG. 14C. The subdivided recipe pulse sequence is then used to activate the electronic valve 110A-C/112A-C and monitor the food product pressure 806 until the predetermined food product pressure 808 is reached. In this regard, micro-blending of the ingredients 210/212/214 is improved.

In step 1210, the food product pressure is monitored until the predetermined food product pressure is reached or otherwise achieved.

Referring to FIG. 18, there is illustrated one example of a method of blending ingredients for use in frozen beverage equipment or soft-serve ice cream equipment. In an exemplary embodiment, the method begins in step 1302 by drawing ingredients through a manifold body 108 using a pump 550 connected to an egress port 104. The manifold body 108 comprises a blending chamber 128, a plurality of ingredient egress ports 120A-C, a plurality of ingredient ingress ports 122A-C, a plurality of pressure reservoirs 126A-C, and a plurality of inlet conduits 102A-C. The pump 550 creates suction, effectively pulling the ingredients from the inlet conduits 102A-C through the pressure reservoirs 126A-C and into the blending chamber 128. This step ensures the system operates without the need for positive pressure pumps, simplifying the system design and enhancing reliability. The suction-driven operation also minimizes the risk of ingredient contamination by maintaining a closed system, which is critical for food safety and hygiene.

In step 1304, at least one ingredient egress port 120A-C is maintained in a permanently open state using a valve cap 140. The valve cap 140 is configured to provide continuous fluid communication between the corresponding egress port 120A-C and ingress port 122A-C, enabling a consistent flow of ingredients. This configuration eliminates the need for electronic control mechanisms for the permanently open port, reducing system complexity and maintenance requirements. Additionally, the use of valve caps 140 simplifies the overall system by providing a passive flow control mechanism, which improves reliability and reduces the likelihood of component failure in high-demand environments. This step is particularly beneficial for applications requiring constant ingredient flow, such as maintaining a steady supply of base mixtures for frozen beverages.

Step 1306 involves configuring the diameters of the ingredient egress ports 120A-C and the corresponding ingredient ingress ports 122A-C to achieve ratiometric mixing. By carefully selecting port dimensions, the system ensures precise control over the proportions of each ingredient entering the blending chamber 128. For example, a smaller diameter egress port 120C may be used for a gas portion, while larger diameters may accommodate liquid ingredients with higher flow requirements. This configuration allows for consistent mixing ratios tailored to the desired product specifications. Additionally, the ability to adjust port dimensions enables the system to accommodate a wide range of ingredient viscosities and flow characteristics, providing versatility in product formulation. This step ensures that each ingredient contributes to the final product in the intended proportions, which is essential for maintaining flavor, texture, and quality.

In step 1308, the ingredients are blended within the blending chamber 128 to form a food product 208. The blending chamber 128 is designed to ensure thorough mixing of all ingredients 306/308/310, leveraging the suction-driven flow and the ratiometric configuration of the ports. This step produces a homogenous mixture that meets the required quality and consistency standards for frozen beverages or soft-serve ice cream products. The design of the blending chamber 128 minimizes dead zones where ingredients could accumulate, ensuring uniformity throughout the product. Additionally, the chamber's construction materials are chosen for durability and food safety, further enhancing the system's reliability in commercial applications.

The method utilizes an ingredient blending system having a manifold body 108, blending chamber 128, and pump 550 configured to draw ingredients through the manifold body 108 by suction. This approach streamlines the blending process, reduces operational complexity, and ensures consistent product quality. The suction-based operation not only eliminates the need for positive pressure pumps but also reduces energy consumption, making the system more cost-effective and environmentally friendly. Furthermore, the system's modular design allows for easy scalability, enabling manufacturers to adapt the method to various production volumes and ingredient types. This adaptability makes the method suitable for a wide range of applications, from small-scale artisan operations to large-scale commercial production.

Referring to FIG. 19, there is illustrated exemplary embodiments that can interchangeably be used with the methods of the present invention.

In step 1402, at least one pressure sensor 106A-D can be replaced with a sensor cap 142A-D to simplify the ingredient blending system. The manifold body 108 includes one or more pressure sensors 106A-D associated with the pressure reservoirs 126A-C to monitor ingredient pressure. By replacing selected pressure sensors 106A-D with sensor caps 142A-D, the system reduces reliance on electronic components, lowering costs and improving durability. Sensor caps 142A-D maintain the integrity of the pressure reservoirs 126A-C, allowing fluids to accumulate and flow as required without electronic monitoring. This modification is particularly advantageous in high-demand environments where minimizing maintenance and increasing system reliability are critical. The simplicity of sensor caps 142A-D also makes them an ideal solution for applications that do not require real-time pressure monitoring, further enhancing the ingredient blending system's adaptability.

In step 1404, the flow of ingredients is selectively controlled using one or more electronic valves 110A-C disposed on the ingredient egress ports 120A-C. The manifold body 108 includes the electronic valves 110A-C, which are configured to regulate the flow of specific ingredients dynamically. This step allows precise control over ingredient flow rates, enabling adjustments in real-time to accommodate varying product formulations or operational requirements. The use of electronic valves 110A-C provides enhanced flexibility, allowing operators to activate or deactivate specific ingredient lines as needed. This capability is particularly useful in applications requiring frequent changes in ingredient ratios or flow patterns, such as producing customized food products. Additionally, the integration of electronic valves 110A-C ensures consistency in ingredient delivery, reducing variability and improving overall product quality. By leveraging the selective control capabilities of electronic valves 110A-C, the system achieves greater adaptability and precision, making it suitable for high-performance food and beverage production environments.

In step 1406, ingredient pressure within the pressure reservoirs 126A-C is monitored using one or more pressure sensors 106A-D. The manifold body 108 further comprises these pressure sensors 106A-D associated with the ingredient egress ports 120A-C to provide real-time feedback on the internal pressure of the system. This step ensures that the pressure levels are maintained within optimal ranges, preventing disruptions in ingredient flow or inconsistencies in product quality. The data collected by the pressure sensors 106A-D can be used to dynamically adjust the operation of the pump 550 or electronic valves 110A-C to ensure smooth system performance. This monitoring capability is particularly valuable in applications where precise ingredient delivery is critical, such as maintaining consistent texture and flavor in frozen beverages or soft-serve ice cream. Additionally, the integration of pressure sensors 106A-D enhances system reliability by providing early detection of potential blockages or pressure imbalances, enabling proactive maintenance and minimizing downtime.

In step 1408, a cleaning solution is introduced into the manifold body 108 through one or more inlet conduits 102A-C to clean the ingredient blending system. This step involves circulating the cleaning solution through the pressure reservoirs 126A-C, ingredient egress ports 120A-C, and blending chamber 128 to remove any residue or contaminants. The suction generated by the pump 550 ensures thorough distribution of the cleaning solution throughout the system, reaching all critical components. This cleaning process is designed to minimize downtime and labor requirements by eliminating the need for disassembly. Additionally, the use of food-safe cleaning solutions ensures compliance with hygiene standards, making the system suitable for high-demand commercial environments. By integrating this cleaning step into the operational workflow, the system maintains consistent performance and reduces the risk of cross-contamination between production cycles.

Figure 20:
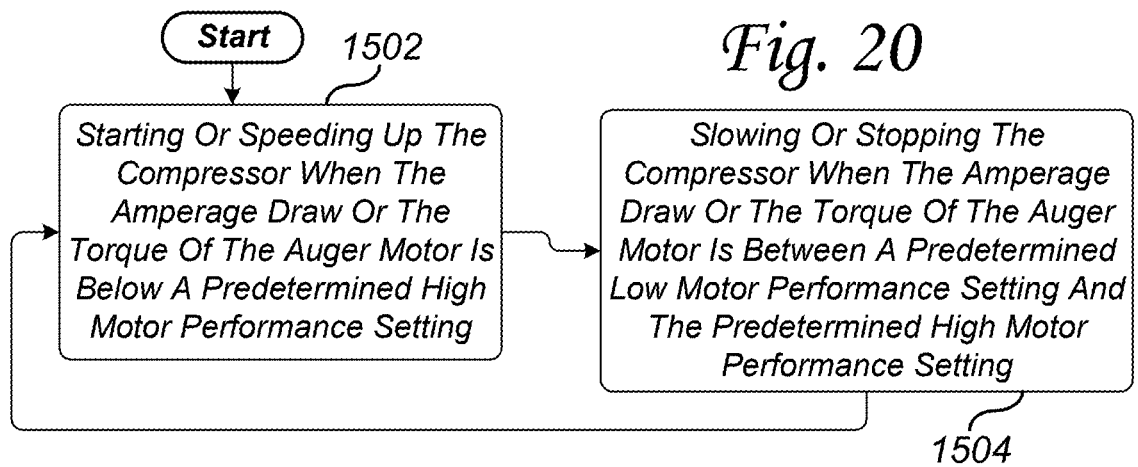
FIGS. 20-24 illustrate examples of an automatic viscosity control method for frozen food products dispensed from frozen beverage equipment and soft-serve ice cream equipment.

Referring to FIG. 20, there is illustrated one example of an automatic viscosity control method for frozen food products 302 dispensed from frozen beverage equipment 102 and soft-serve ice cream equipment 104. In an exemplary embodiment, a refrigeration system 568 can comprise a compressor 524. The refrigeration system 568 is configured to chill, into the predetermined frozen malleable consistency, the food product 302 inside the mixing cylinder 536. The memory 504 is encoded with instructions that, when executed by the microcontroller 502, transition between steps 1502 and 1504.

In step 1502, the compressor 524 is started or sped up when the amperage draw or the torque 214 of the auger motor 532 is below a predetermined high motor performance setting 218. And, in step 1004, the compressor 524 is slowed or stopped, in step 1504, when the amperage draw or the torque 214 of the auger motor 532 is between 232 a predetermined low motor performance setting 216 and a predetermined high motor performance setting 218.

In a plurality of exemplary embodiments, the compressor 524 can be a standard conventional compressor that can be turned 'ON' and 'OFF' or a variable speed compressor that can be turned 'ON' and 'OFF' as well as have variable speed controls to allow the compressors to be operated at different rotational speeds.

Figure 21:
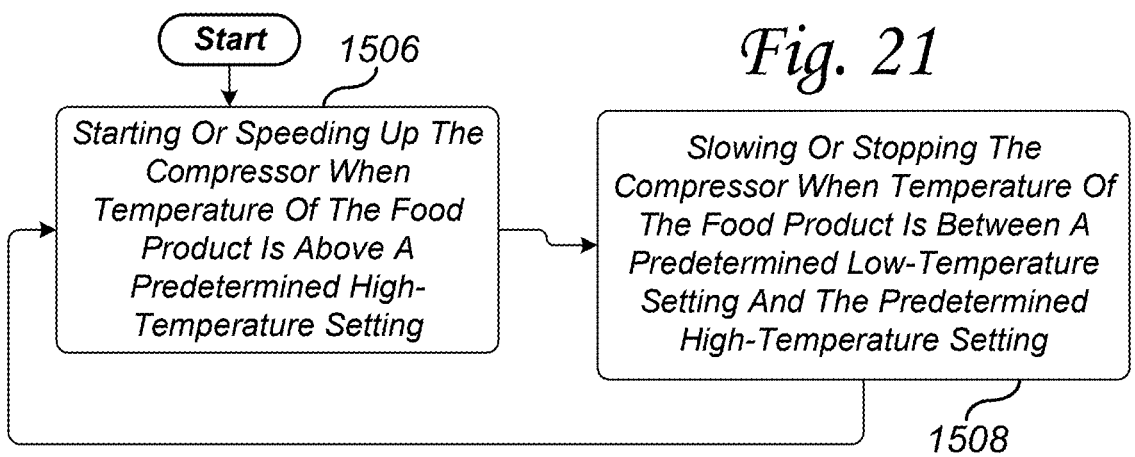

Referring to FIG. 21, there is illustrated one example of an automatic viscosity control method for frozen food products 302 dispensed from frozen beverage equipment 102 and soft-serve ice cream equipment 104. In an exemplary embodiment, the control system 500 further comprises a temperature sensor 516. The temperature sensor 516 is operationally related to the microcontroller 502 and the mixing cylinder 536. The temperature sensor 516 measures the temperature of the food product 302 inside the mixing cylinder 536. The memory 504 is encoded with instructions that, when executed by the microcontroller 502, transition between steps 1506 and 1508.

In step 1506, the compressor 524 is started or sped up when the temperature 306 of the food product 302 is above a predetermined high-temperature setting 206. And, in step 1508, the compressor 524 is slowed or stopped when temperature 204 of the food product 302 is between 232 a predetermined low-temperature setting 208 and the predetermined high-temperature setting 206, and the amperage draw or the torque 214 of the auger motor 532 is between 234 a predetermined low motor performance setting 216 and the predetermined high motor performance setting 218.

Figure 22:
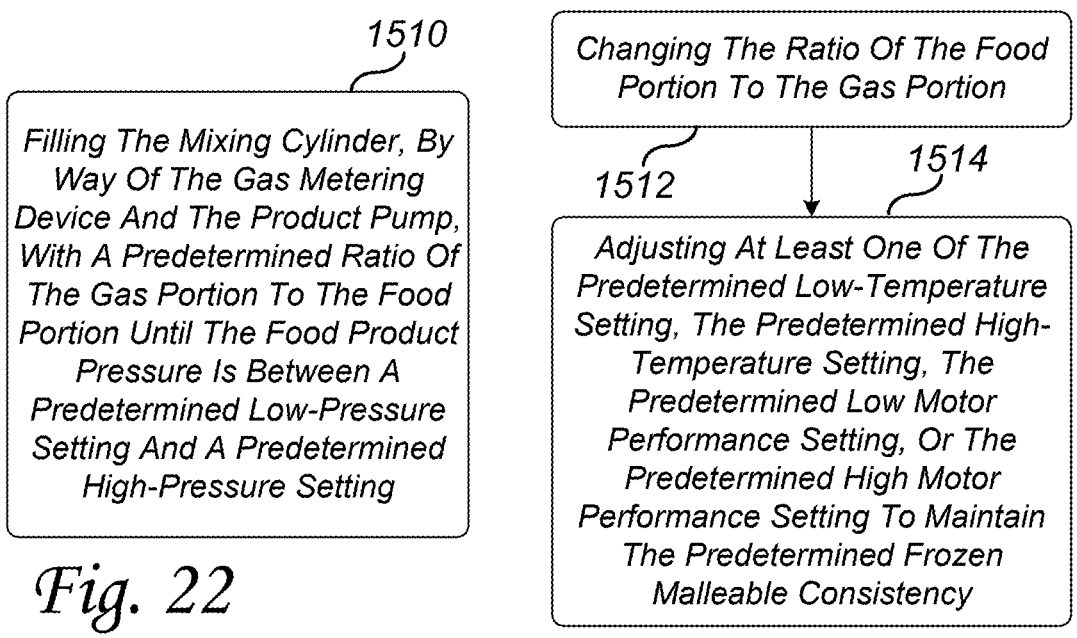

Referring to FIG. 22, there is illustrated one example of an automatic viscosity control method for frozen food products 302 dispensed from frozen beverage equipment 102 and soft-serve ice cream equipment 104. In an exemplary embodiment, a product pump 552 is operationally related to the microcontroller 502 and interconnected between the product inlet 566 and a supply of the food portion 306. A gas metering device 548 is operationally related to the microcontroller 502 and interconnected with a gas inlet 564. The mixing cylinder 536 further comprises the gas inlet 548, and the product inlet 566. A pressure sensor 560 is operationally related to the microcontroller 502. The pressure sensor 502 is configured to measure the food product 302 pressure 222 inside the mixing cylinder 536.

In step 1510, filling the mixing cylinder 536, by way of the gas metering device 548 and the product pump 552, with a predetermined ratio of the gas portion 304 to the food portion 306 until the food product pressure 222 is between a predetermined low-pressure setting 226 and a predetermined high-pressure setting 224.

In an exemplary embodiment, the food product 302 can comprise a food portion 306 and a gas portion 304. The food product 302 can also comprise a water portion 308, or other dilutants as may be required and or desired in a particular embodiment. Additionally, the gas portion 304 can be air, carbon dioxide, nitrogen, or other gas. In operation, the food portion 306, gas portion 304, and water or dilutant portion 308 can be precisely ratiometrically mixed in a predetermined manner by way of the pumps 548/552/572, gas metering devices 550, and other various valves in the system. Such ratiometric mixing can be changed to control viscosity, portion dispensed control, and other factors, as may be required and or desired in a particular embodiment.

In step 1512, the ratio of the food portion 306 to the gas portion can be changed. The method then moves to step 1514.

In step 1514, at least one of the predetermined low-temperature setting, the predetermined high-temperature setting, the predetermined low motor performance setting, or the predetermined high motor performance setting can be adjusted to maintain the predetermined frozen malleable consistency. As an example, and not a limitation, a food product 302 with a food portion 306 and a gas or air portion 304 ratios of 60/40, 50/50, 40/60, or other ratios will all have different mouth feels and different customer consumption benefits at the predetermined frozen malleable consistency which can also be called the ideal consistency. To maintain the predetermined frozen malleable consistency across various food portion 304 and a gas portion 306 ratio changes at least one of the predetermined low-temperature setting, the predetermined high-temperature setting, the predetermined low motor performance setting, or the predetermined high motor performance setting can be adjusted. The present invention will then automatically maintain the desired predetermined frozen malleable consistency for the ratio of food portion 306 to gas or air portion 304.

Figure 23:
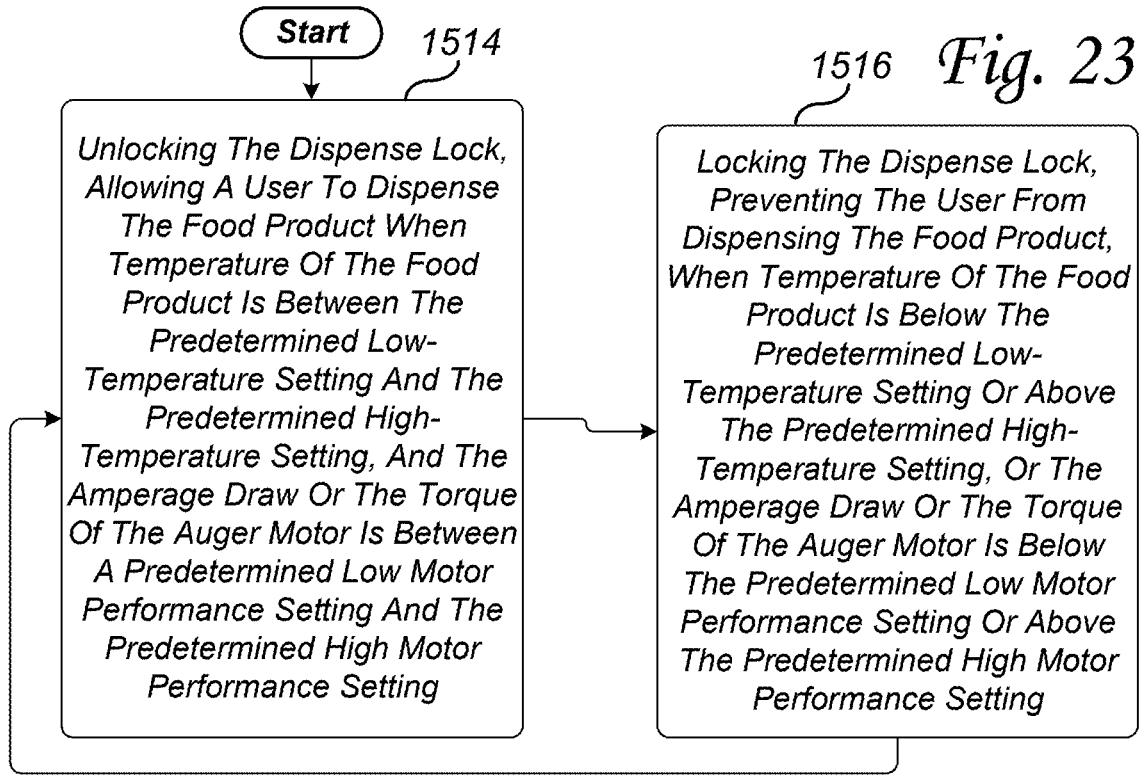

Referring to FIG. 23, there is illustrated one example of an automatic viscosity control method for frozen food products 302 dispensed from frozen beverage equipment 102 and soft-serve ice cream equipment 104. In an exemplary embodiment, a dispense lock 556/lockout controller 578 is operationally related to the microcontroller 502. The memory is encoded with instructions that, when executed by the microcontroller 502, transition between steps 1514 and 1516.

In step 1514, the dispense lock 556, by way of the lockout controller 578, is unlocked, allowing a user 402 to dispense the food product 302 when the temperature 204 of the food product 302 is between the predetermined low-temperature setting 208 and the predetermined high-temperature setting 206, and the amperage draw or the torque 214 of the auger motor 532 is between 234 a predetermined low motor performance setting 216 and the predetermined high motor performance setting 218. And, in step 1516, locking the dispense lock 556, by way of the lockout controller 578, preventing the user 402 from dispensing the food product 302, when the temperature 204 of the food product 302 is below the predetermined low-temperature setting 208 or above the predetermined high-temperature setting 206, or the amperage draw or the torque 214 of the auger motor 532 is below the predetermined low motor performance setting 216 or above the predetermined high motor performance setting 218.

Figure 24:
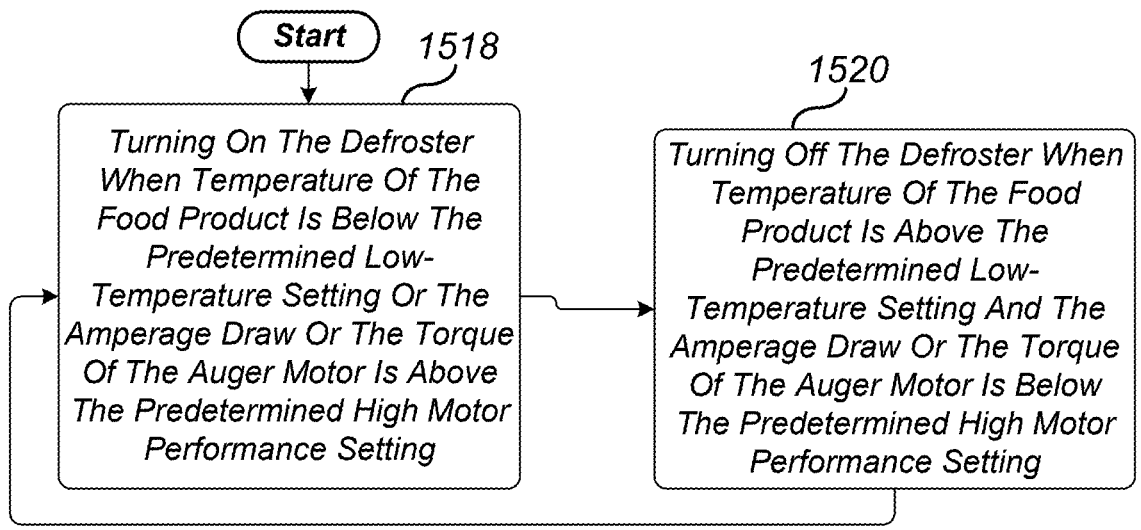

Referring to FIG. 24, there is illustrated one example of an automatic viscosity control method for frozen food products 302 dispensed from frozen beverage equipment 102 and soft-serve ice cream equipment 104. In an exemplary embodiment, a defroster 516/518 is operationally related to the microcontroller 502. The memory 504 is encoded with instructions that, when executed by the microcontroller 502, transition between steps 1518 and 1520.

In step 1518, turning 'ON' the auger motor 532, by way of the motor controller 518, and defroster 576 when temperature 204 of the food product 302 is below the predetermined low-temperature setting 208, or the amperage draw or the torque 214 of the auger motor 532 is above the predetermined high motor performance setting 218. And, in step 1520, turning 'OFF' the defroster 518 and auger motor 532 when temperature 204 of the food product 302 is above the predetermined low-temperature setting 208 and the amperage draw or the torque 214 of the auger motor 532 is below the predetermined high motor performance setting 218.

Figure 25:
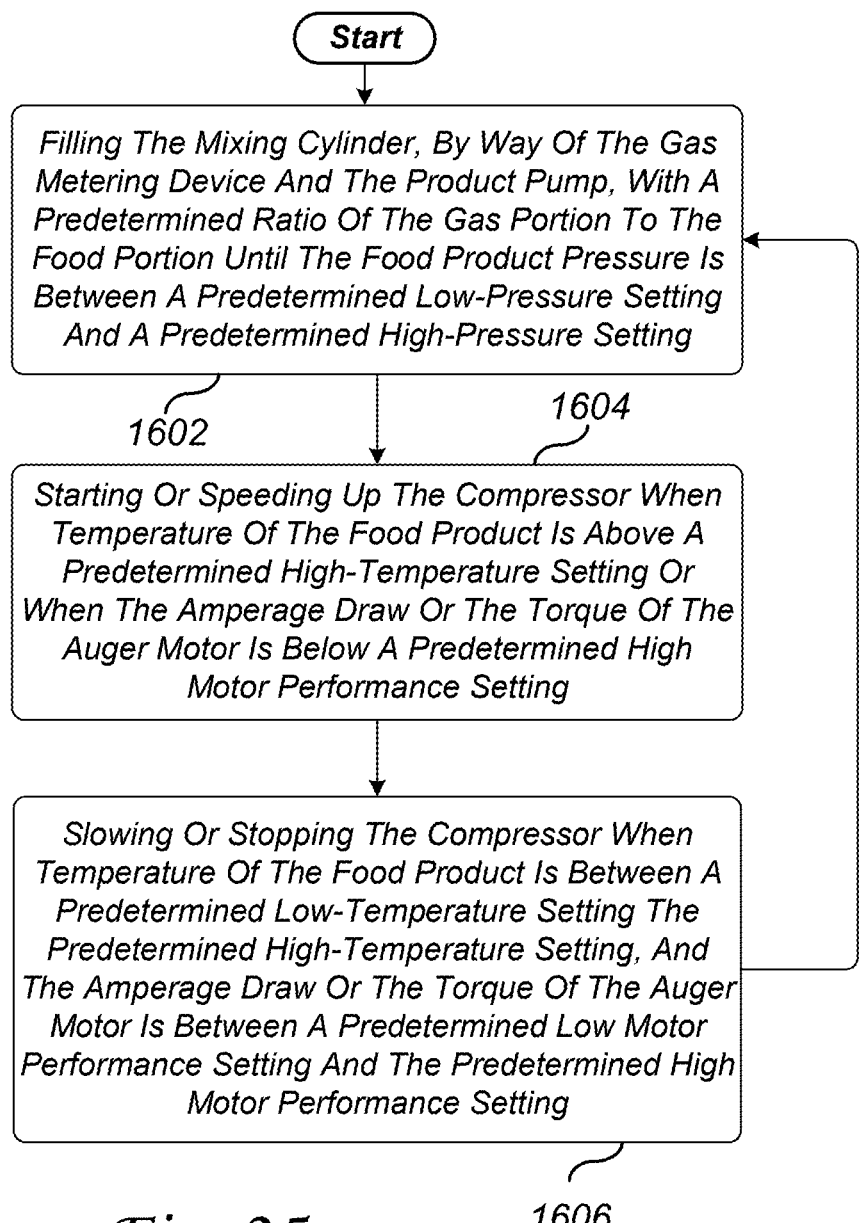

Referring to FIG. 25, there is illustrated one example of an automatic viscosity control method for frozen food products 302 dispensed from frozen beverage equipment 102 and soft-serve ice cream equipment 104. In an exemplary embodiment, an automatic viscosity control system for food products dispensed from frozen beverage equipment and soft-serve ice cream equipment can comprise a mixing cylinder 536 which comprises at least one of an auger 534, at least one of a product inlet 566 through which a food portion 306 is injected into the mixing cylinder 536, and at least one of a gas inlet 564 through which a gas portion 304 is injected into the mixing cylinder 536.

A food product 302 comprises the food portion 306 and the gas portion 304. An auger motor 532 is interconnected with the auger 534. The auger 534 is positioned inside the mixing cylinder 536.

A control system 500 comprises a microcontroller 502, and a memory 504. A motor sensor 520/522 is operationally related to the microcontroller 502 and interconnected with the auger motor 532. The motor sensor 520/522 measures an amperage draw or a torque of the auger motor 532 resultant from the resistance of rotating the auger 534 through the food product 302. A gas metering device 550 is operationally related to the microcontroller 502 and interconnected with a gas inlet 564. The mixing cylinder 536 further comprises the gas inlet 564, and the product inlet 566. A pressure sensor 560 is operationally related to the microcontroller 502. The pressure sensor 520 is configured to measure the pressure of the food product 302 inside the mixing cylinder 536.

A refrigeration system 568 comprises a compressor 524. The compressor 524 is operationally related to the microcontroller 502 and configured to chill, into the predetermined frozen malleable consistency, the food product 302 inside the mixing cylinder 536.

The memory 504 is encoded with instructions that when executed by the microcontroller 502 the begins in step 1602 filling the mixing cylinder 536, by way of the gas metering device 550 and the product pump 552, with a predetermined ratio of the gas portion 304 to the food portion 306 until the food product pressure 222 is between a predetermined low-pressure setting 226 and a predetermined high-pressure setting 224. The method then moves to step 1604.

In step 1604, the compressor 524 is started or sped up when the temperature of the food product 302 is above a predetermined high-temperature setting 208 or when the amperage draw or the torque of the auger motor 532 is below a predetermined high motor performance setting 218. The method then moves to step 1606.

In step 1606, the compressor 524 is slowed or stopped when the temperature of the food product 302 is between a predetermined low-temperature setting 206 and the predetermined high-temperature setting 208, and the amperage draw or the torque of the auger motor 532 is between a predetermined low motor performance setting 216 and the predetermined high motor performance setting 218.

Figure 26:
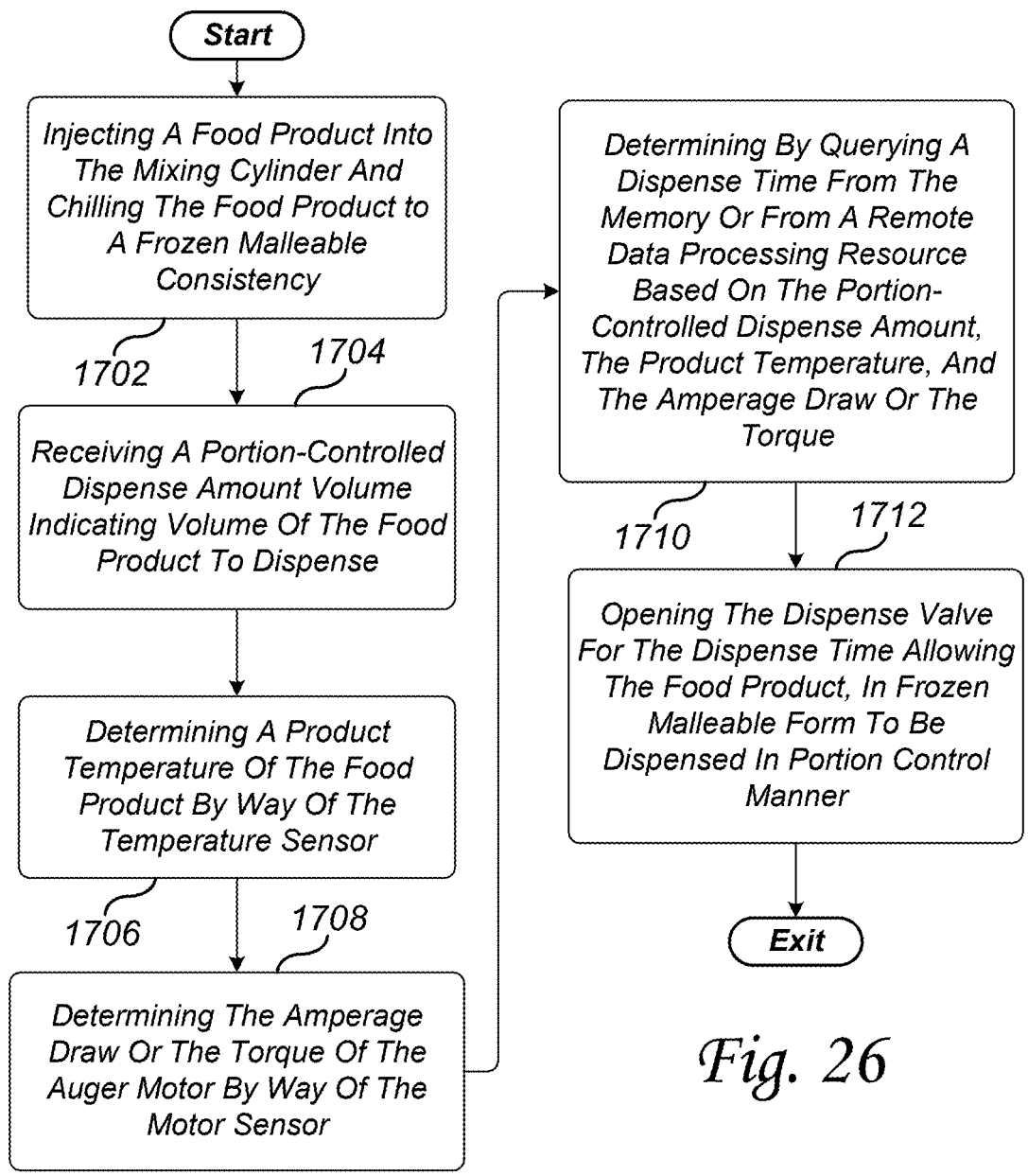

Referring to FIG. 26, there is illustrated one example of a portion control method for food products 302 dispensed from frozen beverage equipment 102 and soft-serve ice cream equipment 104. In an exemplary embodiment, a mixing cylinder 536 comprises at least one of an auger 534, at least one of a product inlet 566, and at least one of a dispense valve 548. An auger motor 532 is interconnected with the auger 534. The auger 534 is positioned inside the mixing cylinder 536. A control system 500 comprises a microcontroller 502, a memory 504, a temperature sensor 516, and a motor sensor 520 (torque monitoring)/520 (electrical current sensing). The temperature sensor 516 is operationally related to the mixing cylinder 536. The temperature sensor 516 measures the temperature 204 of the food product 302 inside the mixing cylinder 536. The motor sensor 520/522 is operationally related to the auger motor 532. The motor sensor 520/522 measures a torque 520 or an amperage draw 522 of the auger motor 532 resultant from the resistance of rotating the auger 534 through the food product 302. The memory 504 is encoded with instructions that, when executed by the microcontroller 502, perform the following steps beginning in step 1702.

In step 1702, a food product 302 is injected into the mixing cylinder 536 and chilled to a predetermined frozen malleable consistency. The method then moves to step 1704.

In step 1704, a portion-controlled dispense amount volume indicating the volume of the food product to dispense is received, In an exemplary embodiment, the step of receiving the portion-controlled dispense amount volume is effectuated by a data communication from a point-of-sale device, a quick-serve restaurant data processing device, a customer 404 or user 402 initiated data communication from a digital communication device 606, a remote data communication from the remote data processing resource 604, manual data entry by the user 402 or the customer 404 at the portion control system 500, or by other methods or techniques. The method then moves to step 1706.

In step 1706, a product temperature 204 of the food product 302 is determined by way of the temperature sensor 516. The method then moves to step 1708.

In step 1708, the amperage draw or the torque 214 of the auger motor 532 is determined by way of the motor sensor 520/522. The method then moves to step 1710.

In step 1710, a dispense time is determined by a query from the memory 504 or from a remote data processing resource 604 based on the portion-controlled dispense amount volume, the product temperature 204, and the amperage draw or the torque 214. In an exemplary embodiment, the step of determining by querying the dispense time is effectuated by way of a lookup table or a database encoded in the memory 504, the lookup table and/or the database correlates a plurality of the dispense times 210 based on a plurality of the portion-controlled dispense amounts volume, a plurality of the product temperatures 204, and a plurality of the amperage draw or the torque 214 measurements, or effectuated by other methods or techniques. The method then moves to step 1712.

In step 1712, the dispense valve 548 is opened for the dispense time allowing the food product 302, in a predetermined frozen malleable consistency, to be dispensed in a portion-controlled manner. The method is then exited.

In an exemplary embodiment, the food product 302 can comprise a food portion 306 and a gas portion 304. The food product 302 can also comprise water 308, or other dilutants as may be required and or desired in a particular embodiment. Additionally, the gas portion 304 can be air, carbon dioxide, nitrogen, or other gases. In operation, the food portion 306, gas portion 304, and water or dilutant portion 308 can be precisely ratiometrically mixed in a predetermined manner by way of the pumps 548/552/572, gas metering devices 550, and other various valves in the system. Such a ratiometric mix can be changed to control viscosity, portion dispense control, and other factors, as may be required and or desired in a particular embodiment.

Figure 27:
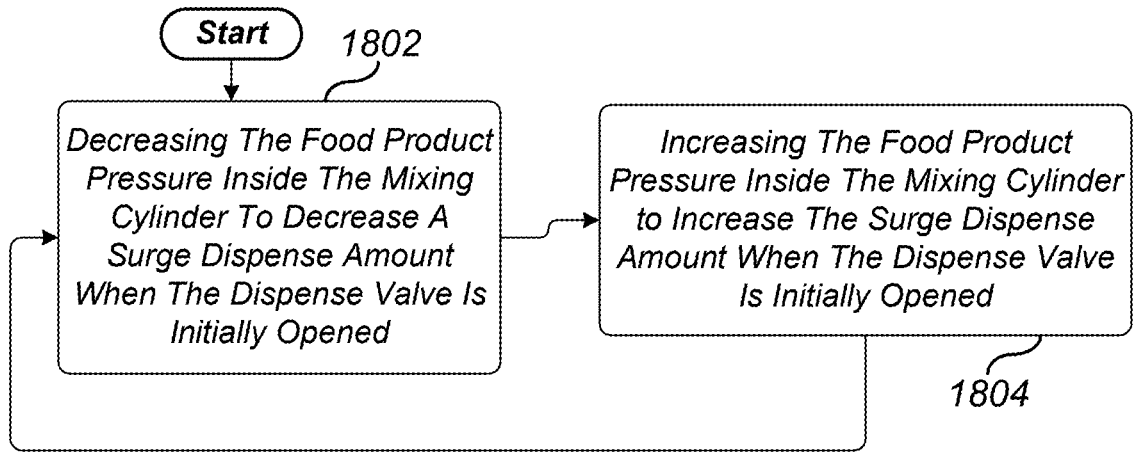

Referring to FIG. 27, there is illustrated one example of a portion control method for food products 302 dispensed from frozen beverage equipment 102 and soft-serve ice cream equipment 104. In an exemplary embodiment, a product pump 552 is operationally related to the microcontroller 502 and interconnected between the product inlet 566 and the supply of the food portion 306. A gas metering device 548 is operationally related to the microcontroller 502 and interconnected with a gas inlet 564. The mixing cylinder 536 further comprises the gas inlet 564 and the product inlet 566. A pressure sensor 560 is operationally related to the microcontroller 502. The pressure sensor 560 is configured to measure the food product pressure 222 inside the mixing cylinder 536. The memory 504 is encoded with instructions that, when executed by the microcontroller 502, transition between steps 1802 and 1804.

In step 1802, decreasing the food product pressure 222 inside the mixing cylinder 536 decreases the surge dispense amount of the food product 302 when the dispense valve 548 is initially opened. And, in step 1804, increasing the food product pressure 222 inside the mixing cylinder 536 to increase the surge dispense amount of the food product 302 when the dispense valve 548 is initially opened.

Figure 28:
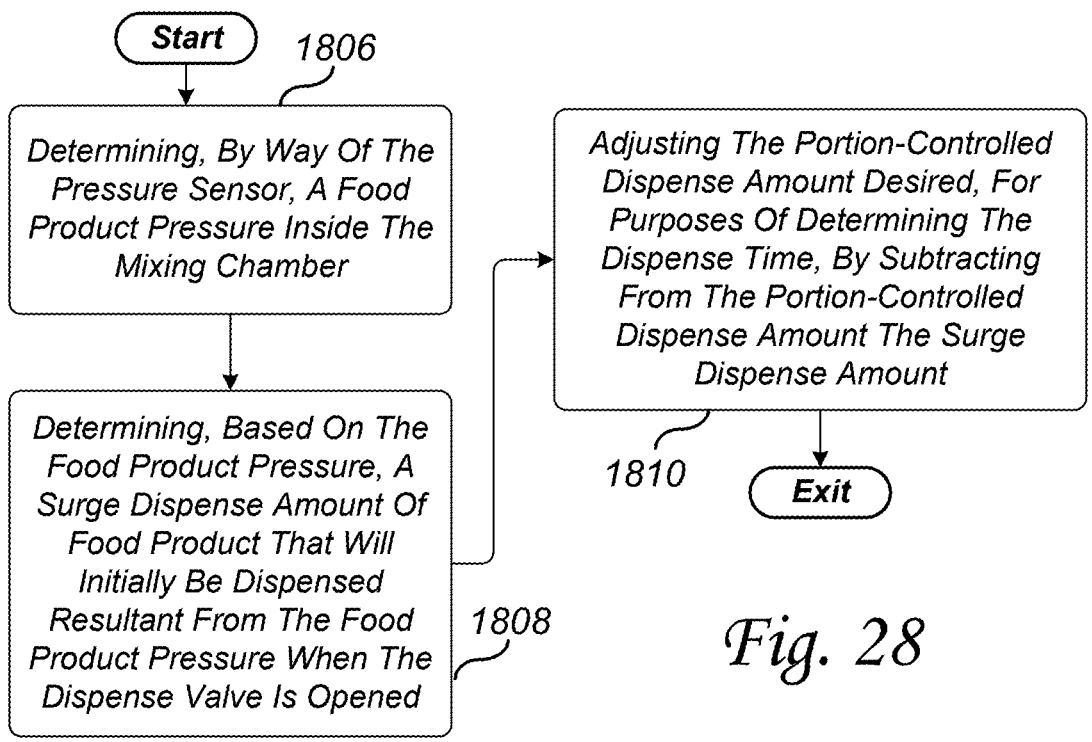

Referring to FIG. 28, there is illustrated one example of a portion control method for food products 302 dispensed from frozen beverage equipment 102 and soft-serve ice cream equipment 104. In an exemplary embodiment, a pressure sensor 560 is operationally related to the microcontroller 502. The memory 504 is encoded with instructions that, when executed by the microcontroller 502, perform steps 1806, 1808, and 1810.

In step 1806, the food product pressure 222 inside the mixing chamber 536 is determined by way of the pressure sensor 560. In an exemplary embodiment, the ratio of the gas portion 304, food portion 306, and, if necessary, the water portion 308 influences the food product pressure 222 when it reaches the desired predetermined frozen malleable consistency. When the dispense valve 548 is first opened, the food product pressure 222 forces a surge of food product to dispense out of the dispense valve 548. When the food product pressure 222 drops, it is then the auger 534 that pushes the food product 302 out of the dispense valve 548. The method then moves to step 1808.

In step 1808, a surge dispense amount of food product that will initially be dispensed resultant from the food product pressure 222 when the dispense valve is opened is determined, based on the food product pressure 222. The method then moves to step 1810.

In step 1810, the portion-controlled dispense amount volume desired is adjusted, for purposes of determining the dispense time, by subtracting from the portion-controlled dispense amount volume the surge dispense amount.

In an exemplary embodiment, the food product pressure 222 is sufficient to force a surge dispense amount of food product 302 out of the dispense valve 548 when opened. Once the food product pressure 222 drops resultant from the surge dispense amount, egress through the dispense valve 548, it is the auger 534 that pushes the remaining desired food portion through the dispense valve 548. In a portion-controlled application, the surge dispense amount should be subtracted from the portion-controlled dispense amount volume before the dispense time is determined to better ensure food product 302 dispense accuracy.

Referring to FIG. 29, there is illustrated one example of a portion control method for food products 302 dispensed from frozen beverage equipment 102 and soft-serve ice cream equipment 104. In an exemplary embodiment, the portion control system can be trained by encoding the memory 504 instructions that, when executed by the microcontroller 502, perform the following steps beginning in step 1902.

In step 1902, the food product 302 can be dispensed in a predetermined frozen malleable consistency form. The method then moves to step 1904.

In step 1904, the volume of food product dispensed is then determined. In this regard, since training is an iterative process, the amount of dispense can vary to create an array of different data points. The method then moves to step 1906.

In step 1906, a training dispense time is determined in which the volume of food product was dispensed. In this regard, the dispense is timed so that a volume per second determination can be determined. The method then moves to step 1908.

In step 1908, the product temperature 204 of the food product is determined by way of the temperature sensor 516. The method then moves to step 1910.

In step 1910, the amperage draw or the torque 214 of the auger motor 532 can be determined by way of the motor sensor 520/522. The method then moves to step 1912.

In step 1912, storing in a lookup table or a database, in the memory 504 or accessible on the remote data processing resource 604, the training dispense time duration, the volume of food product dispensed, the product temperature 204, and the amperage or the torque 214 of the auger motor. In this regard, during normal operational use, the lookup table or the database is updated and becomes queryable to determine the dispense time based on a desired portion-controlled dispense amount volume.

In an exemplary embodiment, the food product pressure 222 can also be correlated with other variables and stored in a lookup table or a database, in the memory 504 or accessible on the remote data processing resource 604.

Referring to FIG. 30, there are illustrated exemplary embodiments utilized with the methods of the present invention.

In step 1914, the auger motor 532 can be stopped while the surge dispense amount is being dispensed. In this regard, stopping the auger motor 532 and thus the auger 534 during the surge period allows the surge amount to be predictably dispensed without the aid of the auger 534. Once the surge amount has been dispensed the auger 534 by way of the auger motor 532 can be restarted and it is then the action of the auger 534 that causes the food product 302 to be dispensed.

In step 1916, the auger motor 532 can be slowed or stopped when the temperature 204 of the food product 302 is above the predetermined high-temperature setting 206.

In step 1918, reducing, during dispense of the food product 302, the auger motor speed 502 proportionally as the temperature 204 of the food product 302 increases, or the amperage draw 214 decreases, or the torque 214 decreases. In this regard, as the viscosity of the food product decreases (thins), the auger motor 532 speed decreases to maintain a constant flow rate of the food product 302 during dispense.

In step 1920, communicating an alarm condition by way of a display 506 or data communication with a remote data processing resource 604 when a predetermined refrigeration chill period 230 elapses. The control system 500 comprises the display 506, and the display 506 is operationally related to the microcontroller 502. In this regard, the predetermined refrigeration chill period 230 is the amount of time allotted for the food product 302 to reach a predetermined frozen malleable consistency, after which a problem with the frozen beverage equipment 102 and soft-serve ice cream equipment 104 can be suspected.

Referring to FIG. 31, there is illustrated one example of a method of maintaining a frozen food dispensing system. In an exemplary embodiment, the frozen food dispensing system described herein integrates mechanical, thermal, and electronic subsystems to automatically prepare, freeze, dispense, and sanitize a food product with minimal or no user intervention. At its core, the system includes a mixing cylinder 536 that is configured to receive both a food portion 302 and an optional gas portion (e.g., nitrogen, oxygen, or $CO_2$ introduced through a gas line not shown). Disposed within the mixing cylinder is an auger 534, which is rotatable by an auger motor 538. The auger continuously or intermittently rotates during freezing and dispensing operations to promote homogenous blending and maintain the desired texture of the product while also transporting it toward the dispensing outlet.

Thermal regulation is managed by a refrigeration system 568, which includes a compressor 572 in thermal communication with the mixing cylinder. The compressor is selectively activated to chill the blended food product within the mixing cylinder to a predetermined frozen but malleable consistency suitable for dispensing. The refrigeration system may include standard vapor compression elements such as an evaporator, condenser, and expansion valve, all managed by the system's control logic.

To facilitate ingredient introduction, the system further includes a manifold 100. The manifold comprises a blending chamber 128 into which a plurality of ingredient inlets 102A, 102B converge. At least one ingredient egress port 104 directs the fully blended input into the mixing cylinder. The manifold is designed to blend liquid or gas-based components, such as food bases, syrups, carbonated fluids, or cleaning agents, into a consistent composition before freezing.

The system's intelligent control system 500 includes a microcontroller 502, onboard memory 504, and a motor sensor 508 coupled to the auger motor 538. The motor sensor monitors torque or amperage draw, both of which serve as proxies for resistance against the auger during operation. These values reflect the viscosity of the product inside the mixing cylinder. The control system uses this data to determine whether the compressor 572 should be cycled on or off in order to maintain the product within a target viscosity range. By comparing real-time motor load against predetermined thresholds stored in memory, the system ensures consistent texture from batch to batch.

Additionally, the control system manages blending operations by interpreting signals from a pressure sensor 106A located in or near the blending chamber 128, and by controlling one or more electronic valves 112A on the ingredient inlets. If pressure drops below a specified minimum, the control system may initiate a recipe sequence by opening the valves 112A to allow one or more ingredients into the blending chamber. The flow is monitored in real time and terminated once the pressure reaches a predetermined maximum level, ensuring accurate portioning and homogenous mixing.

In addition to normal food preparation, the system is designed to support a fully automated clean-in-place (CIP) procedure, which eliminates the need for manual disassembly or user access to internal components. In step 2002, the control system 500 initiates a clean-in-place cycle. This may be triggered automatically based on elapsed run-time, through a daily sanitation schedule, or via user interface 510.

In step 2004, the system begins to thaw any frozen product 302 remaining within the mixing cylinder 536. The compressor 572 is deactivated, and warming may be achieved through passive ambient exposure or active heating elements 574, depending on system configuration. This step ensures that all semi-solid or solid food remnants soften to a pumpable or drainable state.

In step 2006, the thawed contents are purged from both the blending manifold 100 and the mixing cylinder 536. This is achieved by activating internal drain valves (not shown), or using gravity-assisted evacuation paths. In some embodiments, purge valves are part of an extended valve manifold assembly positioned near egress port 104.

In step 2008, the system injects rinse water and cleaning solution through the ingredient inlets 102A, 102B and into the manifold 100. The cleaning fluid is conveyed through the same internal channels used for product preparation. The auger 534 is rotated by the auger motor 538 during this cycle to facilitate surface agitation and maximize internal contact of the cleaning fluid.

In step 2010, the control system 500 monitors both the torque on the auger motor 538 and the temperature sensor 560 within the mixing cylinder to assess whether cleaning is complete. A low-load torque reading, combined with a steady-state elevated temperature, is indicative of clean internal surfaces and the absence of residual frozen product.

In step 2012, once clean status is confirmed, the system returns to standby or operation mode. The cleaning cycle ends, and the unit resumes readiness for the next dispense sequence. Throughout this process, the operator is not required to remove components, access internal plumbing, or perform any manual cleaning functions.

By continuously integrating real-time sensor feedback with intelligent recipe control and thermal cycling, the system achieves precise product formulation, delivery, and sanitation, making it especially suited for high-volume or unattended frozen food service environments.

The capabilities of the present invention can be implemented in software, firmware, hardware, or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

While the preferred embodiment of the invention has been described, it will be understood that those skilled in the art, both now and in the future, may make various improvements and enhancements which fall within the scope of the claims which follow. These claims should be construed to maintain the proper protection for the invention first described.

What is claimed is:
1. A frozen food dispensing system comprising:
   a mixing cylinder configured to receive a food portion and a gas portion;
   an auger disposed within the mixing cylinder and rotatable by an auger motor;
   a refrigeration system which includes a compressor and which is in thermal communication with the mixing cylinder and operable to chill a food product to a predetermined frozen malleable consistency;
   a manifold comprising a blending chamber, a plurality of ingredient inlets, and at least one ingredient egress port;
   a control system including a microcontroller, a memory, and a motor sensor operably coupled to the auger motor, the control system being configured to:
      monitor a motor performance of at least one of amperage draw or torque of the auger motor;
      receive temperature input from at least one thermal sensor disposed in or proximate to the mixing cylinder; and control the compressor based on a comparison between the motor performance being monitored and at least one predetermined motor performance setting;
wherein the control system uses both the auger motor resistance and the temperature readings to determine and maintain a target viscosity band and adjusts compressor duty cycle accordingly;
wherein the control system is configured to selectively switch between pressurized ingredient delivery and vacuum-based suction blending, depending on at least one ingredient, viscosity, or mode of operation.

2. The system of claim 1, wherein the manifold includes at least one non-actuated valve cap configured to maintain an associated egress port in a permanently open state for passive ratiometric blending without reliance on electromechanical flow regulation.

3. The system of claim 1, wherein the manifold supports both frozen food products and cleaning solution distribution during clean-in-place cycles, using dual-use inlets and electronically switched flow paths.

4. The system of claim 1, further comprising a gas metering device and a product pump, both operably connected to the manifold and controlled by the control system, wherein gas and liquid inputs may be blended simultaneously into the mixing cylinder during a controlled intake cycle.

5. The system of claim 1, wherein the control system is further configured to initiate a clean-in-place cycle including steps of thawing, purging, and flushing the mixing cylinder and manifold without disassembly, wherein all steps are automated and do not require user initiation or external equipment.

6. The system of claim 1, further comprising a dispensing valve controlled by the control system to provide portion-controlled product dispensing based on simultaneously sensed viscosity and temperature.

7. The system of claim 6, wherein the control system calculates a preliminary dispense time based on a lookup table stored in the memory, using inputs of temperature, motor resistance, and portion size, and applies an adjustment factor derived from historical calibration data to modify the preliminary dispense and produce a final calculated dispense time.

8. The system of claim 1, further comprising a cloud-based interface operable to remotely monitor, log, and initiate cleaning, operation, or standby cycles, wherein dispense data, clean-in-place history, and fault codes are uploaded in real-time for remote diagnostics.

9. The system of claim 1, wherein the control system is further configured to automatically switch between multiple product or cleaning inputs based on resource availability, detected depletion events, or scheduled routines.

10. The system of claim 1, wherein the manifold and mixing cylinder are configured to support pasteurization via controlled heating, with feedback-controlled ramp and hold cycles verified by embedded thermal sensors.

11. A method of using the system of claim 1, the method comprising the steps of:
initiating a clean-in-place cycle;
thawing frozen product in the mixing cylinder;
purging residual product from the blending manifold;
injecting rinse water and cleaning solution;
monitoring auger motor torque, pressure, product temperature, and treatment time to confirm clean status; and
returning the frozen food dispensing system to standby or operation mode without manual disassembly.

12. A frozen food dispensing system comprising:
a mixing cylinder;
an ingredient blending manifold having at least two ingredient inlets and a blending chamber;
a control system including a microcontroller, a pressure sensor, and at least one electronic valve; and
a refrigeration system configured to freeze a food product within the mixing cylinder;
wherein the control system is configured to initiate a recipe pulse sequence by opening the electronic valve when the pressure in the blending chamber is below a predetermined pressure, and terminate the sequence when the pressure reaches a predetermined level;
wherein the valve actuation timing is based on dynamically adjusted blend ratios.

13. The system of claim 12, wherein the pulse sequence includes resting periods to allow pressure reservoirs to recharge between pulses, based on flow rate monitoring or pressure decay modeling.

14. The system of claim 12, wherein the control system dynamically adjusts the pulse sequence based on the ingredient viscosity or blend target, and logs pulse profiles for future optimization.

15. The system of claim 12, wherein the ingredient blending manifold supports both frozen food products and cleaning solution distribution during clean-in-place cycles, using dual-use inlets and electronically switched flow paths.

16. The system of claim 12, wherein the blending chamber is configured for internal pressure stabilization prior to injection of ingredients from the blend chamber into the mixing cylinder.

17. A frozen food dispensing system for dispensing a frozen malleable food product, comprising:
a mixing cylinder containing a rotating auger and a dispense valve;
a control system comprising a microcontroller, a memory, a temperature sensor, and a motor sensor;
wherein the control system is configured to:
receive a portion-controlled dispense request;
determine temperature and viscosity of the food product based on sensor data;
query a dispense time from the memory based on a portion size, temperature, and auger resistance; and
operate the dispense valve for the dispense time;
wherein the control system is configured to selectively switch between pressurized ingredient delivery and vacuum-based suction blending, depending on at least one ingredient, viscosity, or mode of operation;
wherein a consistent portion of the frozen malleable food product is dispensed.

18. The system of claim 17, wherein the control system is further configured to detect surge pressure and compensate the dispense time accordingly, by applying a correction curve to account for pressure feedback at the valve.

19. The system of claim 17, wherein the control system reduces the auger speed during dispense to improve consistency, and after completion of the dispense cycle, restores the auger speed to a predetermined mixing speed that is greater than the dispense speed and is stored in the memory as a target agitation setting.

20. The system of claim 17, wherein the control system includes a training mode for recording and optimizing dispense profiles based on actual output volume, by comparing predicted versus sensed outcomes over a plurality of cycles.

21. A method of using the system of claim 17, the method comprising the steps of initiating a clean-in-place cycle;
thawing frozen product in the mixing cylinder;
purging residual product from the blending manifold;
injecting rinse water and cleaning solution;
monitoring auger motor torque, pressure, product temperature, and treatment time to confirm clean status; and
returning the frozen food dispensing system to standby or operation mode without manual disassembly.

* * * * *